(12) United States Patent
Xiang et al.

(10) Patent No.: US 12,468,851 B2
(45) Date of Patent: Nov. 11, 2025

(54) INFORMATION DISPLAY METHOD AND RELATED APPARATUS

(71) Applicant: Huawei Technologies Co., Ltd., Shenzhen (CN)

(72) Inventors: Zhan Xiang, Shenzhen (CN); Quanjun Long, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 252 days.

(21) Appl. No.: 18/250,070

(22) PCT Filed: Oct. 21, 2021

(86) PCT No.: PCT/CN2021/125333
§ 371 (c)(1),
(2) Date: Apr. 21, 2023

(87) PCT Pub. No.: WO2022/083693
PCT Pub. Date: Apr. 28, 2022

(65) Prior Publication Data
US 2024/0012938 A1    Jan. 11, 2024

(30) Foreign Application Priority Data
Oct. 22, 2020   (CN) .......................... 202011141030.6

(51) Int. Cl.
*G06F 21/62* (2013.01)
*G06F 3/04845* (2022.01)
*G06T 5/70* (2024.01)

(52) U.S. Cl.
CPC ...... *G06F 21/6254* (2013.01); *G06F 3/04845* (2013.01); *G06T 5/70* (2024.01); *G06T 2200/24* (2013.01)

(58) Field of Classification Search
CPC ............ G06F 21/6254; G06F 3/04845; G06F 3/04817; G06F 2203/04803;
(Continued)

(56) References Cited

U.S. PATENT DOCUMENTS

| | | | | |
|---|---|---|---|---|
| 2012/0210266 A1* | 8/2012 | Jiang | .................. | H04N 21/4126 715/772 |
| 2014/0164940 A1* | 6/2014 | Fisher | ..................... | G06F 9/451 715/741 |

(Continued)

FOREIGN PATENT DOCUMENTS

| CN | 106127069 A | 11/2016 |
|---|---|---|
| CN | 107958161 A | 4/2018 |

*Primary Examiner* — Tan Doan
(74) *Attorney, Agent, or Firm* — Slater Matsil, LLP

(57) ABSTRACT

An information display method are disclosed. The method includes: displaying a first multitask management interface, where the first multitask management interface includes a first preview image of a first user interface of a first application; displaying a second user interface of the first application; after switching the second user interface to a background, triggering displaying of a second multitask management interface, where the second multitask management interface includes a second preview image of the second user interface. The first preview image is an image obtained by performing blur processing on a screenshot to a first degree, the second preview image is an image obtained by performing blur processing on a screenshot to a second degree, and the first degree is different from the second degree.

20 Claims, 44 Drawing Sheets

(58) Field of Classification Search
CPC .............. G06F 3/04883; G06F 21/6245; G06F 3/0488; G06F 9/451; G06F 9/485; G06F 9/4843; G06F 21/84; G06F 2209/482; G06T 5/70; G06T 2200/24
USPC .......................................................... 726/26
See application file for complete search history.

(56) References Cited

U.S. PATENT DOCUMENTS

2021/0157952 A1\* 5/2021 Veloso ..................... G06N 5/04
2021/0312080 A1\* 10/2021 Ramamurthy ...... G06F 21/6245
2022/0019687 A1\* 1/2022 Poutra ................. G06F 21/6245

\* cited by examiner

INFORMATION DISPLAY METHOD AND RELATED APPARATUS

CROSS-REFERENCE TO RELATED APPLICATIONS

This application is a National Stage of International Application No. PCT/CN2021/125333, filed on Oct. 21, 2021, which claims priority to Chinese Patent Application No. 202011141030.6, filed on Oct. 22, 2020. Both of the aforementioned applications are hereby incorporated by reference in their entireties.

TECHNICAL FIELD

This application relates to the field of electronic technologies, and in particular, to an information display method and a related apparatus.

BACKGROUND

A multitask management interface of a mobile phone may display a preview image of a user interface of a running application in an electronic device. In the multitask management interface, the mobile phone may be quickly switched to the user interface of the running application. When a user switches a display interface of the mobile phone to the multitask management interface, privacy information of another application in the multitask management interface may be unintentionally disclosed. Therefore, various mobile phone manufacturers perform blurring protection on an interface of a private application in a multitask management interface.

Currently, when blurring protection is performed on the private application in the multitask management interface, blur processing is usually performed on preview images of all interfaces of the private application. However, because such protection is too simple, the user cannot preview, in the multitask management interface, an interface that is of the application and that does not include the privacy information. Consequently, diversified requirements of the user cannot be met, and user experience is poor.

SUMMARY

Embodiments of this application provide an information display method and a related apparatus, to protect privacy information of a multitask management interface, meet diversified privacy requirements of a user for different windows of a same application, and effectively improve user experience.

According to a first aspect, this application provides an information display method, including: displaying a first multitask management interface, where the first multitask management interface includes a first preview image of a first user interface of a first application, and the first user interface corresponds to a first window of the first application; displaying a second user interface, where the second user interface corresponds to a second window of the first application; and after switching the second user interface to a background, triggering displaying of a second multitask management interface, where the second multitask management interface includes a second preview image of the second user interface. The first preview image is an image obtained by performing blur processing on a screenshot of the first user interface, and the second preview image is an image of a screenshot that is of the second user interface and on which blur processing is not performed. Alternatively, the first preview image is an image obtained by performing blur processing on a screenshot of the first user interface to a first degree, the second preview image is an image obtained by performing blur processing on a screenshot of the second user interface to a second degree, and the first degree is different from the second degree.

In this embodiment of this application, when a user switches a display interface of an electronic device to a multitask management interface, the electronic device performs blur processing on a user interface corresponding to a private window of each application in the multitask management interface, to protect privacy information of the user, but the electronic device does not perform blur processing on a user interface corresponding to a non-private window of each application in the multitask management interface, to facilitate preview by the user. In addition, the electronic device can further perform blur processing to different degrees on user interfaces corresponding to different private windows in the multitask management interface. This can protect a private window, meet diversified privacy requirements of the user for different windows of a same application while protecting privacy information of a multitask management interface, and effectively improve user experience.

In an implementation, the first preview image is the image obtained by performing blur processing on the screenshot of the first user interface, and the second preview image is the image of the screenshot that is of the second user interface and on which blur processing is not performed. The first preview image is the image obtained by performing blur processing on the screenshot of the first user interface to the first degree. The method further includes: displaying a third user interface, where the third user interface corresponds to a third window of a second application; and after switching the third user interface to the background, triggering displaying of a third multitask management interface, where the third multitask management interface includes a third preview image of the third user interface, the third preview image is an image obtained by performing blur processing on a screenshot of the third user interface to a third degree, and the third degree is different from the first degree.

The first application and the second application may be a same application. In this way, blur processing may be performed on screenshots of user interfaces of different windows of a same application to at least three different degrees (including the first degree, the second degree, and the third degree) in the multitask management interface. For example, the third degree is higher than the second degree, and the second degree is higher than the first degree. Alternatively, the first application and the second application may be different applications. In this way, in the multitask management interface, preview images corresponding to different applications may be screenshots on which blur processing is performed to different degrees.

In an implementation, before the displaying a first multitask management interface, the method further includes: displaying the first user interface; and displaying a fourth multitask management interface by directly switching from the displayed first user interface. The fourth multitask management interface includes a fourth preview image of the first user interface. The fourth preview image is the screenshot that is of the first user interface and on which blur processing is not performed.

In this embodiment of this application, when the electronic device switches a user interface (for example, the first user interface) of a window of a top-level application (for example, the first application) to a multitask management interface, regardless of whether the window corresponding to the user interface is a private window, the electronic device does not perform blur processing on a screenshot of the user interface of the top-level application. The multitask management interface includes a preview image of the user interface, namely, a screenshot that is of the user interface and on which blur processing is not performed.

In an implementation, before the displaying a first multitask management interface, the method further includes: performing blur processing on the screenshot of the first user interface based on privacy of the first window of the first application or privacy of the first application, to generate the first preview image.

In this embodiment of this application, the electronic device can determine, based on privacy of a window corresponding to a user interface or privacy of an application corresponding to the user interface, whether blur processing needs to be performed on a screenshot of the user interface. In this embodiment of this application, a private window or a private application may be preset by the user, may be preset by the electronic device, or may be preset during development of an application. If the private window or the private application is preset during development of the application, when installing the application, the electronic device may determine privacy of the application based on installation information of the application, that is, whether the application is a private application.

In an implementation, the performing blur processing on the screenshot of the first user interface based on privacy of the first window of the first application or privacy of the first application specifically includes: when the first window of the first application is a private window, performing blur processing on the screenshot of the first user interface based on an attribute of the first window; or when the first window of the first application is not a private window, but the first application is a private application, performing blur processing on the screenshot of the first user interface based on an attribute of the first application.

In this embodiment of this application, the electronic device can perform blur processing on a user interface corresponding to a private window or a private application, and use an image obtained by performing blur processing as a preview image of the user interface in the multitask management interface. In some embodiments, the electronic device can first determine privacy of a window, and then determine privacy of an application when the window is not a private window. Alternatively, the electronic device can first determine privacy of an application, and then determine privacy of a window when the application is not a private application.

In an implementation, the private window or the private application corresponds to different privacy levels. The privacy levels include at least a first privacy level and a second privacy level. The performing blur processing on the screenshot of the first user interface based on privacy of the first window of the first application or privacy of the first application further includes: when a privacy level of the first window is the first privacy level, performing blur processing on the screenshot of the first user interface to the first degree; when a privacy level of the first window is the second privacy level, performing blur processing on the screenshot of the first user interface to the second degree; when the first window is not a private window and a privacy level of the first application is the first privacy level, performing blur processing on the screenshot of the first user interface to the first degree; or when the first window is not a private window and a privacy level of the first application is the second privacy level, performing blur processing on the screenshot of the first user interface to the second degree.

In this embodiment of this application, a plurality of privacy levels, for example, the first privacy level and the second privacy level, can be configured for an application or a window of the application. Blur processing can be performed on user interfaces of windows with different privacy levels to different degrees. If the second privacy level is higher than the first privacy level, the second degree is higher than the first degree. That is, an image obtained by performing blur processing to the second degree is fuzzier than an image obtained by performing blur processing to the first degree. In addition to the first privacy level and the second privacy level, a window may further have another privacy level. This is not specifically limited in this embodiment of this application.

In an implementation, the first multitask management interface further includes prompt information. The prompt information is used to notify a user that blur processing is performed on the first user interface.

In this embodiment of this application, when the user uses the multitask management interface, the electronic device can add fuzzy feedback to the user based on the prompt information. In this way, interaction experience of the user is effectively improved.

In an implementation, before the triggering displaying of a second multitask management interface, the method further includes: generating the second preview image based on privacy of the second window of the first application or privacy of the first application.

In an implementation, the generating the second preview image based on privacy of the second window of the first application or privacy of the first application specifically includes: when the first window of the first application is not a private window and the first application is not a private application, determining that the second preview image is the image of the screenshot that is of the second user interface and on which blur processing is not performed.

In an implementation, the method further includes: obtaining the screenshot of the first user interface when the first user interface is switched to the background or after the first user interface is switched to the background; before the displaying a first multitask management interface, the method further includes: before triggering displaying of the first multitask management interface, performing blur processing on the screenshot of the first user interface; or when triggering displaying of the first multitask management interface, triggering to perform blur processing on the screenshot of the first user interface.

In this embodiment of this application, before receiving an input operation that triggers displaying of the first multitask management interface, the electronic device can perform blur processing on the screenshot of the first user interface, or can trigger blur processing on the screenshot of the first user interface in response to the detected input operation. This is not specifically limited in this embodiment of this application.

In an implementation, the displaying a first multitask management interface specifically includes: displaying the first multitask management interface in full screen, displaying the first multitask management interface in split screen, or displaying the first multitask management interface in a sidebar.

In this embodiment of this application, a multitask management interface may be displayed in at least one of the following forms: displaying the multitask management interface in full screen, displaying the multitask management interface in split screen, displaying the multitask management interface in a sidebar, and displaying the multitask management interface in a bottom toolbar. A form in which the multitask management interface is displayed is not limited to the foregoing display forms and may further have another display form.

According to a second aspect, this application provides an electronic device, including one or more processors, a memory, and a display. The memory and the display are coupled to the one or more processors, the memory is configured to store computer program code, the computer program code includes computer instructions, and the one or more processors invoke the computer instructions, so that the electronic device performs any one of the possible implementations of the first aspect.

According to a third aspect, an embodiment of this application provides a computer storage medium including computer instructions. When the computer instructions are run on an electronic device, the electronic device is enabled to perform any one of the possible implementations of the first aspect.

According to a fourth aspect, an embodiment of this application provides a computer program product. When the computer program product runs on a computer, the computer is enabled to perform any one of the possible implementations of the first aspect.

BRIEF DESCRIPTION OF THE DRAWINGS

FIG. 8B-1 and FIG. 8B-2 are a schematic flowchart of yet another information display method according to an embodiment of this application;

FIG. 8D-1 and FIG. 8D-2 are a schematic flowchart of a further information display method according to an embodiment of this application;

FIG. 8E-1 and FIG. 8E-2 are a schematic flowchart of a still further information display method according to an embodiment of this application.

DETAILED DESCRIPTION OF ILLUSTRATIVE EMBODIMENTS

The following clearly describes the technical solutions in embodiments of this application in detail with reference to the accompanying drawings. In the descriptions of embodiments of this application, unless otherwise specified, "/" indicates "or". For example, A/B may indicate A or B. The term "and/or" in this specification merely describes an association relationship for describing associated objects, and indicates that three relationships may exist. For example, A and/or B may indicate the following three cases: Only A exists, both A and B exist, and only B exists. In addition, in the descriptions of embodiments of this application, "a plurality of" means two or more.

The following terms "first" and "second" are merely intended for a purpose of description, and shall not be understood as an indication or implication of relative importance or implicit indication of a quantity of indicated technical features. Therefore, a feature limited by "first" or "second" may explicitly or implicitly include one or more features. In the descriptions of embodiments of this application, unless otherwise specified, "a plurality of" means two or more than two.

First, an electronic device 100 in embodiments of this application is described.

Figure 1:
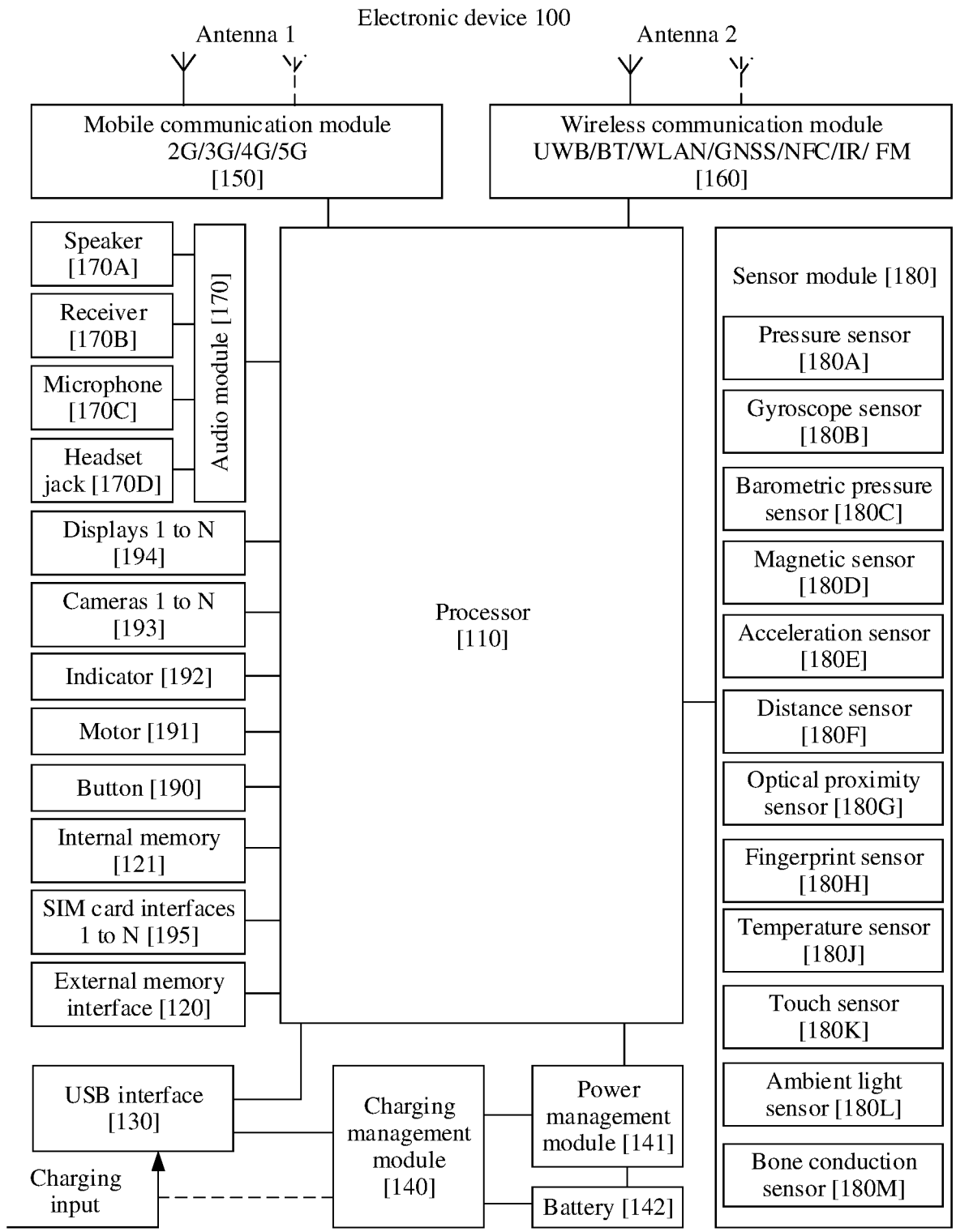
FIG. 1 is a schematic diagram of a structure of an electronic device according to an embodiment of this application.

FIG. 1 is a schematic diagram of a structure of the electronic device 100.

The electronic device 100 may be a mobile phone, a tablet computer, a desktop computer, a laptop computer, a handheld computer, a notebook computer, an ultra-mobile personal computer (ultra-mobile personal computer, UMPC), a netbook, a cellular phone, a personal digital assistant (personal digital assistant, PDA), an augmented reality (augmented reality, AR) device, a virtual reality (virtual reality, VR) device, an artificial intelligence (artificial intelligence, AI) device, a wearable device, a vehicle-mounted device, a smart home device, and/or a smart city device. A specific type of the electronic device is not limited in this embodiment of this application.

Refer to FIG. 1. The electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of this application does not constitute a specific limitation on the electronic device 100. In some other embodiments of this application, the electronic device 100 may include more or fewer components than those shown in the figure, or some components may be combined, or some components may be split, or different component arrangements may be used. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, a neural-network processing unit (neural-network processing unit, NPU), and/or the like. Different processing units may be independent components, or may be integrated into one or more processors.

The controller may generate an operation control signal based on instruction operation code and a time sequence signal, to complete control of instruction reading and instruction execution.

A memory may be further disposed in the processor 110, and is configured to store instructions and data. In some embodiments, the memory in the processor 110 is a cache memory. The memory may store instructions or data just used or cyclically used by the processor 110. If the processor 110 needs to use the instructions or the data again, the processor may directly invoke the instructions or the data from the memory. This avoids repeated access, reduces waiting time of the processor 110, and improves system efficiency.

The charging management module 140 is configured to receive a charging input from a charger. The charger may be a wireless charger or a wired charger. In some embodiments of wired charging, the charging management module 140 may receive a charging input from a wired charger through the USB interface 130. In some embodiments of wireless charging, the charging management module 140 may receive a wireless charging input by using a wireless charging coil of the electronic device 100. The charging management module 140 may supply power to the electronic device through the power management module 141 while charging the battery 142.

The power management module 141 is configured to connect to the battery 142, the charging management module 140, and the processor 110. The power management module 141 receives an input from the battery 142 and/or the charging management module 140, and supplies power to the processor 110, the internal memory 121, the display 194, the camera 193, the wireless communication module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same component.

A wireless communication function of the electronic device 100 may be implemented through the antenna 1, the antenna 2, the mobile communication module 150, the wireless communication module 160, the modem processor, the baseband processor, and the like. Alternatively, the electronic device 100 may not include the mobile communication module 150 or the wireless communication module 160, or may include only one of the mobile communication module 150 and the wireless communication module 160. Correspondingly, the electronic device 100 may alternatively not include the antenna 1 and the antenna 2, or may include only one of the antenna 1 and the antenna 2. It may be understood that, according to a requirement, the electronic device 100 may also include more antennas than the antenna 1 and the antenna 2.

The antenna 1 and the antenna 2 are configured to transmit and receive electromagnetic wave signals. Each antenna in the electronic device 100 may be configured to cover one or more communication frequency bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communication module 150 may provide a wireless communication solution that includes 2G/3G/4G/5G or the like and that is applied to the electronic device 100. The mobile communication module 150 may include at least one filter, a switch, a power amplifier, a low noise amplifier (low noise amplifier, LNA), and the like. The mobile communication module 150 may receive an electromagnetic wave through the antenna 1, perform processing such as filtering and amplification on the received electromagnetic wave, and transmit the electromagnetic wave to the modem processor for demodulation. The mobile communication module 150 may further amplify a signal modulated by the modem processor, and convert the signal into an electromagnetic wave for radiation through the antenna 1. In some embodiments, at least some functional modules in the mobile communication module 150 may be disposed in the processor 110. In some embodiments, at least some functional modules in the mobile communication module 150 and at least some modules of the processor 110 may be disposed in a same component.

The wireless communication module 160 may provide a wireless communication solution that includes a wireless local area network (wireless local area network, WLAN) (such as, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, or the like and that is applied to the electronic device 100. The wireless communication module 160 may be one or more components integrating at least one communication processor module. The wireless communication module 160 receives an electromagnetic wave through the antenna 2, performs frequency modulation and filtering processing on the electromagnetic wave signal, and sends a processed signal to the processor 110. The wireless communication module 160 may further receive a to-be-sent signal from the processor 110, perform frequency modulation and amplification on the signal, and convert a processed signal into an electromagnetic wave through the antenna 2 for radiation.

In some embodiments, in the electronic device 100, the antenna 1 and the mobile communication module 150 are coupled, and the antenna 2 and the wireless communication module 160 are coupled, so that the electronic device 100 can communicate with a network and another device by using a wireless communication technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-CDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GNSS), a BeiDou navigation satellite system (BeiDou navigation satellite system, BDS), a quasi-zenith satellite system (quasi-zenith satellite system, QZSS), and/or a satellite based augmentation system (satellite based augmentation system, SBAS).

The electronic device 100 may implement a display function through the GPU, the display 194, the application processor, and the like. The GPU is a microprocessor for image processing, and is connected to the display 194 and the application processor. The GPU is configured to: perform mathematical and geometric computation, and render an image. The processor 110 may include one or more GPUs, which execute program instructions to generate or change display information.

In some embodiments of this application, when switching an application 1 to run in the background, the AP obtains a screenshot of a user interface 1 recently displayed by the application 1, and determines, based on privacy of the application 1 and privacy of a window corresponding to the user interface 1, whether blur processing needs to be performed on the screenshot of the user interface 1. When blur processing needs to be performed, the AP or the GPU performs blur processing on the screenshot of the user interface 1 according to a blur processing algorithm. For example, when the AP determines that the window corresponding to the user interface 1 is a private window, the AP sends an instruction 1 to the GPU, to instruct the GPU to perform blur processing on the screenshot of the user interface 1 according to the blur processing algorithm.

In some embodiments, a window or an application has a privacy level, and the AP or the GPU may perform blur processing on the screenshot of the user interface 1 to different degrees based on the privacy level of the window or the application. For example, when the AP determines that a privacy level of the window corresponding to the user interface 1 is low privacy, the AP performs low blur processing on the screenshot of the user interface 1, to obtain a lowly blur-processed image of the user interface 1. When the AP determines that a privacy level of the window corresponding to the user interface 1 is high privacy, the AP performs high blur processing on the screenshot of the user interface 1, to obtain a highly blur-processed image of the user interface 1. A blur degree of high blur processing is greater than that of low blur processing.

In embodiments of this application, the foregoing blur processing algorithm may be a box blur (Box Blur) algorithm, a Gaussian blur (Gaussian Blur) algorithm, a double blur (Dual Blur) algorithm, a Bokeh blur (Bokeh Blur) algorithm, a tilt shift blur (Tilt Shift Blur) algorithm, or the like.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light-emitting diode (active-matrix organic light-emitting diode, AMOLED), a flexible light-emitting diode (flexible light-emitting diode, FLED), a mini-LED, a micro-LED, a micro-OLED, a quantum dot light-emitting diode (quantum dot light-emitting diode, QLED), or the like. In some embodiments, the electronic device 100 may include one or N displays 194, where N is a positive integer greater than 1.

The internal memory 121 may include one or more random access memories (random access memory, RAM) and one or more non-volatile memories (non-volatile memory, NVM). The random access memory may include a static random-access memory (static random-access memory, SRAM), a dynamic random access memory (dynamic random access memory, DRAM), a synchronous dynamic random access memory (synchronous dynamic random access memory, SDRAM), and a double data rate synchronous dynamic random access memory (double data rate synchronous dynamic random access memory, DDR SDRAM, for example, the fifth-generation DDR SDRAM is generally referred to as DDR5 SDRAM). The non-volatile memory may include a magnetic disk storage device and a flash memory (flash memory). The flash memory may be classified into an NOR FLASH, an NAND FLASH, a 3D NAND FLASH, and the like according to an operation principle; may be classified into a single-level cell (single-level cell, SLC), a multi-level cell (multi-level cell, MLC), a triple-level cell (triple-level cell, TLC), a quad-level cell (quad-level cell, QLC), and the like based on a quantity of electric potential levels of a cell; or may be classified into a universal flash storage (universal flash storage, UFS), an embedded multimedia card (embedded multimedia card, eMMC), and the like according to storage specifications. In some embodiments, the random access memory may be directly read and written by using the processor 110. The random access memory may be configured to store an executable program (for example, machine instructions) in an operating system or another running program, and may be further configured to store data of a user, data of an application, and the like. The non-volatile memory may also store an executable program, data of a user, data of an application, and the like, which may be loaded into the random access memory in advance for directly reading and writing by the processor 110.

The external memory interface 120 may be configured to connect to an external non-volatile memory, to extend a storage capability of the electronic device 100. The external non-volatile memory communicates with the processor 110 through the external memory interface 120, to implement a data storage function. For example, files such as music and videos are stored in the external non-volatile memory.

In this embodiment of this application, after switching the application 1 to run in the background, the AP determines whether a preview image of the application 1 on a multitask management interface is the screenshot of the user interface 1 recently displayed by the application 1 or a blur-processed image of the screenshot of the user interface 1. After determining the preview image of the application 1 in the multitask management interface, the application 1 stores the preview image in the RAM or the NVM. When the electronic device 100 receives an input operation that triggers the multitask management interface, the AP or the GPU draws the multitask management interface based on the preview image that is of the application 1 and that is obtained from the RAM or the NVM, and stores drawing data of the multitask management interface into a display buffer. The display displays the foregoing multitask management interface in a next screen refresh cycle based on the drawing data in the display buffer.

The electronic device 100 may implement audio functions such as music playing and recording by using the audio module 170, the speaker 170A, the receiver 170B, the microphone 170C, the headset jack 170D, the application processor, and the like.

The button 190 includes a power button, a volume button, and the like. The button 190 may be a mechanical button, or a touch button. The electronic device 100 may receive a button input, and generate a button signal input related to user setting and function control of the electronic device 100.

The motor 191 may generate a vibration prompt. The motor 191 may be configured to provide an incoming call vibration prompt and a touch vibration feedback.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or plugged from the SIM card interface 195 to come into contact with or be separated from the electronic device 100.

The following describes some examples of user interfaces (user interface, UI) provided by the electronic device 100. The term "user interface" in the specification, claims, and accompanying drawings of this application is a medium interface that is used for interaction and information exchange between an application or an operating system and a user and implements conversion between an internal form of information and a form that can be accepted by the user. A user interface of an application is source code written by using a specific computer language such as java or an extensible markup language (extensible markup language, XML). Interface source code is parsed and rendered on a terminal device and finally presented as user-recognizable content. The user interface is usually represented in a form of a graphical user interface (graphical user interface, GUI), and is a user interface that is related to a computer operation and that is displayed in a graphic manner. The user interface may be an interface element such as an icon, a window, or a control displayed on a display of the electronic device 100, and the control may include a visual interface element such as an icon, a button, a menu, a tab, a text box, a dialog box, a status bar, a navigation bar, a widget, or a component. In this embodiment of this application, the "user interface" may also be briefly referred to as an "interface".

Figure 2:
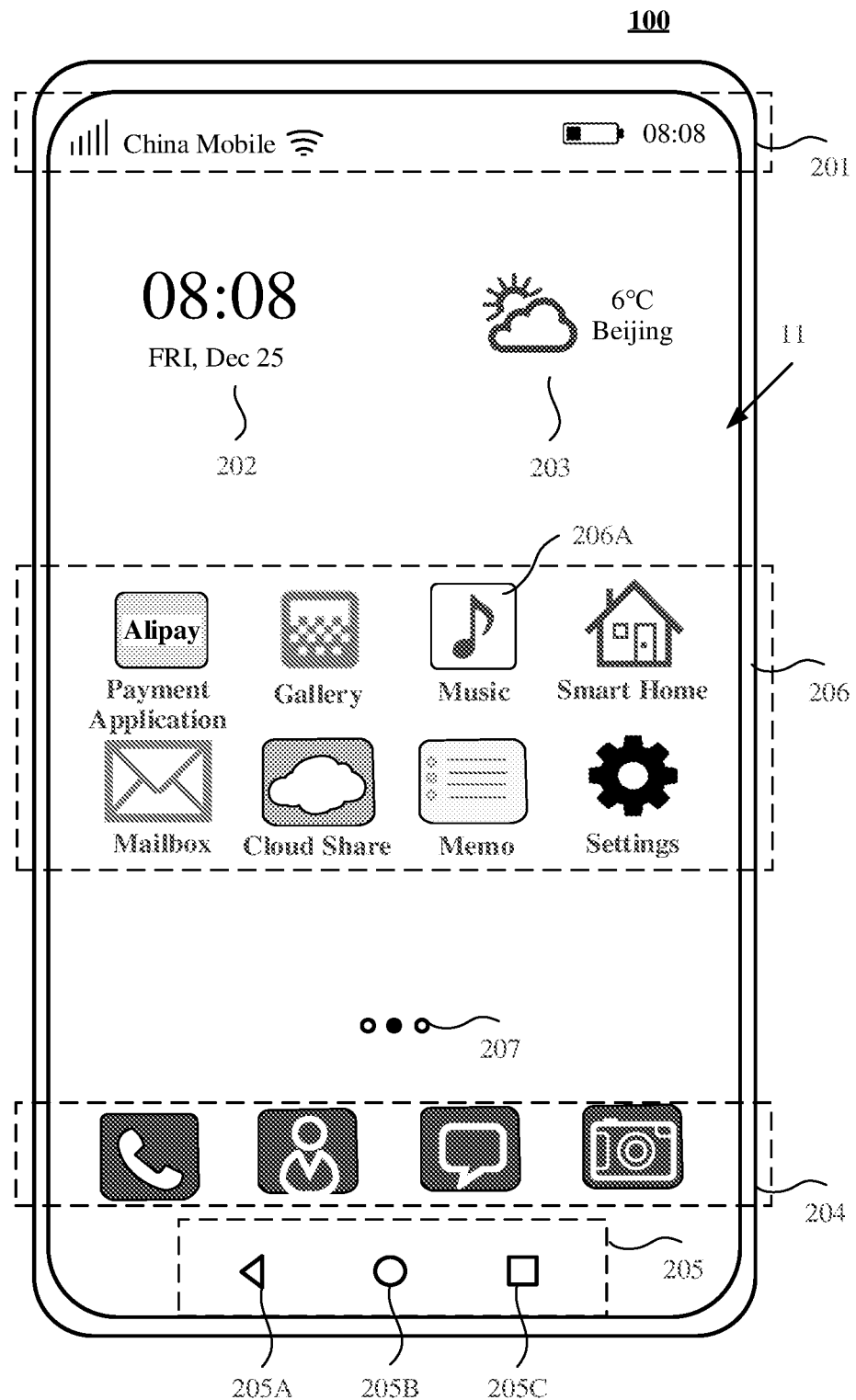
FIG. 2 is a schematic diagram of a user interface for displaying an application installed on an electronic device according to an embodiment of this application.

FIG. 2 shows an example of a user interface 11 used to display an application installed on the electronic device 100. The user interface 11 may include a status bar 201, a calendar indicator 202, a weather indicator 203, a tray 204 with frequently used application icons, a navigation bar 205, and a display area 206 for other application icons.

The tray 204 with frequently used application icons may display: a phone icon, a contact icon, a messages icon, and a camera icon.

The navigation bar 205 may include system navigation buttons such as a back button 205A, a home screen button 205B, and a multitask button 205C. When detecting that a user taps the back button 205A, the electronic device 100 may display a previous page of a current page. When detecting that the user taps the home screen button 205B, the electronic device 100 may display a home screen. When detecting that the user taps the multitask button 205C, the electronic device 100 may display, on a multitask management interface, a preview image of an application recently opened by the user. Names of the navigation buttons may alternatively be other names. This is not limited in this application.

The navigation buttons are not limited to virtual buttons. In this embodiment of this application, the navigation buttons in the navigation bar 205 may alternatively be implemented as physical buttons. In some embodiments, the electronic device 100 may further implement functions of navigation buttons in the navigation bar 205 through gesture navigation of the user. For example, when detecting a gesture of sliding inward from a left edge of the display 194 of the electronic device 100, the electronic device 100 may display a previous page of a current page. When detecting a gesture of sliding upward from a bottom edge of the display 194 of the electronic device 100 and then stopping touching the display 194, the electronic device 100 may display a home screen. When detecting a gesture of sliding upward from a bottom edge of the display 194 of the electronic device 100 and then touching and holding the display 194, the electronic device 100 may display, in the multitask management interface, a preview image of an application recently opened by the user.

The display area 206 for other application icons may display: a payment application icon, a gallery icon, a music icon 206A, a smart home icon, a mailbox icon, a cloud sharing icon, a memo icon, or a settings icon. The user interface 11 may further include a page indicator 206. Other application icons may be distributed on a plurality of pages, and the page indicator 207 may be used to indicate a specific page on which an application is currently viewed by the user. The user may slide leftward or rightward in an area including the other application icons, to view an application icon on another page.

In this embodiment of this application, when the user opens a new application, the electronic device 100 switches an application running in the foreground to the background for running. When the application running on the foreground is switched to the background for running, the electronic device 100 adds, to a multitask queue, a running application window corresponding to the application, and stores a screenshot of displayed content of the application window as a preview image of the application window in the multitask management interface. The user may preview and quickly switch applications in the multitask queue through the multitask management interface of the electronic device 100, and disable background running to quickly clear a running memory of the electronic device 100. In some embodiments of this application, when the electronic device 100 switches a display interface to the multitask management interface, a preview image corresponding to a user interface of each application in the multitask queue may be displayed in the multitask management interface in a manner of a page, a card, or a floating window.

The application window may be an Activity window in the Android system, or may be an application window in the IOS system, or may be an application window in another operating system. This is not specifically limited herein. One application includes a plurality of application windows, and one application window corresponds to one user interface. Optionally, one application window may also correspond to a plurality of user interfaces. For ease of description, in this embodiment of this application, the application window may be briefly referred to as a window or an application window.

For example, in the Android system, Activity is an interface for interaction between a user and an application. Each Activity component is associated with a Window object, and is used to describe a specific application window. It can be learned that Activity is a highly abstract user interface component, and represents a user interface and a corresponding service logic centered on the user interface in Android. Activity may listen to and process an event triggered by the user by using a control in the user interface. It may be understood that, in an Android application, one Activity may be represented as one user interface, and one Android application may have a plurality of Activities. In this embodiment of this application, an application window associated with the Activity may be referred to as an Activity window.

In this embodiment of this application, the multitask management interface may further display a preview image of a user interface of another window of the application, without being limited to a screenshot 1 of display content of a latest running window of an application. In some embodiments, if the latest running window is not a window corresponding to a main window of the application, the screenshot 1 and a screenshot of the main window of the application may be displayed in the multitask management interface. The home window of the application may be a user interface displayed by the electronic device 100 when the application is just opened. For example, when displaying a chat window 1 of an instant messaging application 1, the electronic device 100 receives an input operation acting on the multitask button 205C. In response to the input operation, the electronic device 100 displays the multitask management interface. The multitask management interface includes a screenshot of the chat window 1 and a screenshot of a main window of the instant messaging application 1. For example, when displaying an interface of an application applet embedded in the instant messaging application 1, the electronic device receives an input operation acting on the multitask button 205C. In response to the input operation, the electronic device 100 displays the multitask management interface. The multitask management interface includes a screenshot of the interface of the application applet and a screenshot of a main window of the instant messaging application 1.

In this embodiment of this application, the multitask management interface may further display a preview image of an application not running in the background, without being limited to a preview image of an application running in the background. This is not specifically limited herein.

In embodiments of this application, the electronic device 100 may display a multitask management interface in at least one manner. The following describes several manners of the multitask management interface provided in embodiments of this application.

Manner 1: The multitask management interface is displayed in full screen.

For example, after the user successively uses applications such as a contact, a gallery, and a payment application, when a display interface of the electronic device is switched to the user interface 11 of the desktop application, the electronic device 100 adds the applications such as the contact, the gallery, and the payment application to the multitask queue. As shown in FIG. 2, the electronic device 100 may receive an input operation (for example, a touch operation) acting on the multitask button 205C of the user interface 11. In response to the input operation, the electronic device 100 may display a multitask management interface 12 shown in FIG. 3A. The multitask management interface 12 is used to display a page corresponding to each application in the multitask queue. The multitask management interface 12 may include a page 301 corresponding to the contact, a page 302 corresponding to the gallery, a page 303 corresponding to the payment application, and a close control 304.

Figure 3A:
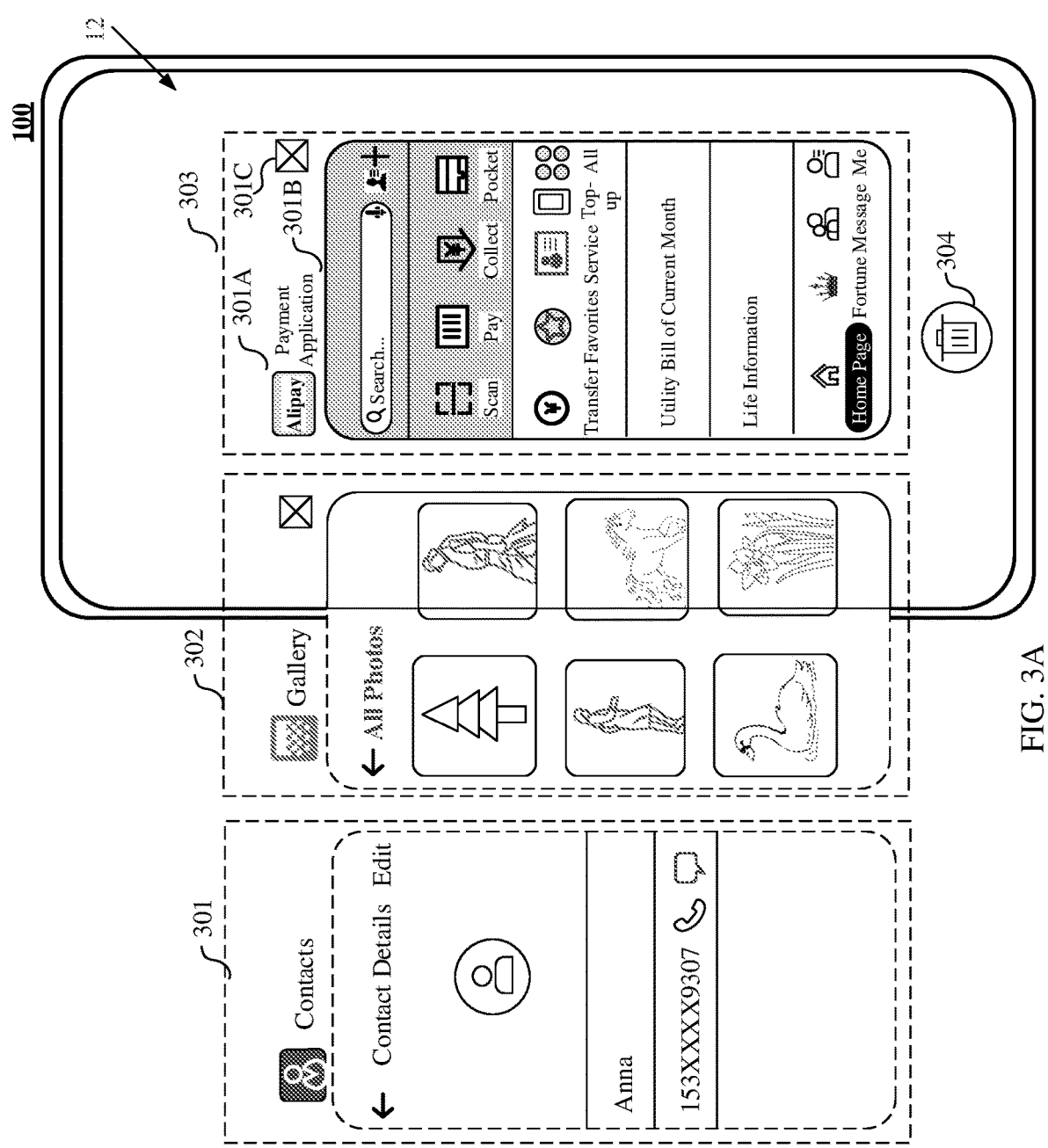
FIG. 3A and FIG. 3B are schematic diagrams of displaying a multitask management interface in full screen according to an embodiment of this application.

As shown in FIG. 3A, the page 301, the page 302, and the page 303 are horizontally arranged in the multitask management interface 12. Display content of the multitask management interface 12 on the display may include some or all pages of the page 301, the page 302, and the page 303. When the display content of the multitask management interface 12 on the display includes some pages of the page 301, the page 302, and the page 303, the user may view all pages of the multitask management interface 12 by sliding right in the multitask management interface 12.

The close control 304 may receive an input operation (for example, a touch operation). In response to the detected input operation, the electronic device 100 may clear running memories occupied by the applications corresponding to the page 301, the page 302, and the page 303, and display the user interface 11.

For example, as shown in FIG. 3A, the page 303 corresponding to the payment application includes an icon and name 303 of the payment application, a screenshot 303B of a user interface 1 of the payment application, and a close control 303C.

The screenshot 303B of the user interface 1 of the payment application may receive an input operation (for example, a touch operation). In response to the detected input operation, the electronic device 100 may display the user interface 1 of the payment application.

The close control 303C may receive an input operation (for example, a touch operation). In response to the detected input operation, the electronic device 100 may stop displaying the page 303, and clear a running memory occupied by the payment application. In some embodiments, the page 303 corresponding to the payment application may alternatively not include the close control 301C. For example, the electronic device 100 may receive a gesture of sliding up on the page 303. In response to the detected gesture, the electronic device 100 may stop displaying the page 303, and clear a running memory occupied by the payment application.

Figure 3B:
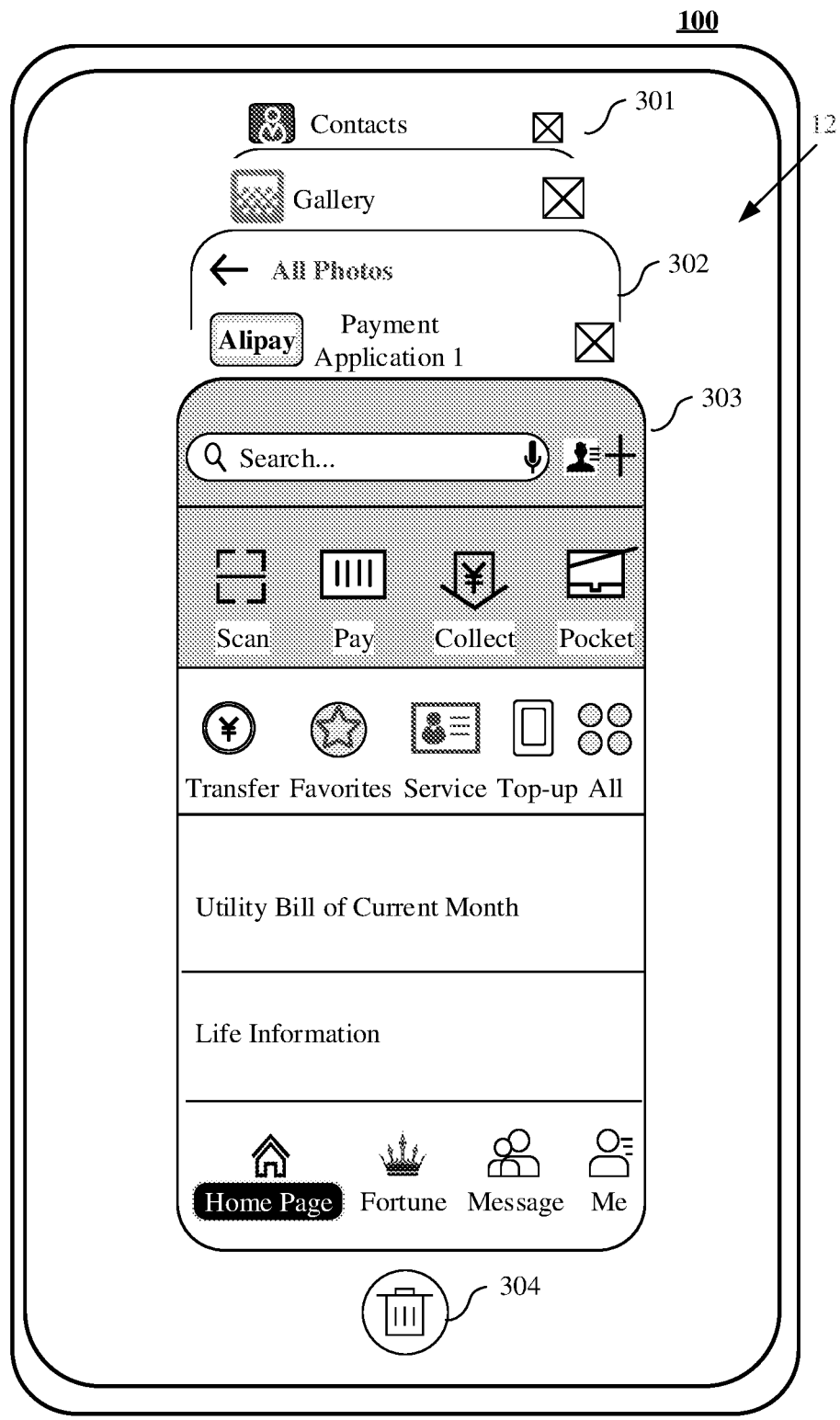

For example, as shown in FIG. 3B, in some embodiments, the page 301, the page 302, and the page 303 may be vertically arranged in the multitask management interface 12.

It should be noted that, in a horizontal arrangement manner and a vertical arrangement manner, the page 301, the page 302, and the page 303 may or may not overlap. This is not specifically limited herein. In addition to the horizontal arrangement manner and the vertical arrangement manner, a page corresponding to each application in the multitask queue may be arranged on the multitask management page in another manner, for example, a two-dimensional array arrangement manner.

In addition, it can be learned from FIG. 3A and FIG. 3B that sizes of screenshots of user interfaces displayed on the page 301, the page 302, and the page 303 may be the same or different, and a display size of a screenshot displayed on each page is different from that of a user interface corresponding to the screenshot. In some embodiments, when the electronic device 100 switches an application to the background, the electronic device 100 obtains the screenshot 1 of the user interface recently displayed by the application 1. When the electronic device displays the multitask management interface, the electronic device 100 zooms out the screenshot 1 at a preset zoom-out ratio, and displays the screenshot 1 on a page corresponding to the application 1 in the multitask management interface. It can be learned from FIG. 3A that zoom-out ratios of screenshots of different applications displayed in the multitask management interface may be the same. It can be learned from FIG. 4B that zoom-out ratios of screenshots of different applications displayed in the multitask management interface may be different, where a zoom-out ratio of the page 301 is greater than a zoom-out ratio of the page 302, and the zoom-out ratio of the page 302 is greater than a zoom-out ratio of the page 303.

Manner 2: The multitask management interface is displayed in split screen.

When displaying the multitask management interface in full screen, the electronic device 100 needs to switch all applications running in the foreground to the background for running. When the multitask management interface is displayed in split screen, the user can preview, switch, or close an application running in the background in the multitask management interface while using an application running in the foreground. This effectively improves user experience.

In this embodiment of this application, when displaying a user interface of a split-screen application, the electronic device 100 may receive a screen splitting operation of the user. In response to the detected screen splitting operation, the electronic device 100 may display the user interface of the application in an area 1 of the display 194, and display a user interface of a desktop application of the electronic device 100 in an area 2 of the display 194. The user interface includes an icon of an installed application. Then, the electronic device 100 may receive an input operation used to trigger the multitask management interface. In response to the detected input operation, the electronic device 100 may display, in the area 2, a page corresponding to each application in the multitask queue.

Figure 3C:
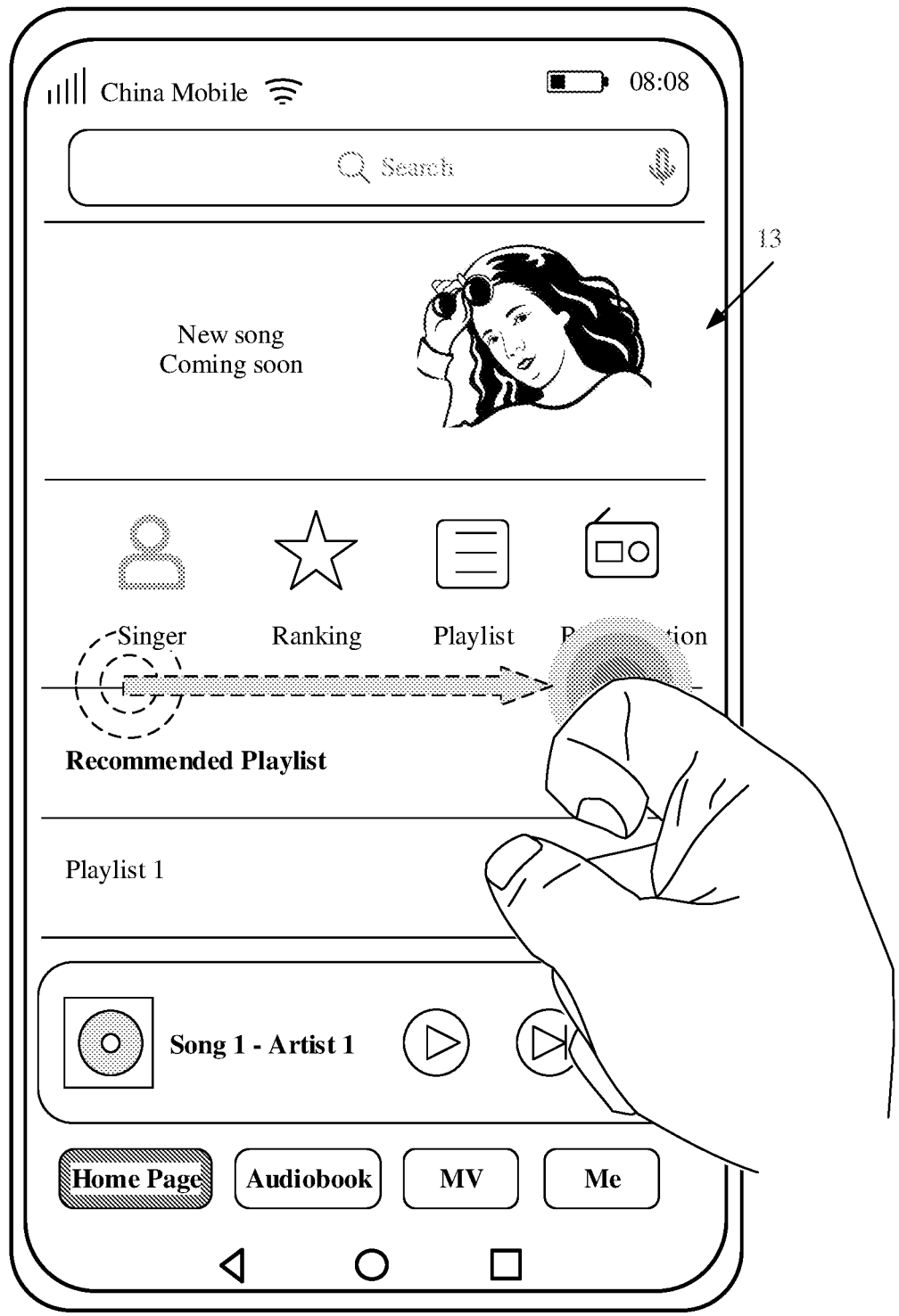
FIG. 3C to FIG. 3E are schematic diagrams of displaying a multitask management interface in split screen according to an embodiment of this application.

For example, as shown in FIG. 3C, the display area 206 for other application icons of the user interface 11 includes a music icon 206A. The music application can be split-screened. The music icon 206A may receive an input operation (for example, a touch operation). In response to the detected input operation, the electronic device 100 displays a music interface 13 shown in FIG. 3D.

As shown in FIG. 3C, the user interface 13 may receive a screen splitting operation of the user. In response to the screen splitting operation, the electronic device 100 displays a user interface of the music application in the area 1 of the display 194 shown in FIG. 3D, and displays an icon of an application commonly used by the user in the area 2 of the display 194, for example, a payment application icon, a gallery icon, a music icon, a settings icon, a mailbox icon, a browser icon, a memo icon, or a weather icon. The screen splitting operation may be, as shown in FIG. 3C, knuckles of the user sliding laterally on the user interface 13 along a direction of a short side of the electronic device 100.

It should be noted that, in this embodiment of this application, screen splitting may also be triggered in another manner, without being limited to lateral sliding of a knuckle shown in FIG. 3C. This is not specifically limited herein.

Figure 3D:
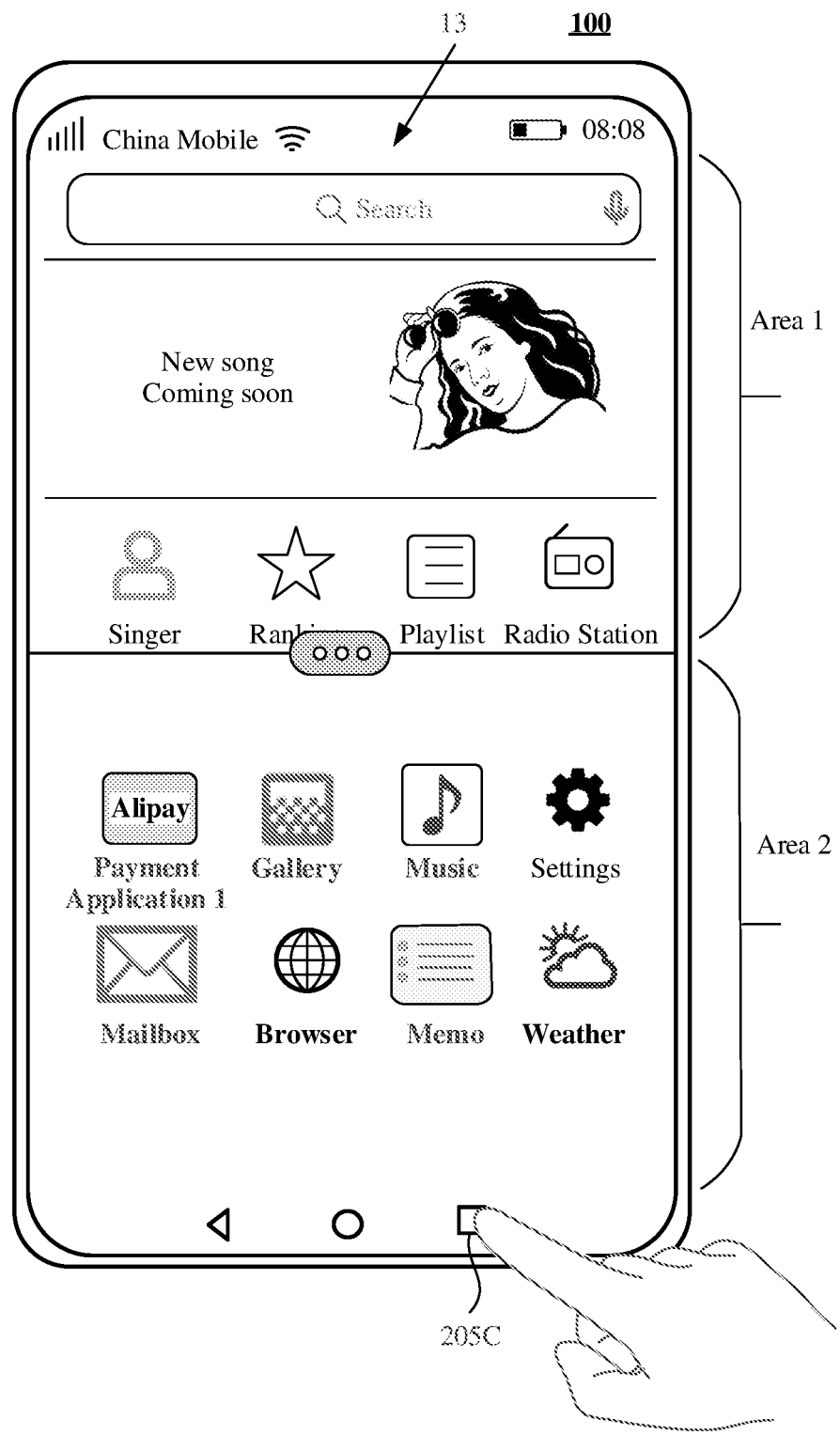

The multitask button 205C in FIG. 3D may receive an input operation (for example, a touch operation). In response to the detected input operation, the electronic device 100 may display, in the area 2, a multitask management interface 14 shown in FIG. 3E. The multitask management interface 14 may include a page 401 corresponding to the contact, a page 402 corresponding to the gallery, and a page 403 corresponding to the payment application. The user can swipe left or right in the area 2 to view pages corresponding to more applications in the multitask queue.

It should be noted that, without being limited a manner of triggering the multitask management interface 14 by using the multitask button 205C shown in FIG. 3D, in this embodiment of this application, the multitask management interface displayed in split screen may also be triggered in another manner. This is not specifically limited herein. The pages are arranged horizontally in the area 2 shown in FIG. 3E. In addition, the pages 401, 402, and 403 may be arranged in the area 2 in another arrangement manner.

Manner 3: The multitask management interface is displayed in a manner of a sidebar.

Figure 3E:
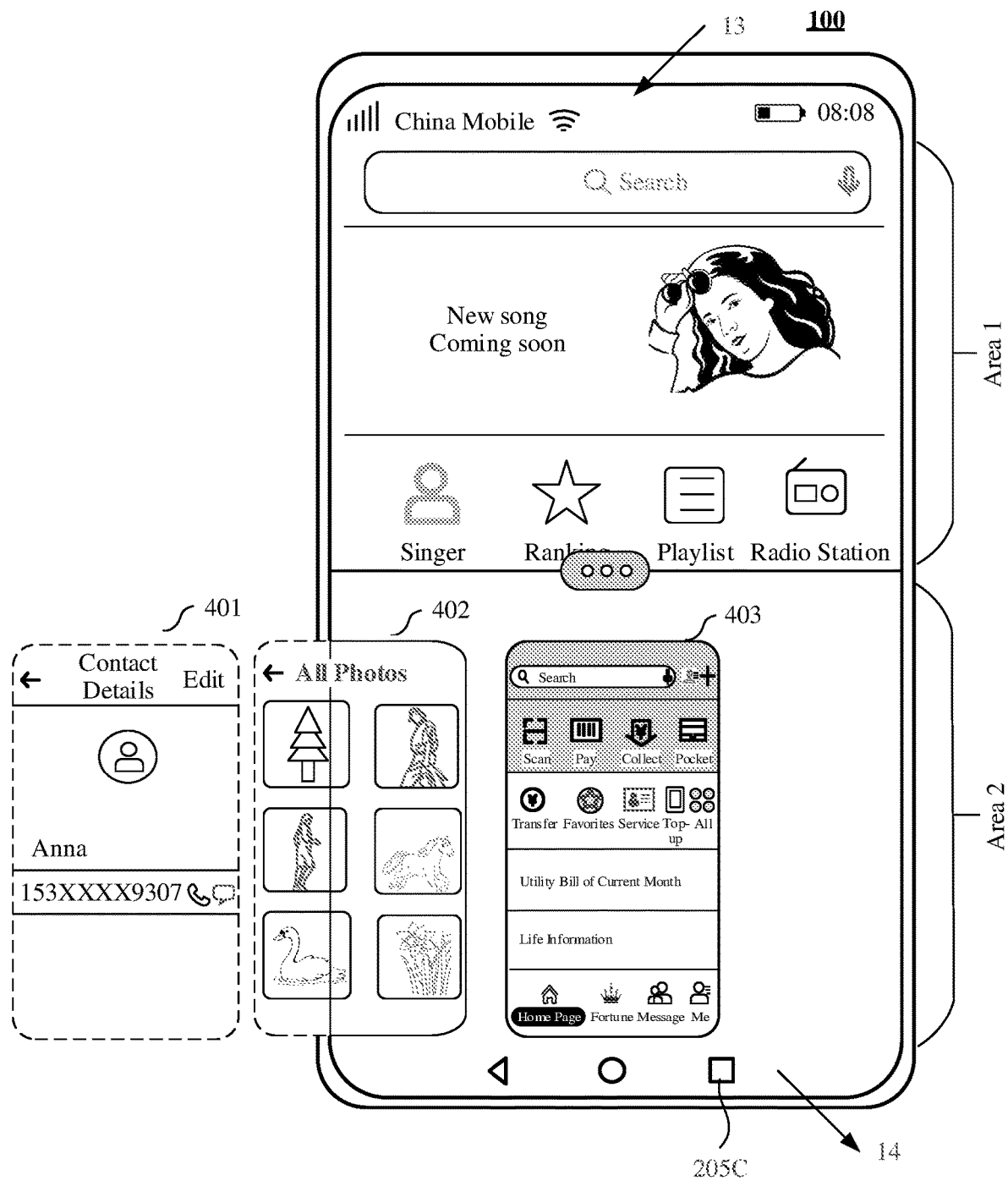
Figure 3F:
FIG. 3F and FIG. 3G are schematic diagrams of displaying a multitask management interface in a form of a sidebar according to an embodiment of this application.

In this embodiment of this application, the electronic device 100 may display, on a right edge (a left edge) of a display interface, a bubble 501 shown in FIG. 3F. In some embodiments, the bubble 501 may display an icon or name of a recently used application.

The bubble 501 may receive an input operation (for example, a touch operation). In response to the detected input operation, the electronic device 100 may display, on the user interface 11, a sidebar 502 shown in FIG. 3G. The sidebar 502 may display a page 503 corresponding to the contact, a page 504 corresponding to the gallery, and a page 504 corresponding to the payment application. The user can slide up and down on the sidebar 502 to view pages corresponding to more applications in the multitask queue.

In this embodiment of this application, the sidebar may be triggered in another manner, without being limited to a manner of triggering the sidebar by using a bubble displayed on one side. This is not specifically limited herein.

Manner 4: The multitask management interface is displayed in a manner of a bottom toolbar.

Figure 3G:
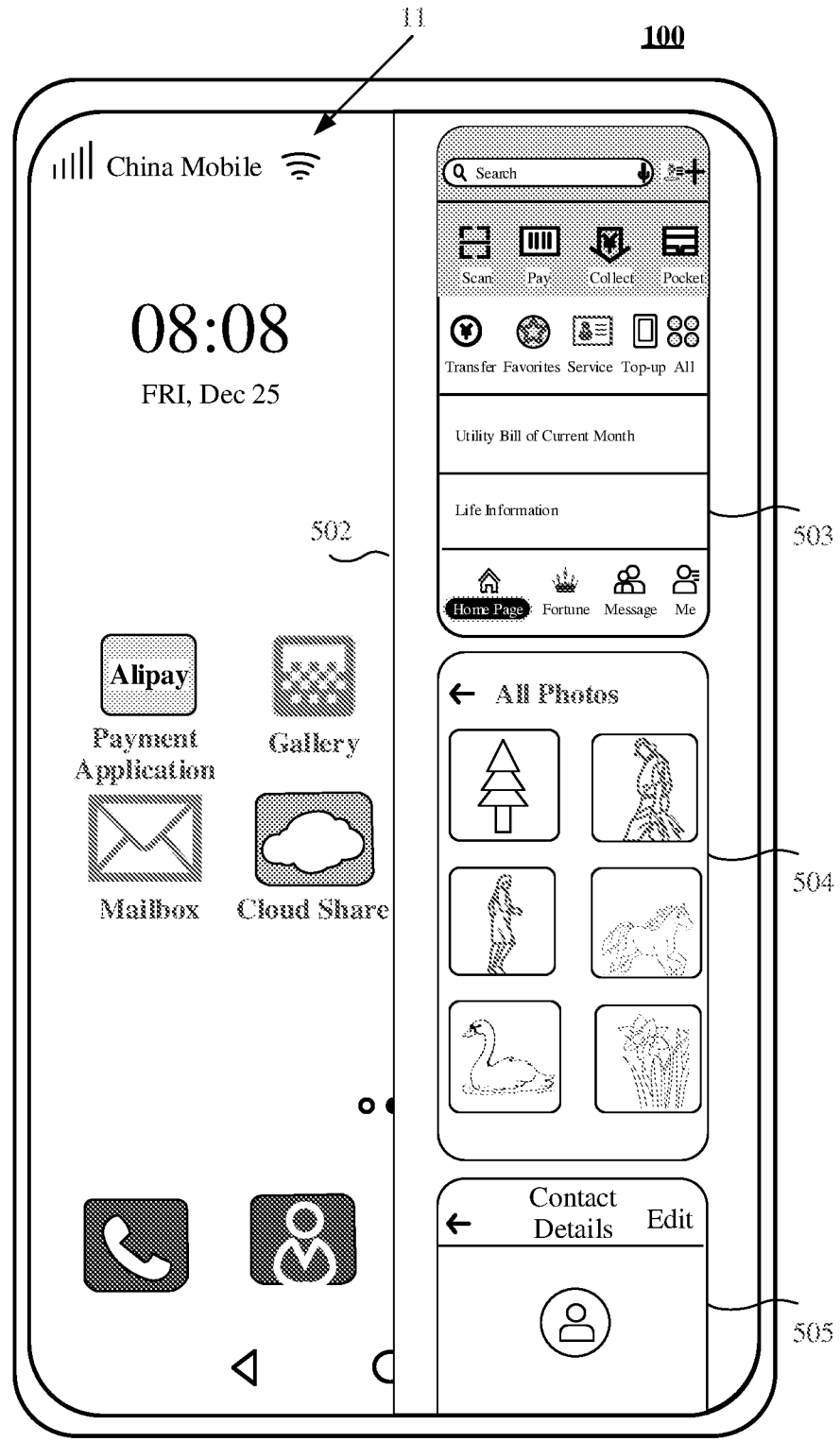
Figure 3H:
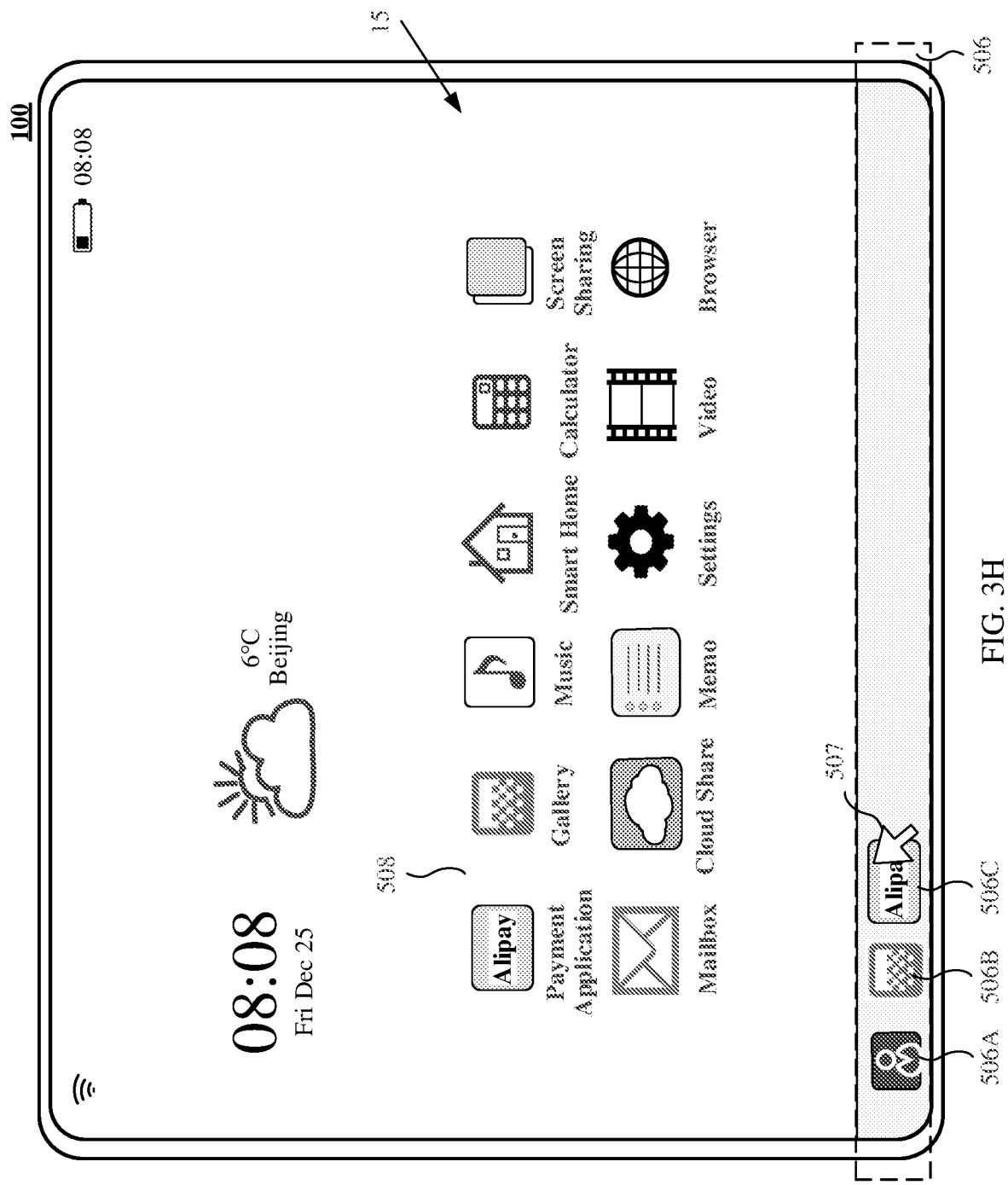
FIG. 3H and FIG. 3I are schematic diagrams of displaying a multitask management interface in a form of a bottom toolbar according to an embodiment of this application.

For example, FIG. 3H shows another user interface 15 that is used to display an application installed on the electronic device 100 according to an embodiment of this application.

In this embodiment of this application, the electronic device 100 may display, at the bottom of a display interface, a toolbar 506 shown in FIG. 3H. After the user successively uses applications such as the contact, the gallery, and the payment application, the electronic device 100 successively adds the applications such as the contact, the gallery, and the payment application to the multitask queue, and successively displays a contact icon 506A, a gallery icon 506B, and a payment application icon 506C on the toolbar 506.

The payment application icon 506C may receive an input operation (for example, moving a cursor 507 into a display range of the payment application icon 506C). In response to the detected input operation, the electronic device 100 may display, on a display interface, a page 508 corresponding to the payment application shown in FIG. 3I. The page 508 corresponding to the payment application displays a screenshot of the user interface 1 of the payment application. The payment application icon 506C may further receive an input operation (for example, a single tap operation of moving the cursor 507). In response to the detected input operation, the electronic device 100 may display the user interface 1 of the payment application.

It should be noted that, without being limited to triggering the electronic device 100 to display the page 508 of the payment application by moving the cursor 507 to the display range of the payment application icon 506C, in this embodiment of this application, the electronic device 100 may be further triggered to display the page 508 of the payment application by using another input operation, so that the user can preview the user interface 1 of the payment application. This is not specifically limited herein. For example, the payment application icon 506C may be touched and held by using a finger of the user.

Similarly, the contact icon 506A or the gallery icon 506B may also receive an input operation, to display a corresponding page on the electronic device 100. Details are not described herein again.

Based on the hardware structure and the multitask management interface described above, the following describes the information display method provided in embodiments of this application with reference to the accompanying drawings.

In a privacy information processing method provided in embodiments of this application, when a user switches a display interface of the electronic device 100 to a multitask management interface, blur processing is performed on a user interface of a private window of each application in the multitask management interface, to protect privacy information of the user. The private window may be preset by the electronic device 100, or may be preset by the user. For example, a window 1 of an application 1 is a private window, and a window 2 of the application 1 is not a private window. If the application 1 is switched to run in the background when displaying a user interface of the window 1, the multitask management interface may be used to display a blur-processed image of a screenshot of the user interface of the window 1. If the application 1 is switched to run in the background when displaying a user interface of the window 2, the multitask management interface may be used to display a screenshot of the user interface of the window 2. This can protect a private window, meet diversified privacy requirements of the user for different windows of a same application while protecting privacy information of a multitask management interface, and effectively improve user experience.

The following describes the information display method provided in embodiments of this application by using the multitask management interface in Manner 1 shown in FIG. 3A as an example.

It should be noted that, without being limited to the multitask management interface shown in FIG. 3A, the information display method provided in embodiments of this application is also applicable to any one of the multitask management interfaces provided in Manner 1, Manner 2, Manner 3, and Manner 4.

Embodiment 1

In some embodiments of this application, when the electronic device 100 displays a user interface 1 of an application 1, the electronic device 100 switches the application 1 to run in the background. Then, when the electronic device 100 detects an input operation 1 that triggers a multitask management interface, the electronic device 100 displays the multitask management interface. If a window corresponding to the user interface 1 is a private window, the multitask management interface includes a blur-processed image of a screenshot of the user interface 1. If a window corresponding to the user interface 1 is not a private window, the multitask management interface includes a screenshot of the user interface 1.

Figure 4A:
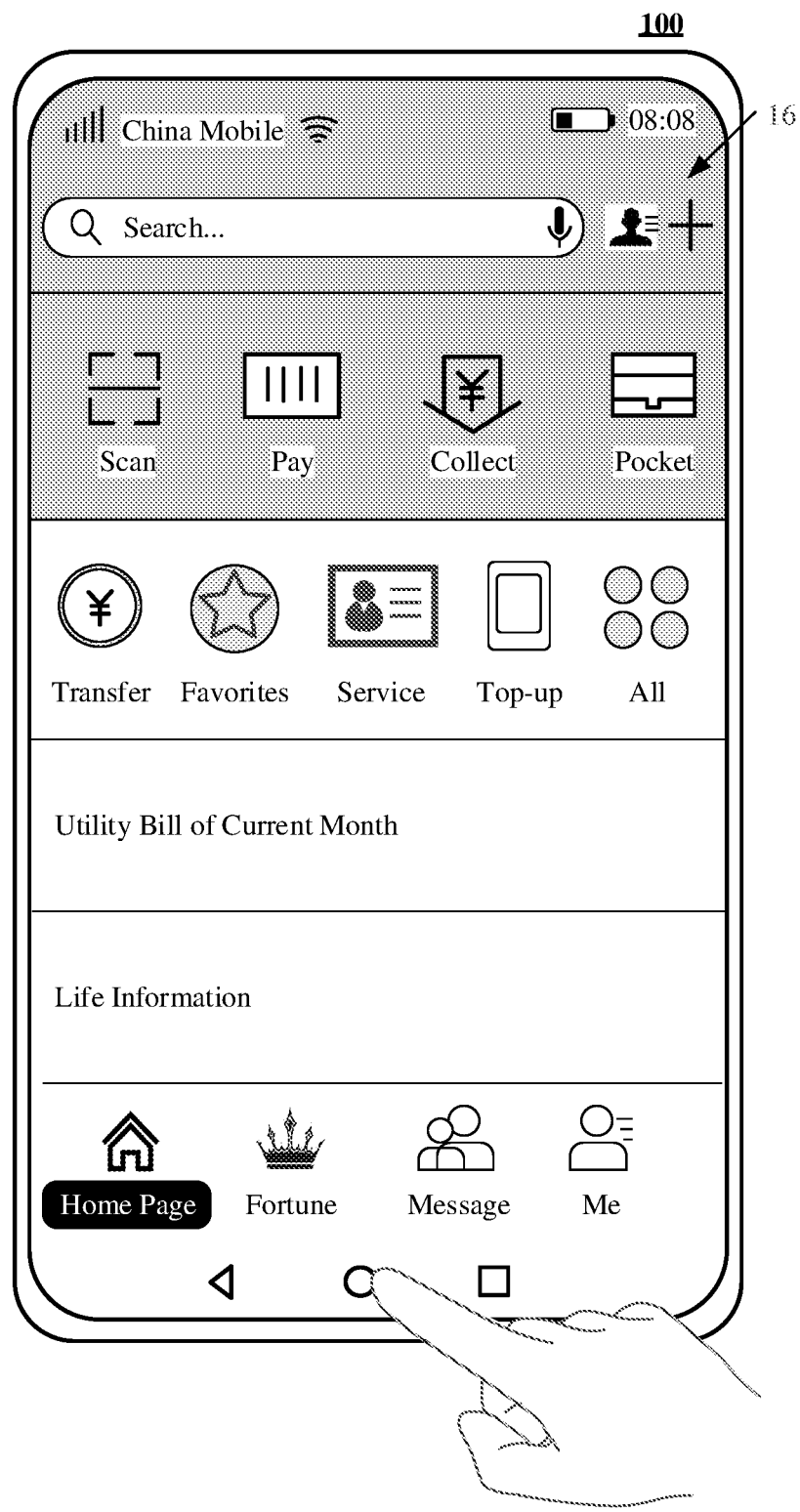
FIG. 4A to FIG. 4D are schematic diagrams of previewing a top-level application on a multitask management interface according to an embodiment of this application.

For example, as shown in FIG. 4A, the electronic device 100 displays a home page interface 16 of a payment application. A window corresponding to the home page interface 16 is not a private window. The electronic device 100 receives a touch operation 1 performed on the multitask button 205C. In response to the detected touch operation 1, the electronic device 100 displays a multitask management interface 17 shown in FIG. 4B. The multitask management interface 17 includes a page 601 corresponding to the payment application, and the page 601 includes a screenshot 601A of the home page interface 16.

Figure 4B:
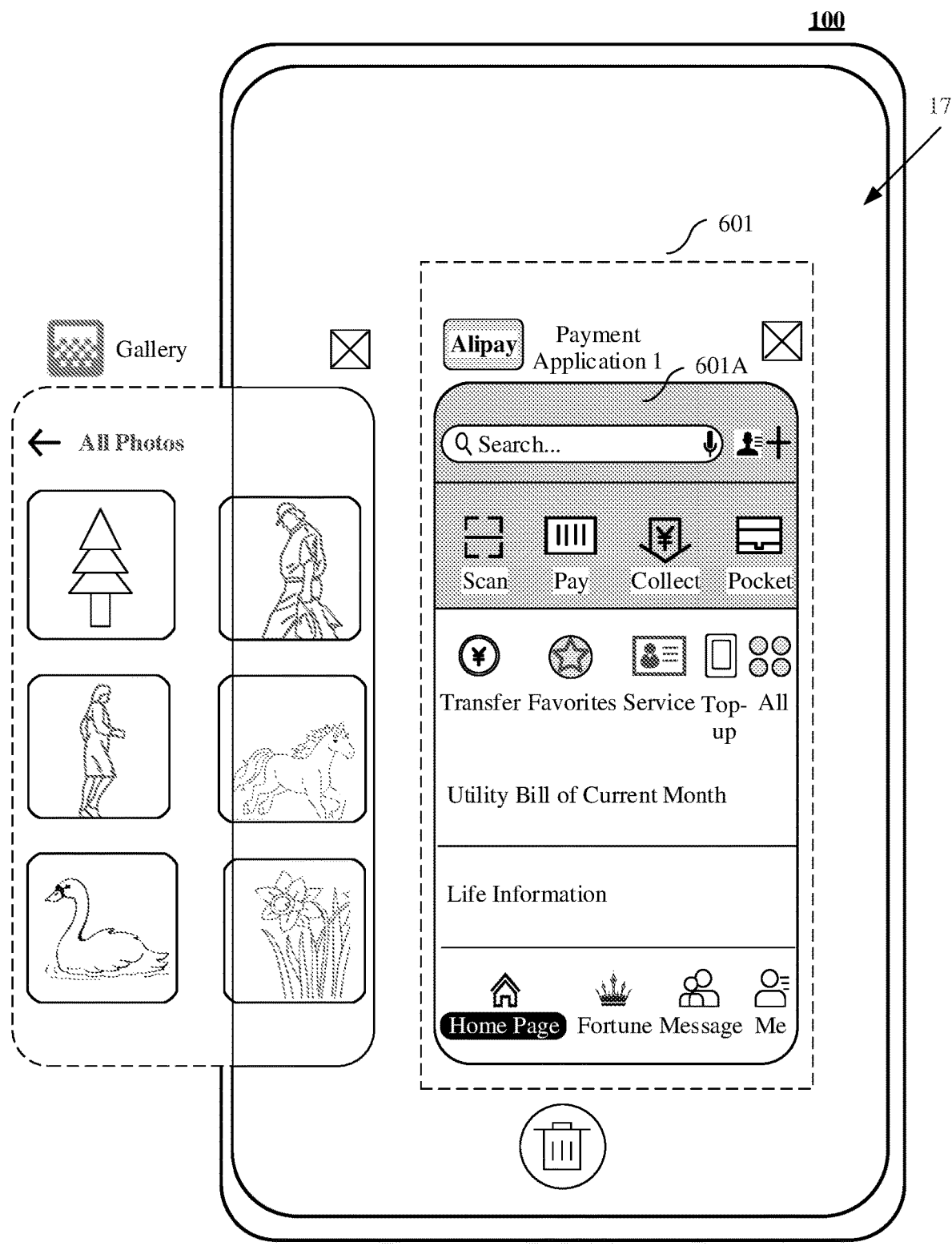
Figure 4C:
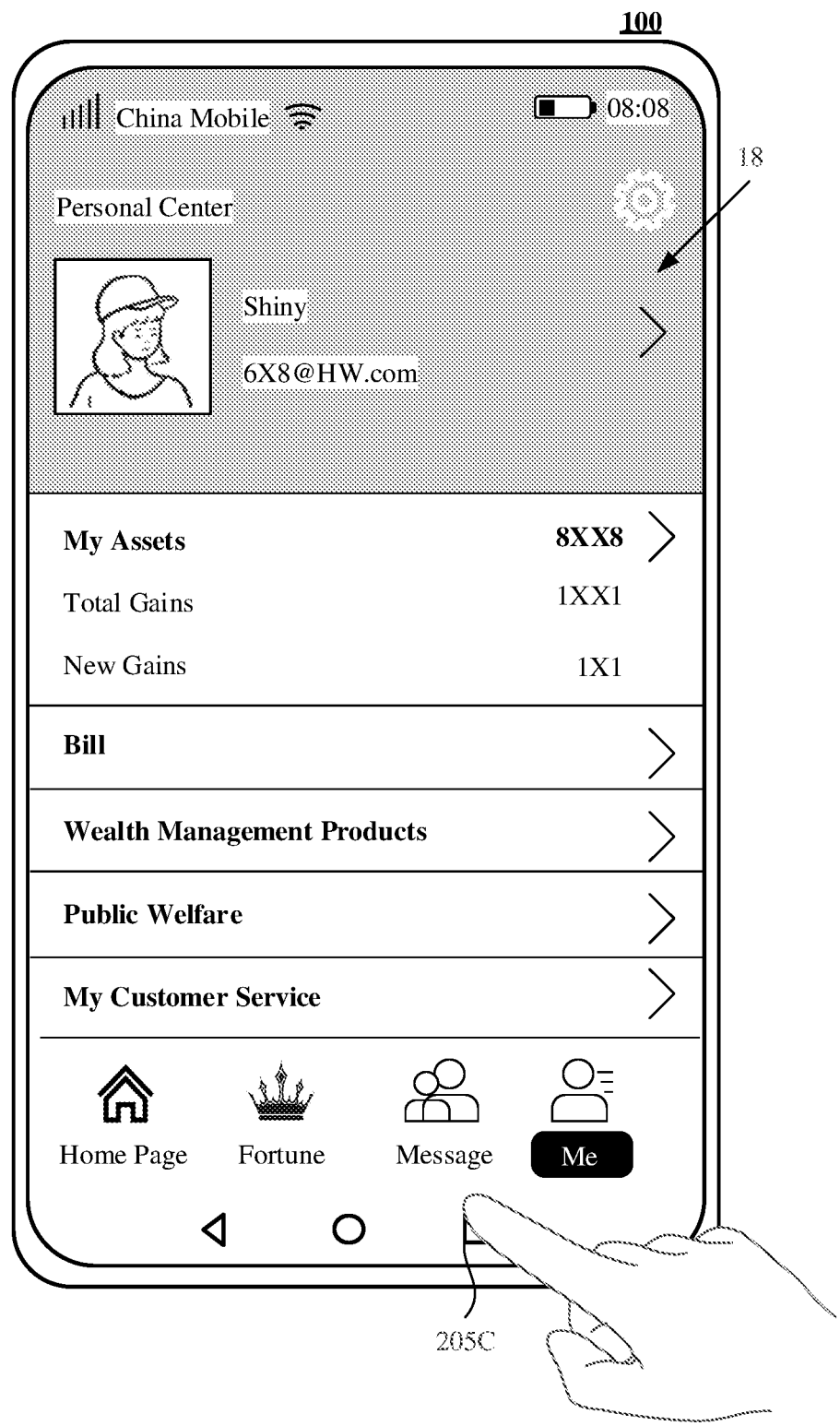

For example, as shown in FIG. 4C, the electronic device 100 displays a personal center interface 18 of a payment application, namely, a user interface used to display user information. A window corresponding to the personal center interface 18 is a private window. The electronic device 100 receives a touch operation 2 performed on the multitask button 205C. In response to the detected touch operation 2, the electronic device 100 displays a multitask management interface 19 shown in FIG. 4D. The multitask management interface 18 includes a page 602 corresponding to the payment application, and the page 602 includes a blur-processed image 602A of a screenshot of a personal center interface 18.

It should be noted that, when the electronic device 100 receives the touch operation 1 or the touch operation 2, the payment application is a top-level application in a task stack of the electronic device 100.

Figure 4D:
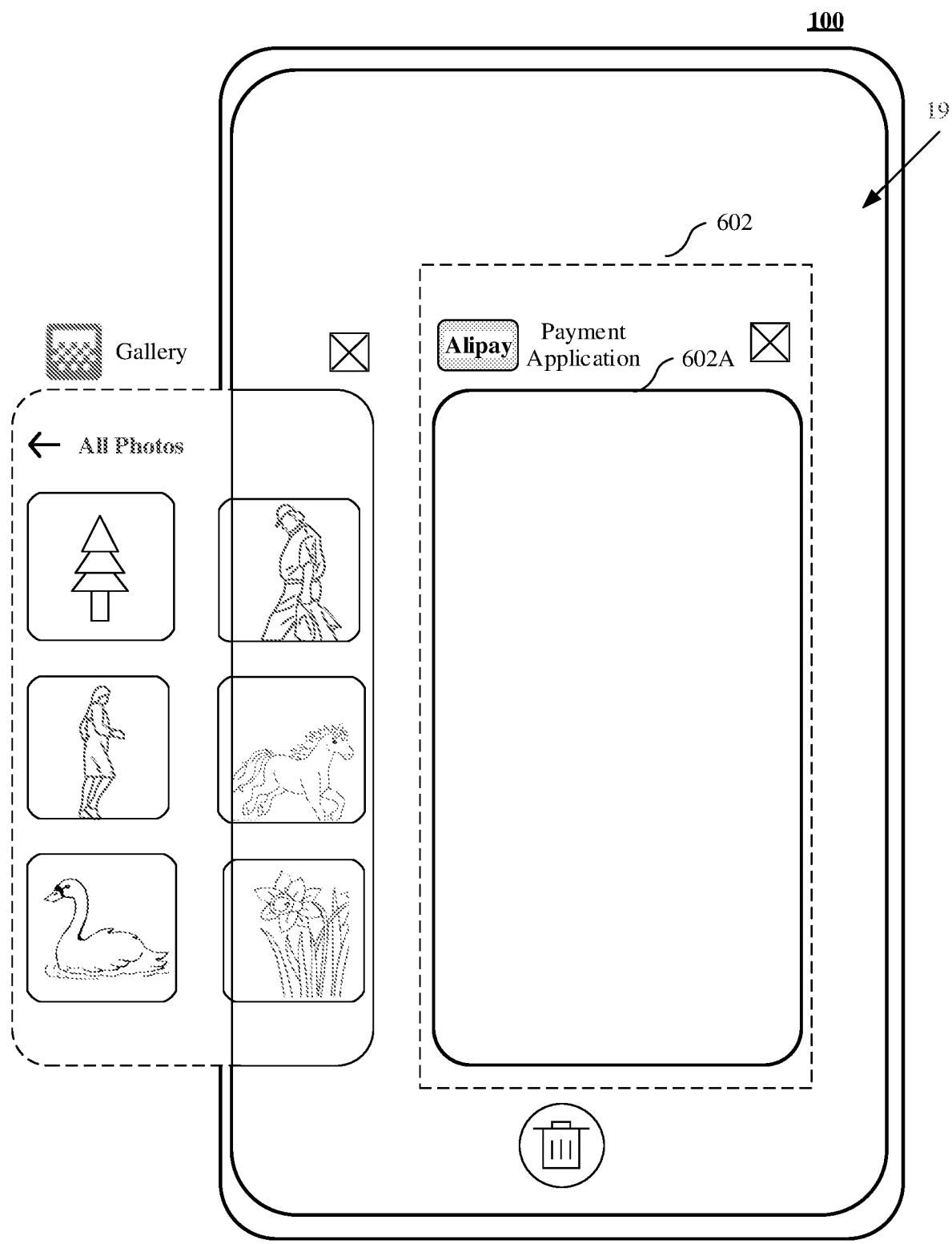
Figure 4E:
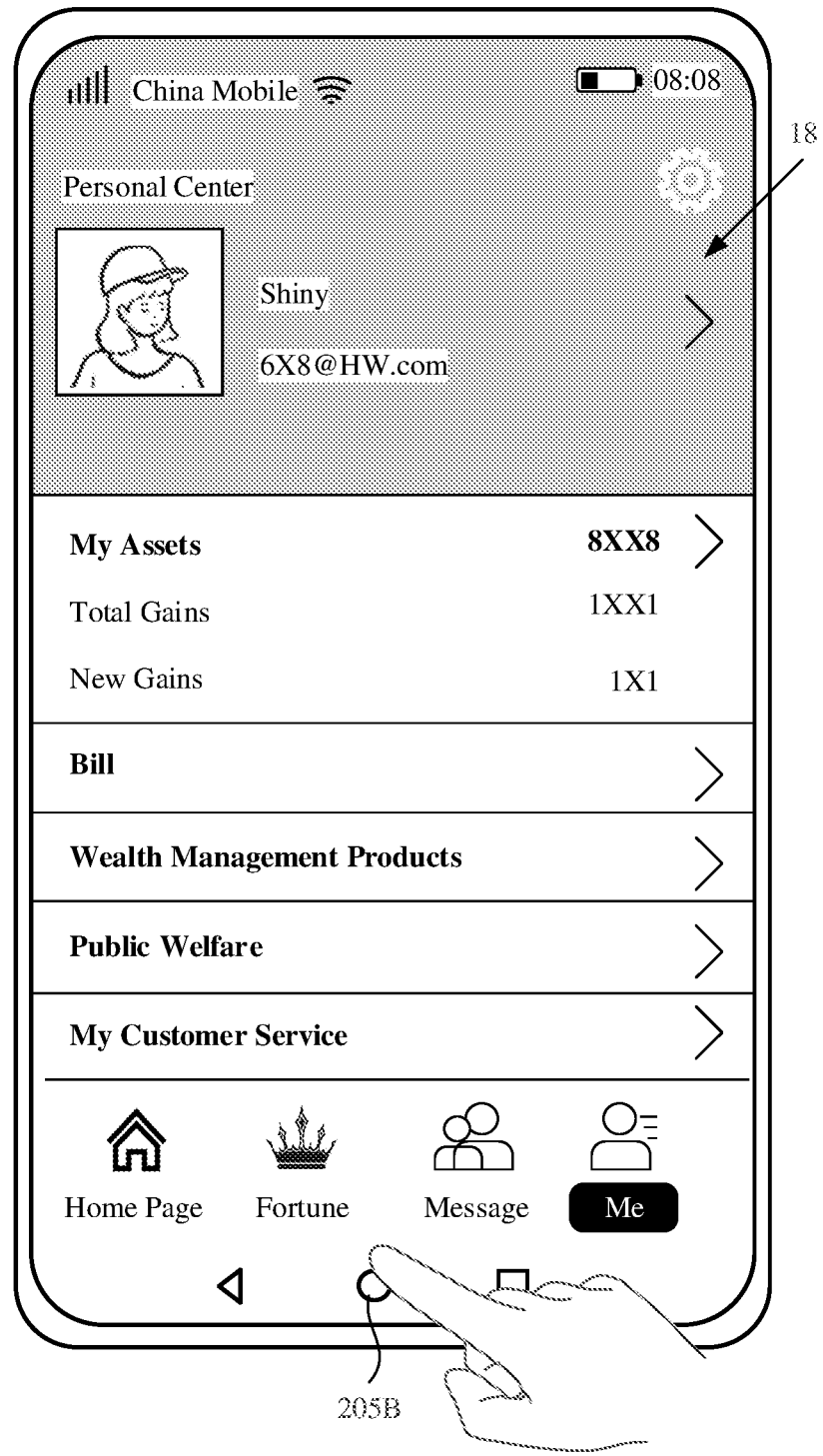
FIG. 4E to FIG. 4J are schematic diagrams of previewing a non-top-level application on a multitask management interface according to an embodiment of this application.
Figure 4F:
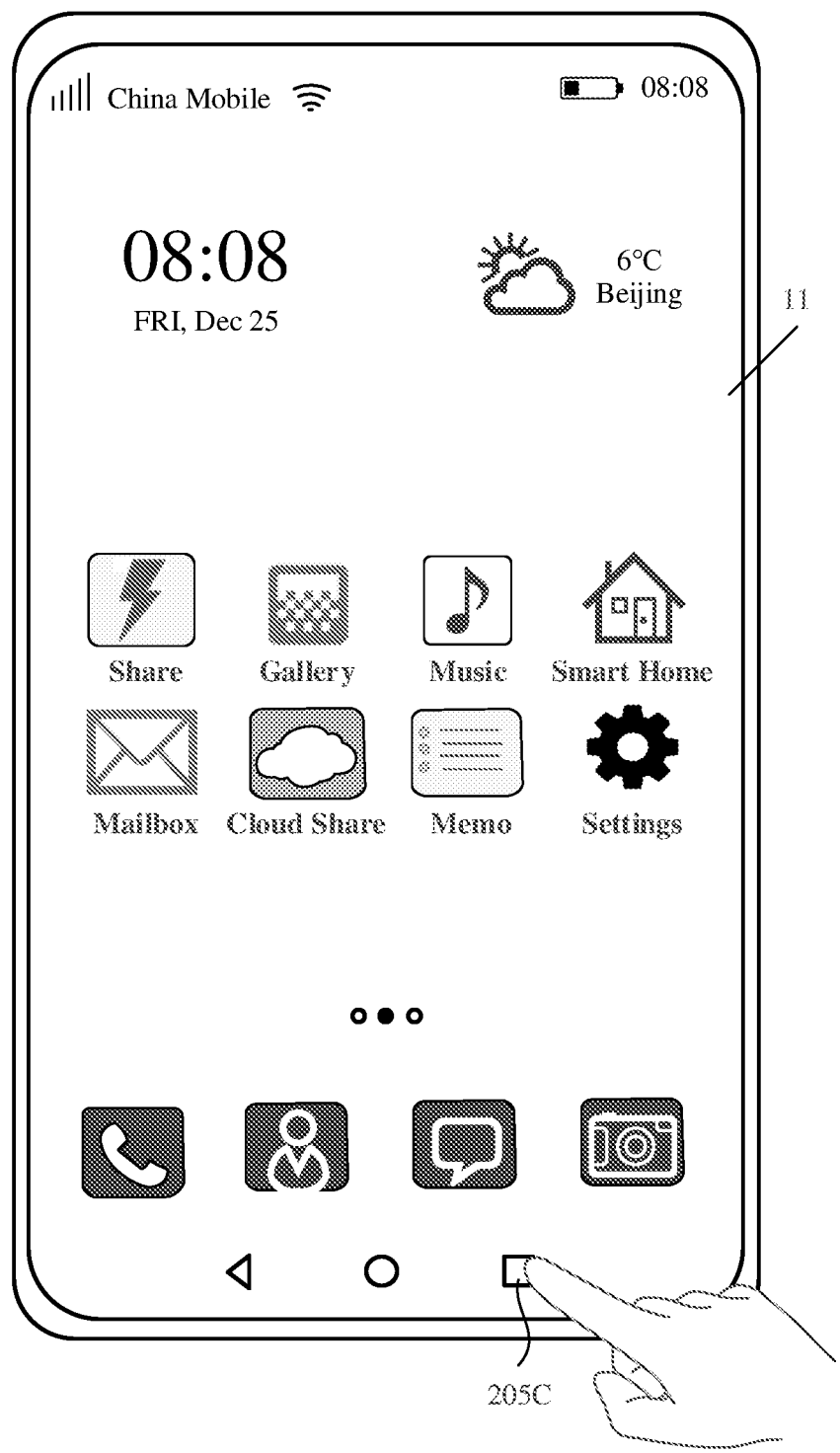

For example, as shown in FIG. 4E, the electronic device 100 displays a personal center interface 18 of a payment application. The window corresponding to the personal center interface 18 is the private window. The electronic device 100 may receive a touch operation 3 performed on a home screen button 205B. In response to the detected touch operation 3, the electronic device 100 displays the user interface 11 shown in FIG. 4D. As shown in FIG. 4F, the electronic device 100 may receive a touch operation 4 performed on the multitask button 205C. In response to the detected touch operation 4, the electronic device 100 displays a multitask management interface 20 shown in FIG. 4G. The multitask management interface 20 includes a page 603 corresponding to the payment application, and the page 603 includes a blur-processed image 603A of the screenshot of the personal center interface 18.

Figure 4G:
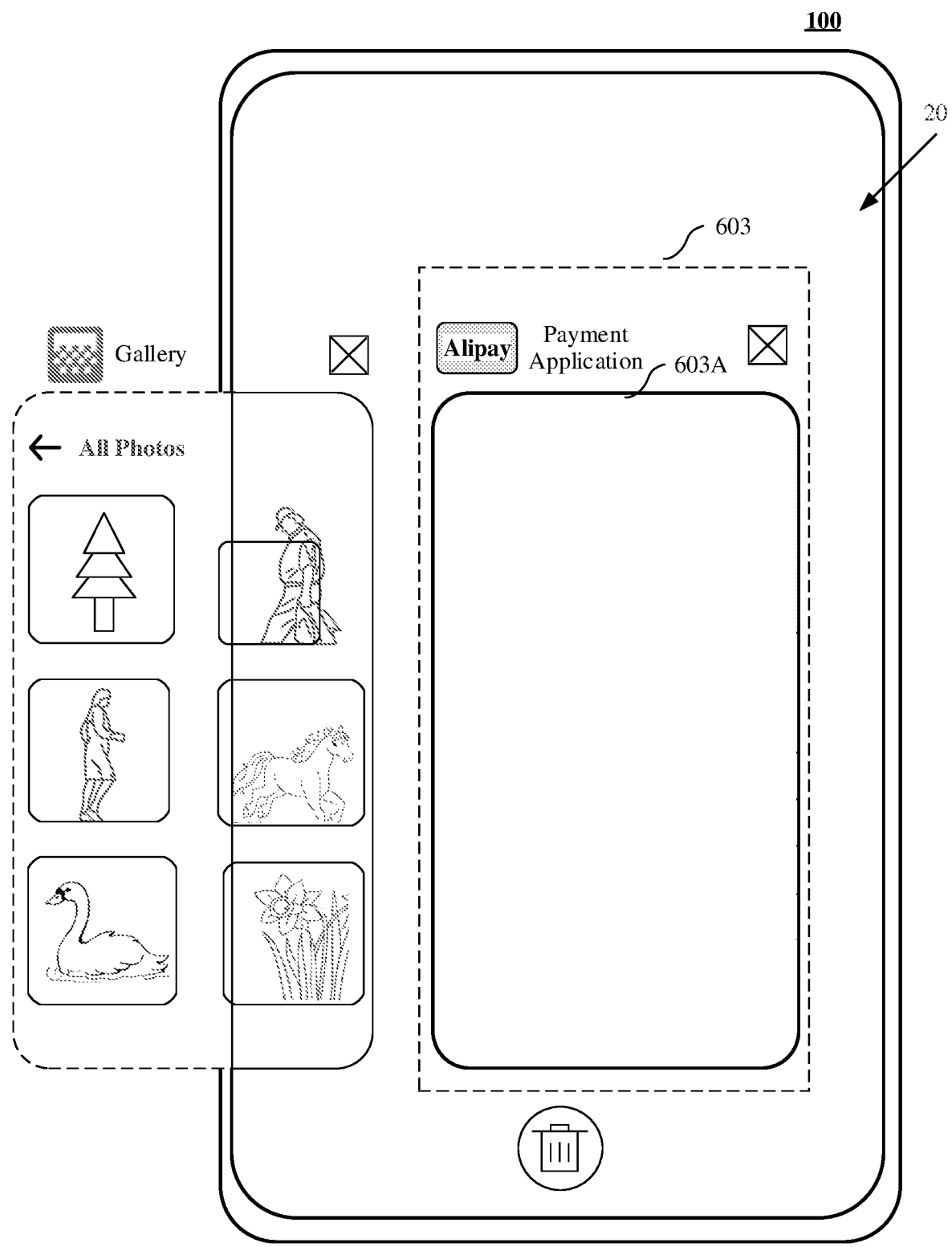
Figure 4H:
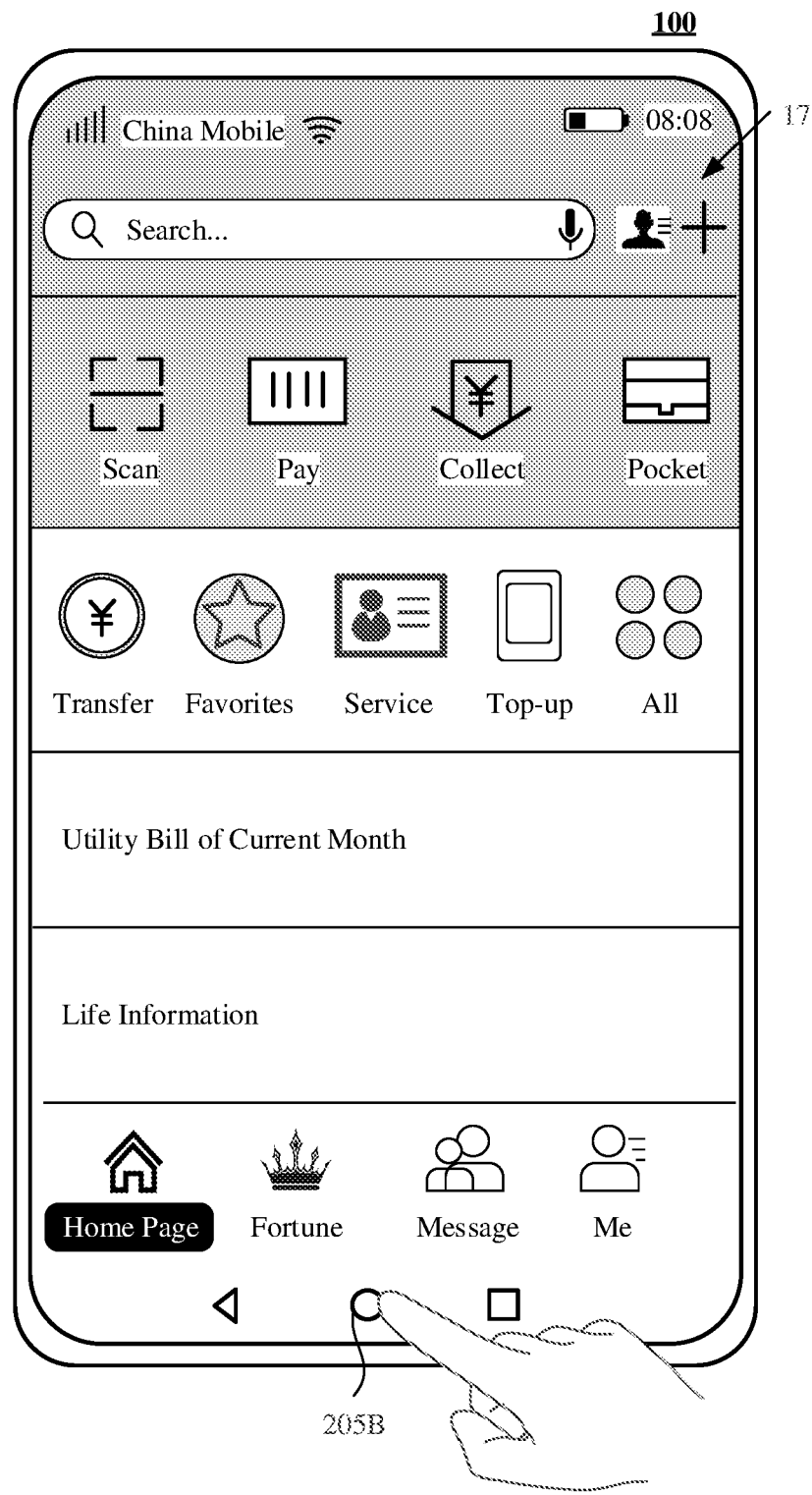
Figure 4I:

For example, as shown in FIG. 4H, the electronic device 100 displays a home page interface 17 of a payment application. A window corresponding to the home page interface 17 is not a private window. The electronic device 100 may receive a touch operation 5 performed on the home screen button 205B. In response to the detected touch operation 5, the electronic device 100 displays the user interface 11 shown in FIG. 4I. As shown in FIG. 4I, the electronic device 100 may receive a touch operation 6 performed on the multitask button 205C. In response to the detected touch operation 6, the electronic device 100 displays a multitask management interface 21 shown in FIG. 4J. The multitask management interface 20 includes a page 604 corresponding to the payment application, and the page 601 includes a screenshot 604A of the home page interface 17.

It should be noted that, when the electronic device 100 receives the touch operation performed on the home screen button 205B, the payment application is the top-level application in the task stack of the electronic device 100. As shown in FIG. 4F and FIG. 4I, when the electronic device 100 receives the touch operation 4 or the touch operation 6, a desktop application corresponding to the user interface 11 is the top-level application in the task stack of the electronic device 100, and the payment application is degraded to a sub-top-level application in the task stack of the electronic device 100.

In Embodiment 1, a blur degree of blur processing may be preset by the electronic device 100, or may be preset by the user. For example, the blur degree of blur processing is 90%. In this case, the user cannot distinguish information such as a text or an image in a screenshot obtained by performing blur processing.

Embodiment 2

In some embodiments of this application, when the electronic device 100 displays a user interface 1 of an application 1 (in this case, the application 1 is a top-level application, and the application 1 is running on the foreground), the user interface of the application 1 is switched to a multitask management interface. Regardless of whether the user interface 1 is a user interface of a private window, the electronic device 100 does not perform blur processing on a screenshot of the user interface 1 of the top-level application. The multitask management interface includes the screenshot of the user interface 1. After the application 1 is switched to run in the background on the displayed user interface 1, the electronic device 100 displays a user interface of an application 2 (in this case, the application 1 is not a top-level application), and switches the user interface of the application 2 to the multitask management interface. If a window corresponding to the user interface 1 is a private window, the multitask management interface includes a blur-processed image of the screenshot of the user interface 1. If a window corresponding to the user interface 1 is not a private window, the multitask management interface includes the screenshot of the user interface 1.

The application 2 may be a desktop application, or may be another system application installed on the electronic device 100, or may be a third-party application installed on the electronic device 100. This is not specifically limited herein.

Figure 5A:
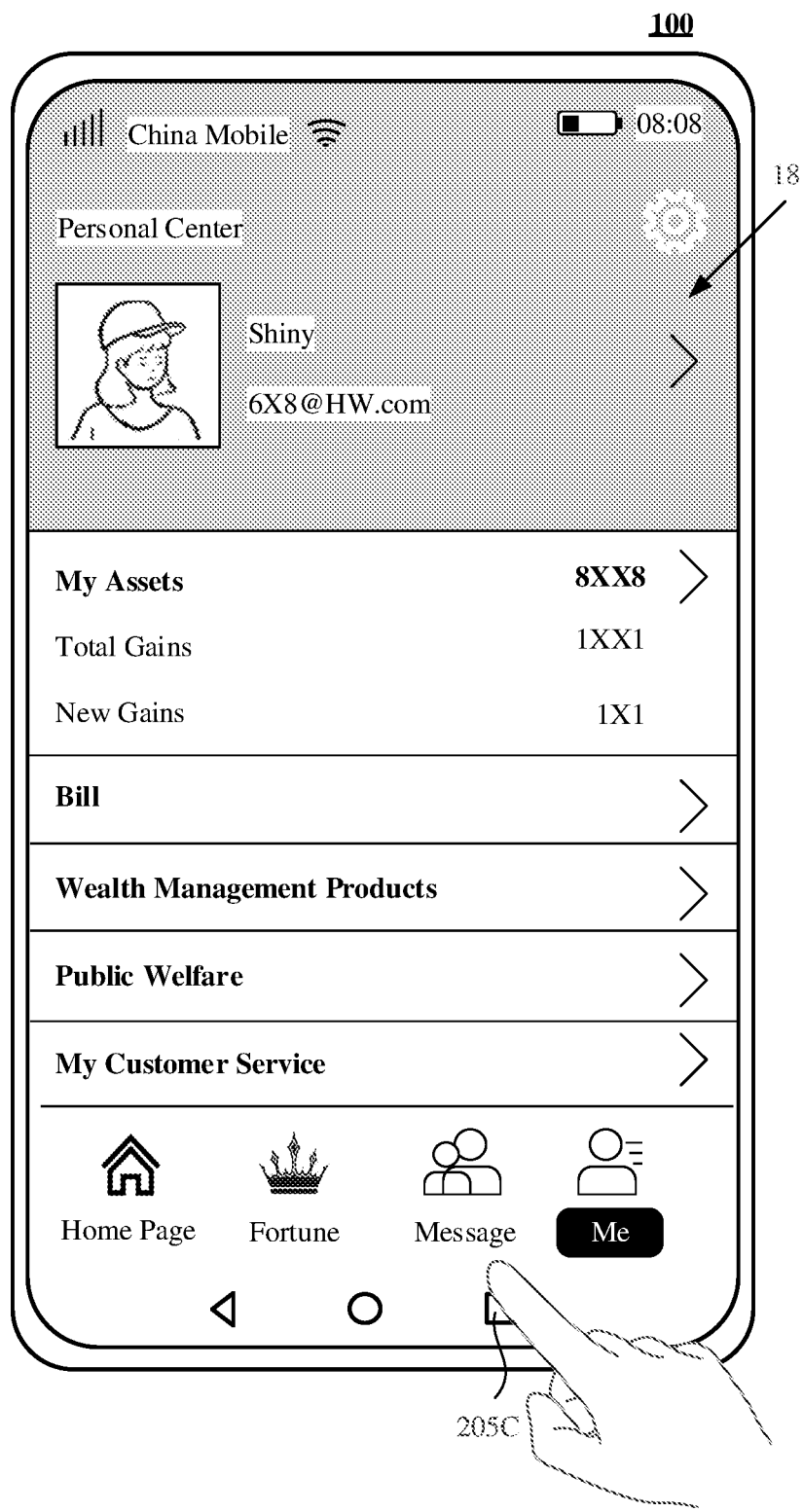
FIG. 5A and FIG. 5B are schematic diagrams of previewing another top-level application on a multitask management interface according to an embodiment of this application.

For example, as shown in FIG. 5A, the electronic device 100 displays a personal center interface 18 of a payment application, and a window corresponding to the personal center interface 18 is a private window. The electronic device 100 receives a touch operation 7 performed on the multitask button 205C. In response to the detected touch operation 7, the electronic device 100 displays a multitask management interface 22 shown in FIG. 5B. The multitask management interface 22 includes a page 605 corresponding to the payment application, and the page 605 includes a screenshot 605A of the personal center interface 18.

It should be noted that, when the electronic device 100 receives the touch operation 7, the payment application is a top-level application. When the electronic device 100 switches a user interface of a private window of the top-level application to the multitask management interface, the electronic device 100 does not need to perform blur processing on the user interface of the private window.

For interface display effect of a page corresponding to the application 1 in the multitask management interface after the application 2 is switched to the multitask management interface, refer to FIG. 4E to FIG. 4J. The application 2 may be a desktop application corresponding to the user interface 11. Details are not described herein again.

Embodiment 3

In some embodiments of this application, a window may include four privacy levels, and privacy degrees of the four privacy levels are respectively a zero privacy level, a low privacy level, a moderate privacy level, and a high privacy level in ascending order. For a user interface 2 of a non-private window, after the window is switched to run in the background, when the electronic device 100 switches a display interface to a multitask management interface, the multitask management interface includes a screenshot of the user interface 2. For a user interface 3 of a low private window, after the window is switched to run in the background, when the electronic device 100 switches a display interface to a multitask management interface, the multitask management interface includes a lowly blur-processed image of a screenshot of the user interface 3. For a user interface 4 of a moderate private window, after the window is switched to run in the background, when the electronic device 100 switches a display interface to a multitask management interface, the multitask management interface includes a moderately blur-processed image of a screenshot of the user interface 4. For a user interface 5 of a high private window, after the window is switched to run in the background, when the electronic device 100 switches a display interface to a multitask management interface, the multitask management interface includes a highly blur-processed image of a screenshot of the user interface 5.

Figure 6A:
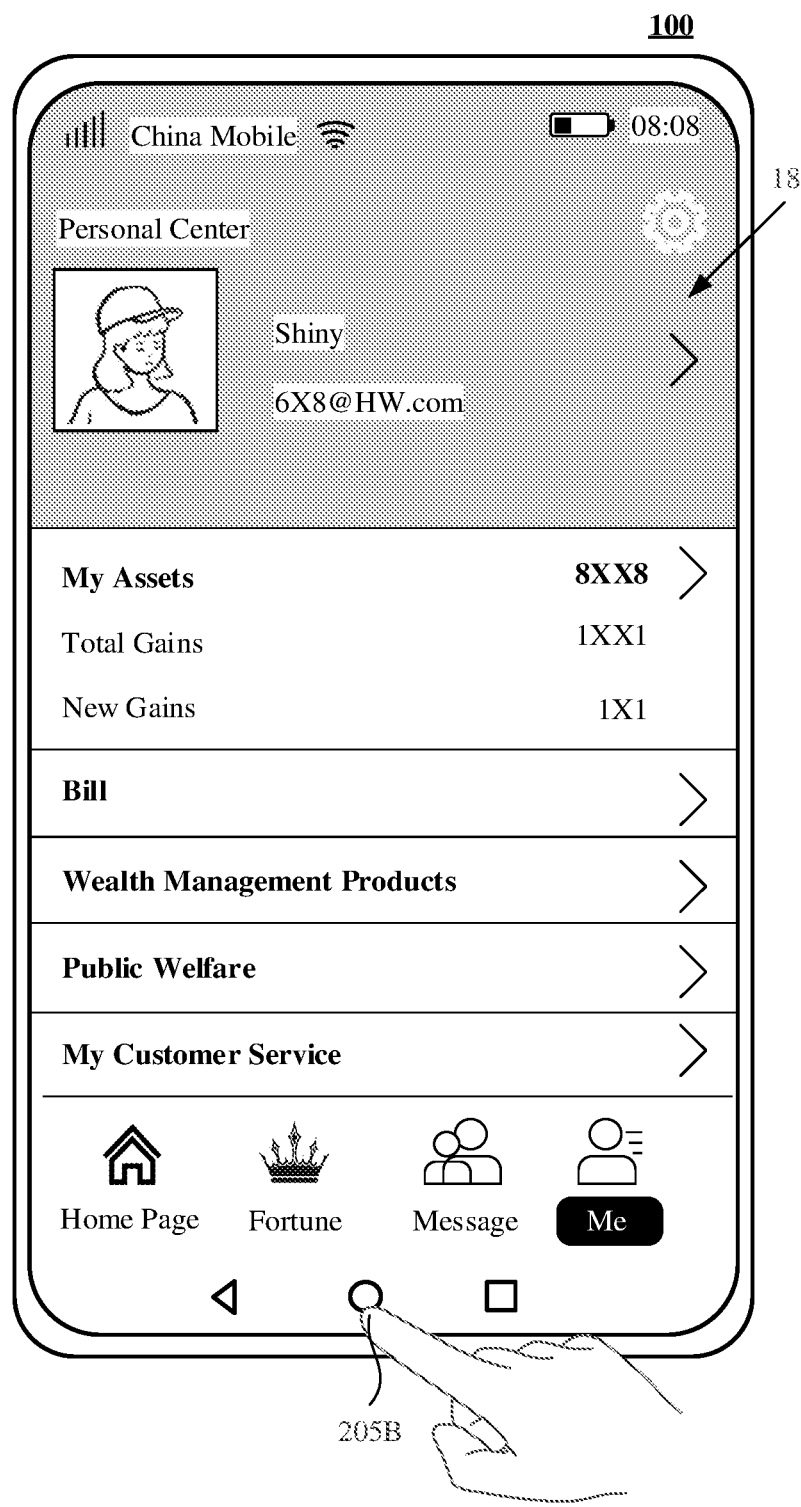
FIG. 6A to FIG. 6F are schematic diagrams of preview effect in a multitask management interface according to an embodiment of this application.

For example, as shown in FIG. 6A, the electronic device 100 displays a personal center interface 18 of a payment application. The electronic device 100 may receive a touch operation 8 performed on the home screen button 205B. In response to the detected touch operation 8, the electronic device 100 displays the user interface 11 shown in FIG. 6B.

Figure 6B:
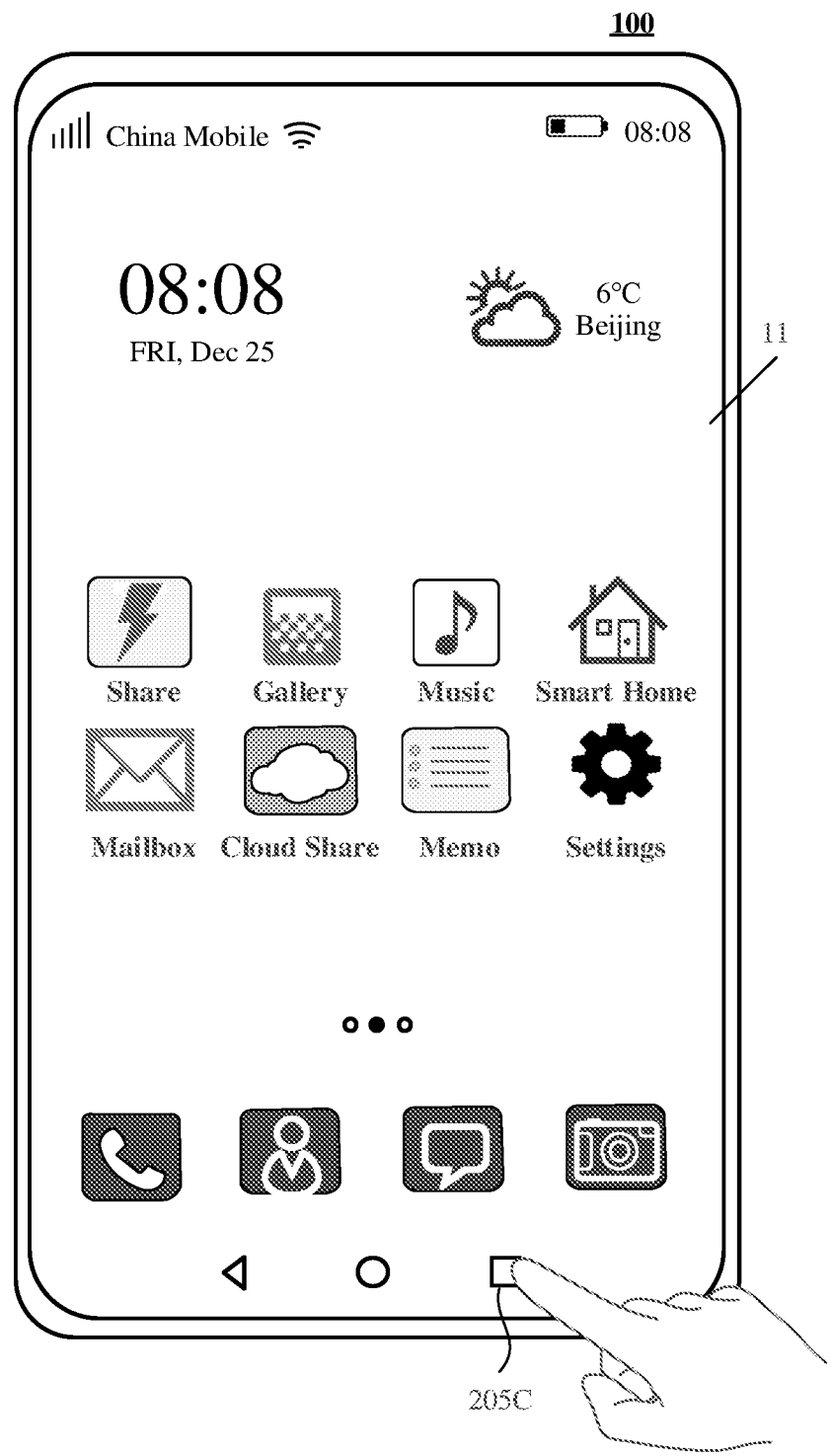
Figure 6C:
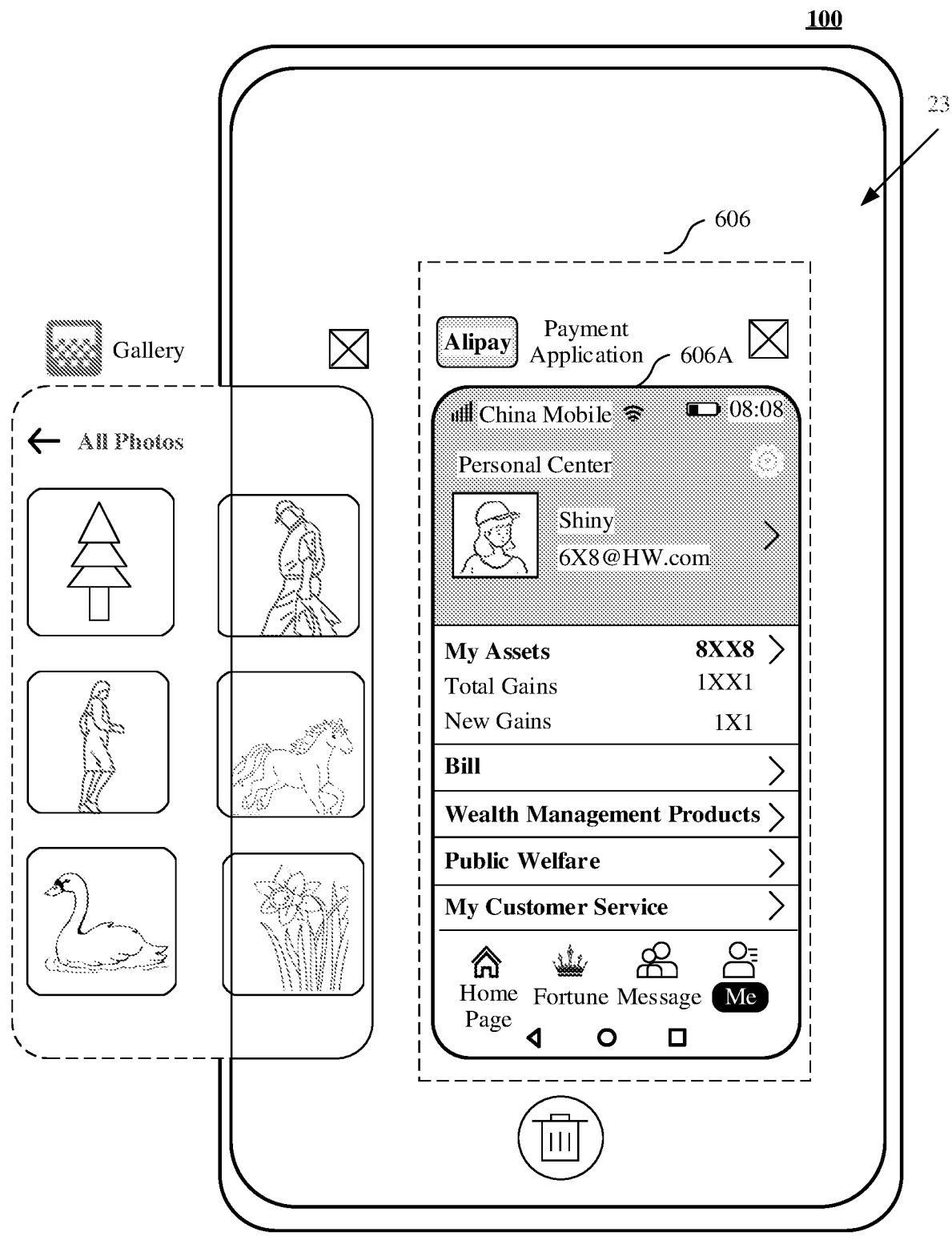

As shown in FIG. 6B, the electronic device 100 may receive a touch operation 9 performed on the multitask button 205C. When a privacy level of a window corresponding to the personal center interface 18 is the zero privacy level, in response to the detected touch operation 9, the electronic device 100 displays a multitask management interface 23 shown in FIG. 6C. The multitask management interface 23 includes a page 606 corresponding to the payment application, and the page 606 includes a screenshot 606A of the personal center interface 18. When a privacy level of a window corresponding to the personal center interface 18 is the low privacy level, in response to the detected touch operation 9, the electronic device 100 displays a multitask management interface 23 shown in FIG. 6D. The multitask management interface 23 includes a page 607 corresponding to the payment application, and the page 607 includes a lowly blur-processed image 607A of a screenshot of the personal center interface 18. When a privacy level of a window corresponding to the personal center interface 18 is the moderate privacy level, in response to the detected touch operation 9, the electronic device 100 displays a multitask management interface 23 shown in FIG. 6E. The multitask management interface 23 includes a page 608 corresponding to the payment application, and the page 608 includes a moderately blur-processed image 608A of a screenshot of the personal center interface 18. When a privacy level of a window corresponding to the personal center interface 18 is the high privacy level, in response to the detected touch operation 9, the electronic device 100 displays a multitask management interface 23 shown in FIG. 6F. The multitask management interface 23 includes a page 609 corresponding to the payment application, and the page 609 includes a highly blur-processed image 609A of a screenshot of the personal center interface 18.

In some embodiments, the page 607 may further include prompt information 607B. The prompt information 607B may be detailed as follows: The page is a privacy page, and is lowly blur-processed. The page 608 may further include prompt information 608B. The prompt information 608B may be detailed as follows: The page is a privacy page, and is moderately blur-processed. The page 609 may further include prompt information 609B. The prompt information 609B may be detailed as follows: The page is a privacy page, and is highly blur-processed.

In some embodiments, a privacy level of a window may alternatively include at least one of the zero privacy level, the low privacy level, the moderate privacy level, and the high privacy level. In some embodiments, without being limited to the low privacy level, the moderate privacy level, and the high privacy level, the window may further have another privacy level. This is not specifically limited in this embodiment of this application. For example, the privacy level of the window further includes a moderate-high privacy level. The moderate-high privacy level is higher than the low privacy level and lower than the high privacy level.

In some embodiments of this application, windows with the low privacy level, the moderate privacy level, the moderate-high privacy level, and the high privacy level are referred to as a private window, and a window with the zero privacy level is not a private window.

In some embodiments, blur degrees of low blur processing, moderate blur processing, and high blur processing may be preset by the electronic device 100, or may be preset by the user. For example, the blur degree of low blur processing is 80%, the blur degree of moderate blur processing is 90%, and the blur degree of high blur processing is 98%.

Figure 6D:
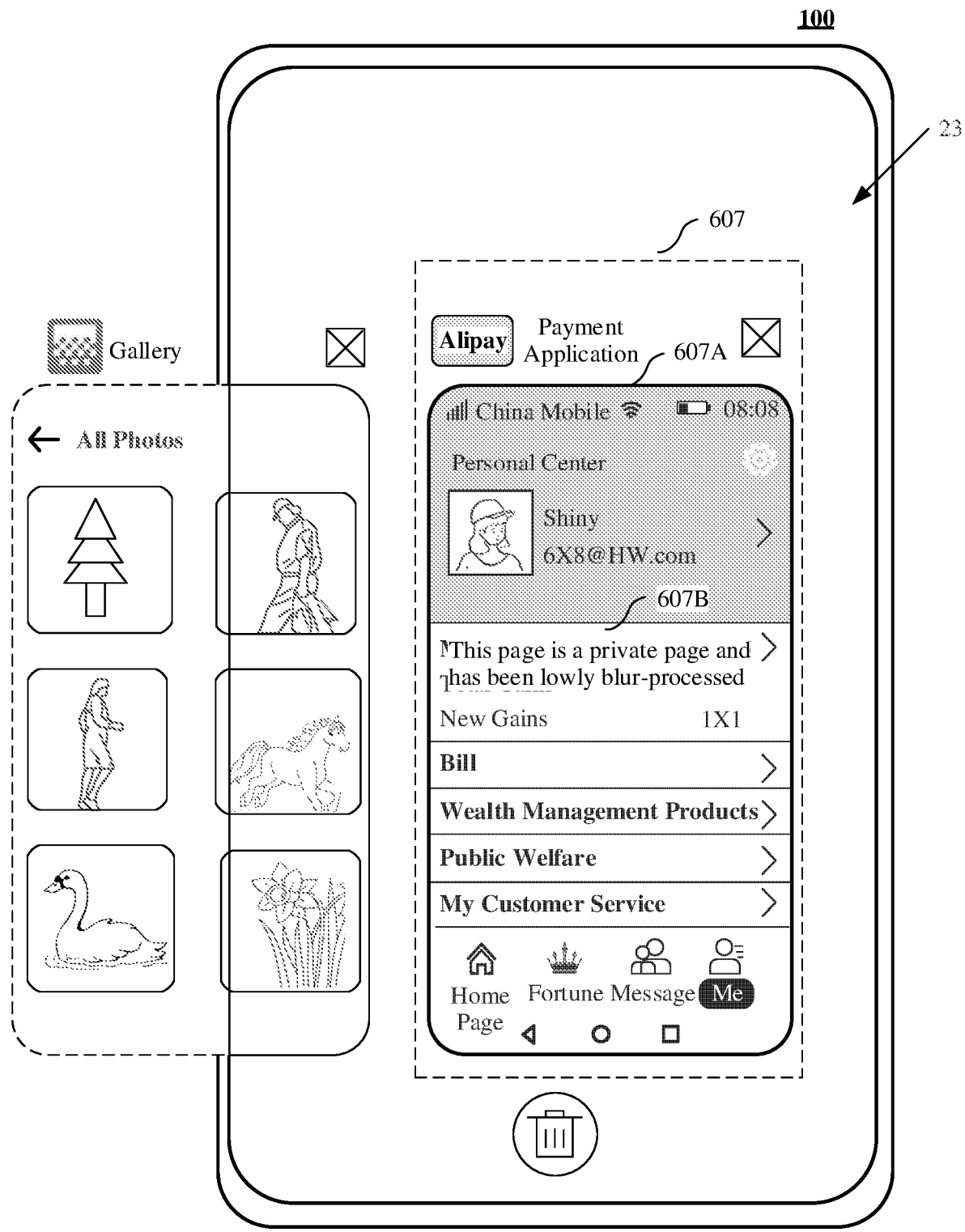
Figure 6E:
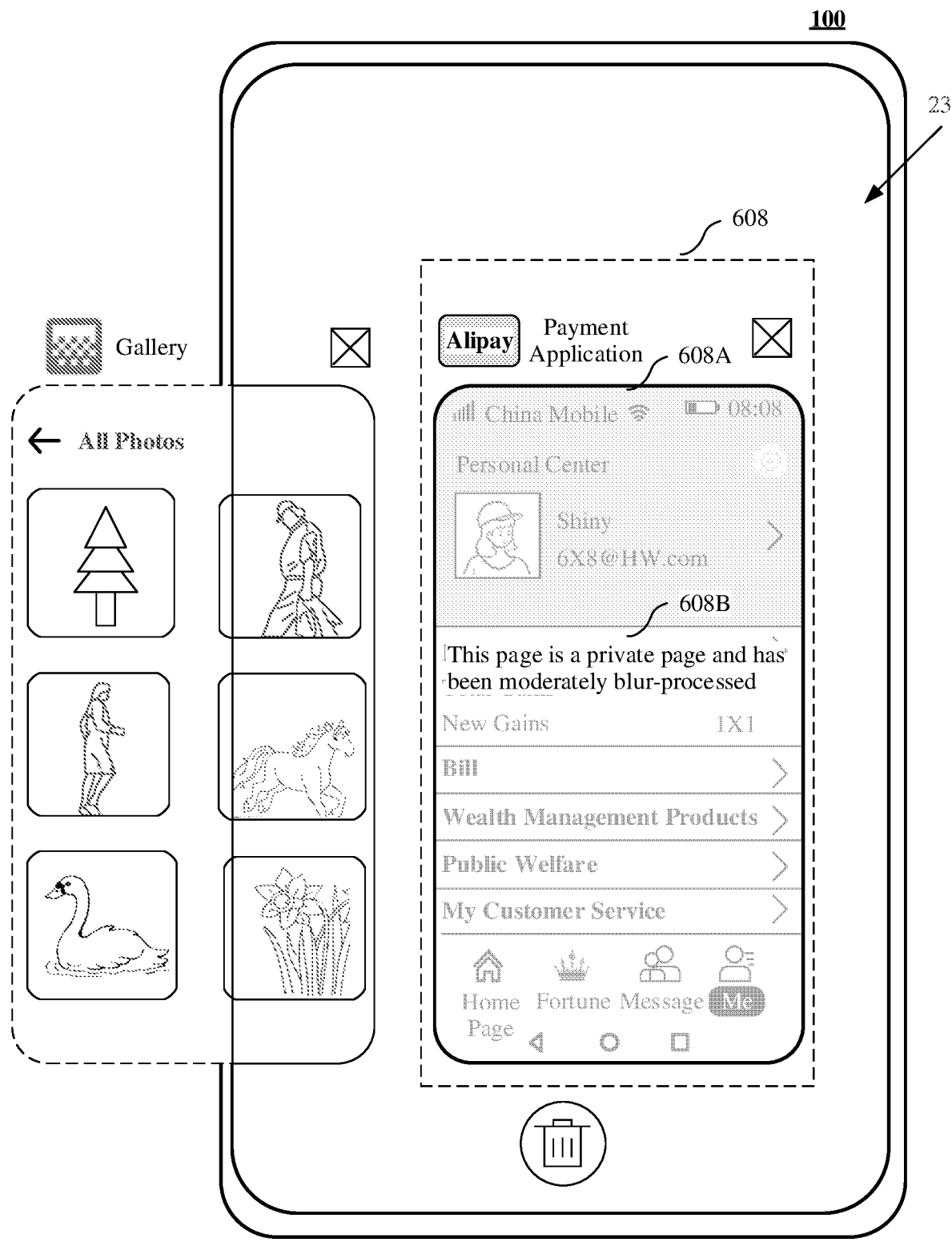
Figure 6F:
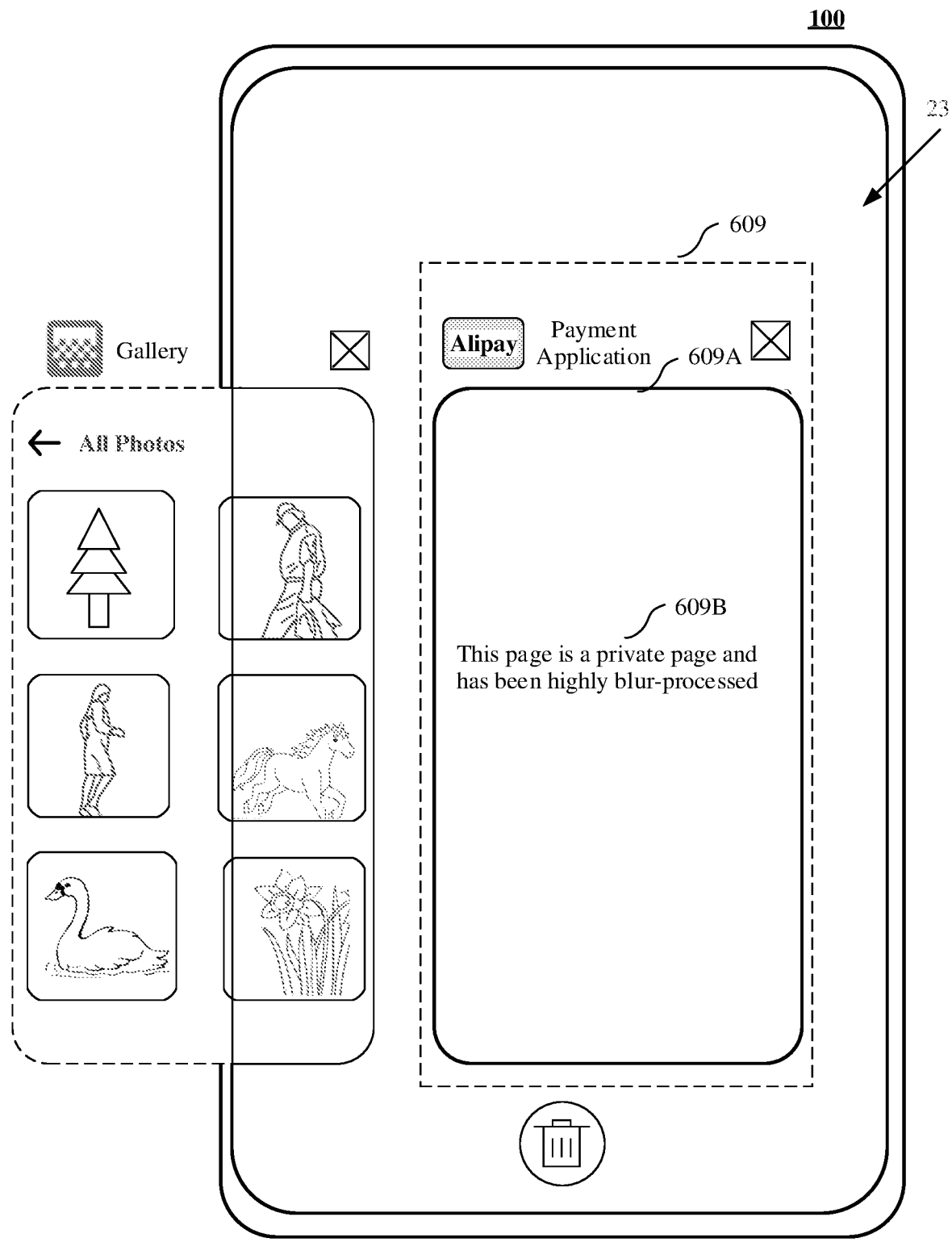

It should be noted that the low blur processing, moderate blur processing, and high blur processing are relative concepts provided in embodiments of this application, and should not constitute a limitation on the solutions provided in embodiments of this application. Refer to FIG. 6D to FIG. 6F. Low blur processing, moderate blur processing, high blur processing, and the like may be directly learned by comparing user interface effect displayed through blur processing. The blur degree of high blur processing is greater than the blur degree of moderate blur processing, and the blur degree of moderate blur processing is greater than the blur degree of low blur processing.

In some embodiments, in a lowly blur-processed image, text information and details of an object in the image cannot be distinguished, but an interface layout (namely, locations of different controls), an outline of the control, an outline of the object in the image, and different colors in an interface may be distinguished. In a moderately blur-processed image, text information, details of image information, an outline of an object in the image, an outline of a control, and a color of a small area cannot be distinguished, but an interface layout and a color of a large area can be distinguished. In a highly blur-processed image, text information, details of image information, an outline of an object in the image, an interface layout, an outline of a control, and a color of a small area cannot be distinguished. In this embodiment of this application, the lowly blur-processed image, the moderately blur-processed image, and the highly blur-processed image may further have other display features, without being limited to the foregoing display features. This is not specifically limited in this embodiment of this application.

In some embodiments of this application, the electronic device 100 may use a block blur algorithm to perform blur processing on a screenshot of an application. The box blur algorithm is also referred to as box blur. A value of each pixel in an image processed according to the box blur algorithm is equal to an average value of adjacent pixels of each pixel in an input image. The box blur algorithm is a form of low-pass filter.

In some embodiments, when blur processing is performed according to a blur algorithm, an image may be scaled down by adjusting a downsampling rate, to improve image blurring efficiency. In some embodiments, when blur processing is performed according to a blur algorithm, saturation of the image may be adjusted. The saturation is brightness of a color. Larger saturation indicates that an image color is less close to grayscale, and smaller saturation indicates that the image color is closer to grayscale. It can be understood that a color blur degree of the image may be increased by reducing saturation. In some embodiments, when blur processing is performed according to a blur algorithm, a mask (mask) may be added to the image, and a mask color value (mask color) of the mask may be adjusted. The mask is used to protect a selected or specified area from being affected by an editing operation, and plays a role of masking. Adding the mask to the image may be implemented by superimposing a translucent layer on a preset area of the image, and the mask color value of the mask is a color value of the translucent layer. In embodiments of this application, blur effect of a blur-processed image can be more natural by adjusting the saturation and the mask color value.

In some embodiments, different blur effect may be implemented by adjusting parameters such as a blur radius, the saturation, the downsampling rate, or the mask color value. For example, in an implementation, a parameter setting during low blur processing is as follows: A value of the blur radius is "22 dp", a value of the saturation is "1.2 f", a value of the downsampling rate is "24", and a value of the mask color value is "#4CFFFFFF". A parameter setting during high blur processing is as follows: A value of the blur radius is "75 dp", a value of the saturation is "1.5 f", a value of the downsampling rate is "30", and a value of the mask color value is "#4CFFFFFF". The blur degree of high blur processing is greater than the blur degree of low blur processing.

It should be noted that, without being limited to the block blur algorithm, in this embodiment of this application, blur processing may be further performed on the screenshot of the application according to another blur processing algorithm, for example, a Gaussian blur algorithm, a dual blur algorithm, a Bokeh blur algorithm, or a tilt shift blur algorithm.

It should be noted that, currently, an electronic device has a preview solution of displaying some white screens or black screens on a multitask management interface, that is, for some specific windows, the electronic device displays a preview image of a user interface with white screen or black screen effect, to protect these specific windows, for example, payment QR code, certificate information and other user interfaces. This implementation is implemented by forbidding screenshots of content in the specific windows, instead of a solution related to this application: A screenshot may be taken on a user interface of an application, and blur processing may be performed on the screenshot. For example, as shown in FIG. 6F, for a high private window, the electronic device 100 performs high blur processing on a screenshot corresponding to the window, and the multitask management interface displays the highly blur-processed image of the screenshot. The finally presented visual effect may be similar to the foregoing white screen preview solution, for example, a highly blur-processed image may be represented as a white image, and valid information cannot be identified. However, the solution is essentially different. As shown in FIG. 6D, for a low private window, the user may preview information such as an interface layout and a control outline of the window through the multitask management interface, which is significantly different from the white screen preview solution. In this way, implementing the solution in this embodiment of this application can meet diversified privacy requirements of the user for different windows, and effectively improve user experience.

Based on the embodiments of the information display method shown in FIG. 4A to FIG. 6A, the following specifically describes the privacy information processing method provided in embodiments of this application.

Figure 7A:
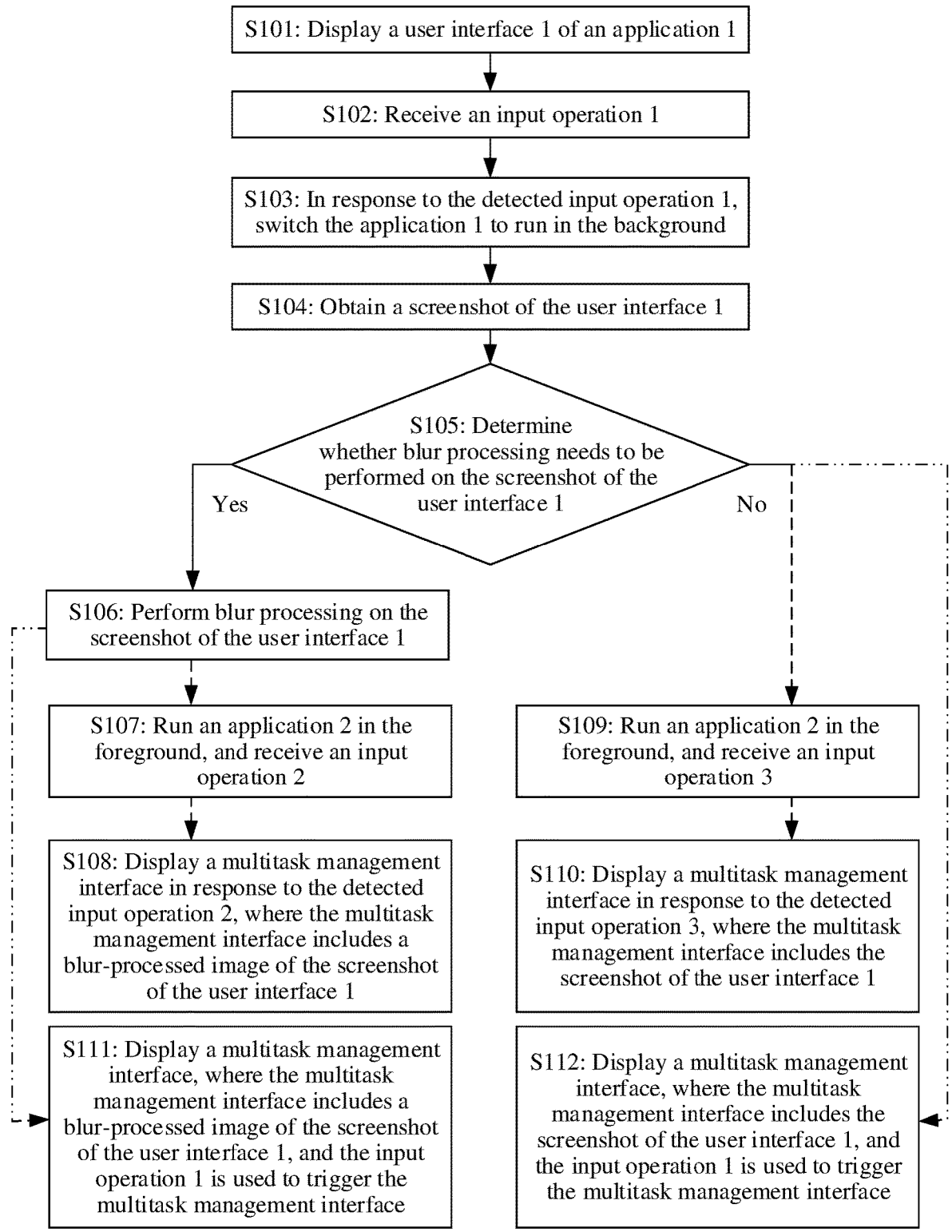
FIG. 7A is a schematic flowchart of an information display method according to an embodiment of this application.

FIG. 7A shows an information display method according to an embodiment of this application. The information display method includes but is not limited to steps S101 to S111.

S101: The electronic device 100 displays a user interface 1 of an application 1.

S102: The electronic device 100 receives an input operation 1.

S103: In response to the detected input operation 1, the electronic device 100 switches the application 1 to run in the background, and adds a window 1 corresponding to the user interface 1 to a multitask queue.

In some embodiments, the input operation 1 is used to switch the application 1 running in the foreground to another application.

For example, refer to FIG. 4E. The application 1 may be a payment application, and the user interface 1 may be a personal center interface 18. Refer to FIG. 4H. The application 1 may be a payment application, and the user interface 1 may be a home page interface 16. Refer to FIG. 4E and FIG. 4F. The input operation 1 may be a touch operation performed on the home screen button 205B. An application 2 may be a desktop application. In response to the input operation 1, the electronic device 100 may switch the application 1 to run in the background, and display a user interface 11 of the desktop application.

S104: The electronic device 100 obtains a screenshot of the user interface 1.

S105: The electronic device 100 determines whether blur processing needs to be performed on the screenshot of the user interface 1. If blur processing needs to be performed, the electronic device 100 performs step S106.

In some embodiments, when the window corresponding to the user interface 1 is a private window, the electronic device 100 determines that blur processing needs to be performed on the screenshot of the user interface 1.

S106: The electronic device 100 performs blur processing on the screenshot of the user interface 1.

In some embodiments of this application, after step S106, the privacy processing method may further include step S107 and step S108.

S107: The electronic device 100 runs the application 2 in the foreground, and receives an input operation 2.

S108: Display a multitask management interface 1 in response to the detected input operation 2, where the multitask management interface 1 includes a blur-processed image of the screenshot of the user interface 1.

For example, the user interface 1 of the application 1 is the personal center interface 18 shown in FIG. 4E. The application 2 is a desktop application shown in FIG. 4F. The input operation 2 is a touch operation performed on the multitask button 205C, as shown in FIG. 4F. The multitask management interface 1 may be a multitask management interface 20 shown in FIG. 4G. A window corresponding to the personal center interface 18 is a private window. After obtaining a screenshot of the personal center interface 18, the electronic device 100 performs blur processing on the personal center interface 18. Refer to FIG. 4G. In response to a touch operation performed on the multitask button 205C, the electronic device 100 displays the multitask management interface 20. The multitask management interface 20 includes a page 603 corresponding to a payment application, and the page 603 is used to display a blur-processed image 603A of the screenshot of the personal center interface 18.

In some embodiments of this application, in step S105, if the electronic device 100 determines that blur processing does not be performed on the screenshot of the user interface 1, after step S106, the privacy processing method may further include step S109 and step S110.

S109: Run the application 2 in the foreground, and receive an input operation 3.

S110: Display a multitask management interface 2 in response to the detected input operation 3, where the multitask management interface 2 includes the screenshot of the user interface 1.

Figure 4J:
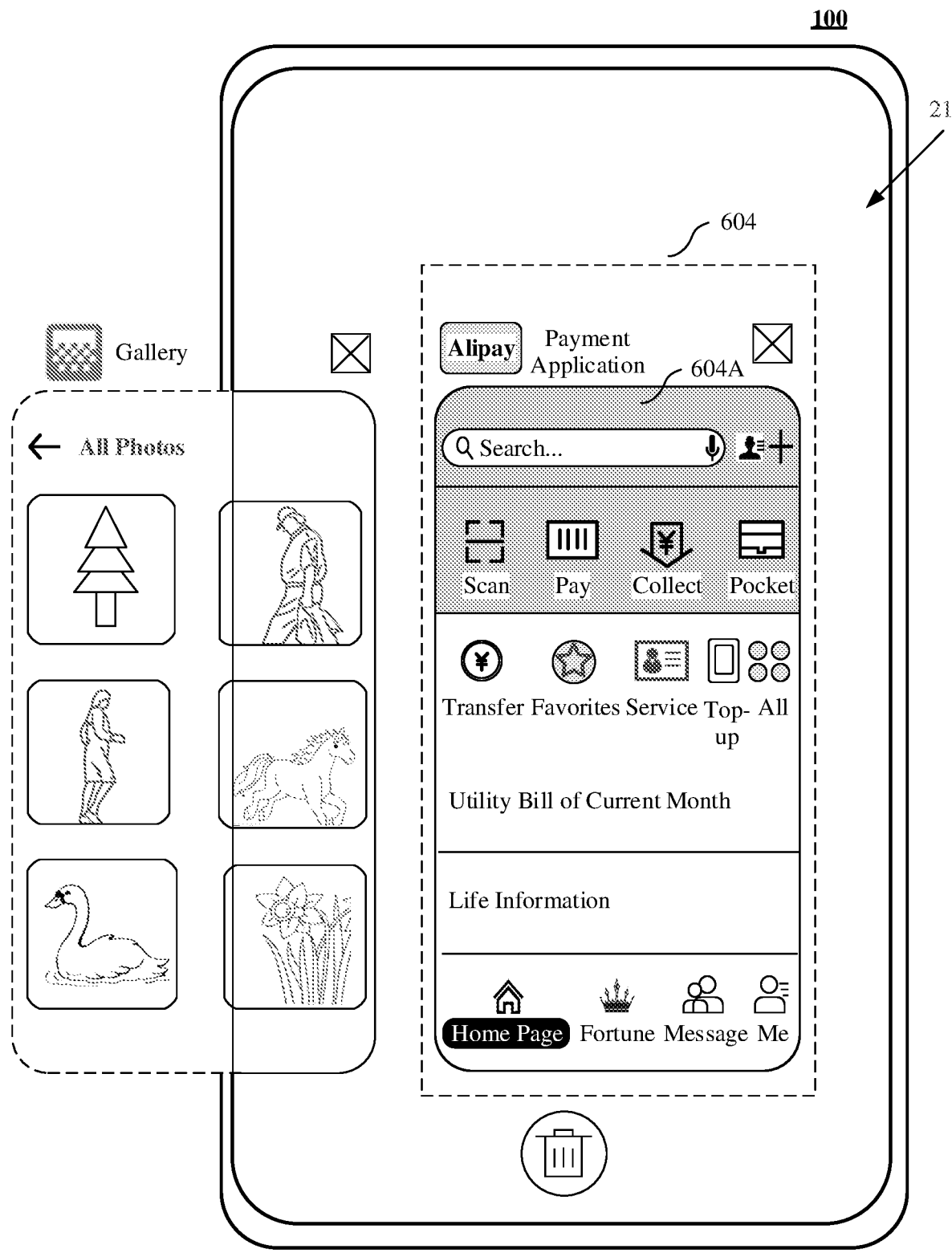

For example, the user interface 1 of the application 1 is a home page interface 16 shown in FIG. 4H. The application 2 is a desktop application shown in FIG. 4I. The input operation 3 is a touch operation performed on the multitask button 205C, as shown in FIG. 4I. The multitask management interface 2 may be a multitask management interface 21 shown in FIG. 4J. A window corresponding to the home page interface 16 is not a private window. After obtaining a screenshot of the home page interface 16, the electronic device 100 does not perform blur processing on the home page interface 16. Refer to FIG. 4J. In response to a touch operation performed on the multitask button 205C, the electronic device 100 displays the multitask management interface 21. The multitask management interface 21 includes a page 604 corresponding to a payment application, and the page 604 is used to display a screenshot 604A of the home page interface 16.

It should be noted that, in this embodiment of this application, when the electronic device 100 switches the user interface 11 of the desktop application to the multitask management interface, a screenshot of the user interface 11 does not need to be taken, and the multitask management interface does not need to display a preview image of a user interface (for example, the user interface 11 in the foregoing embodiment) of the desktop application.

In some embodiments of this application, an application installed on the electronic device 100 may include a private application, and a plurality of windows corresponding to one application may include a private window. The private window and the private application may be preset by the electronic device 100, or may be preset by a user. This is not specifically limited herein.

Figure 7B:
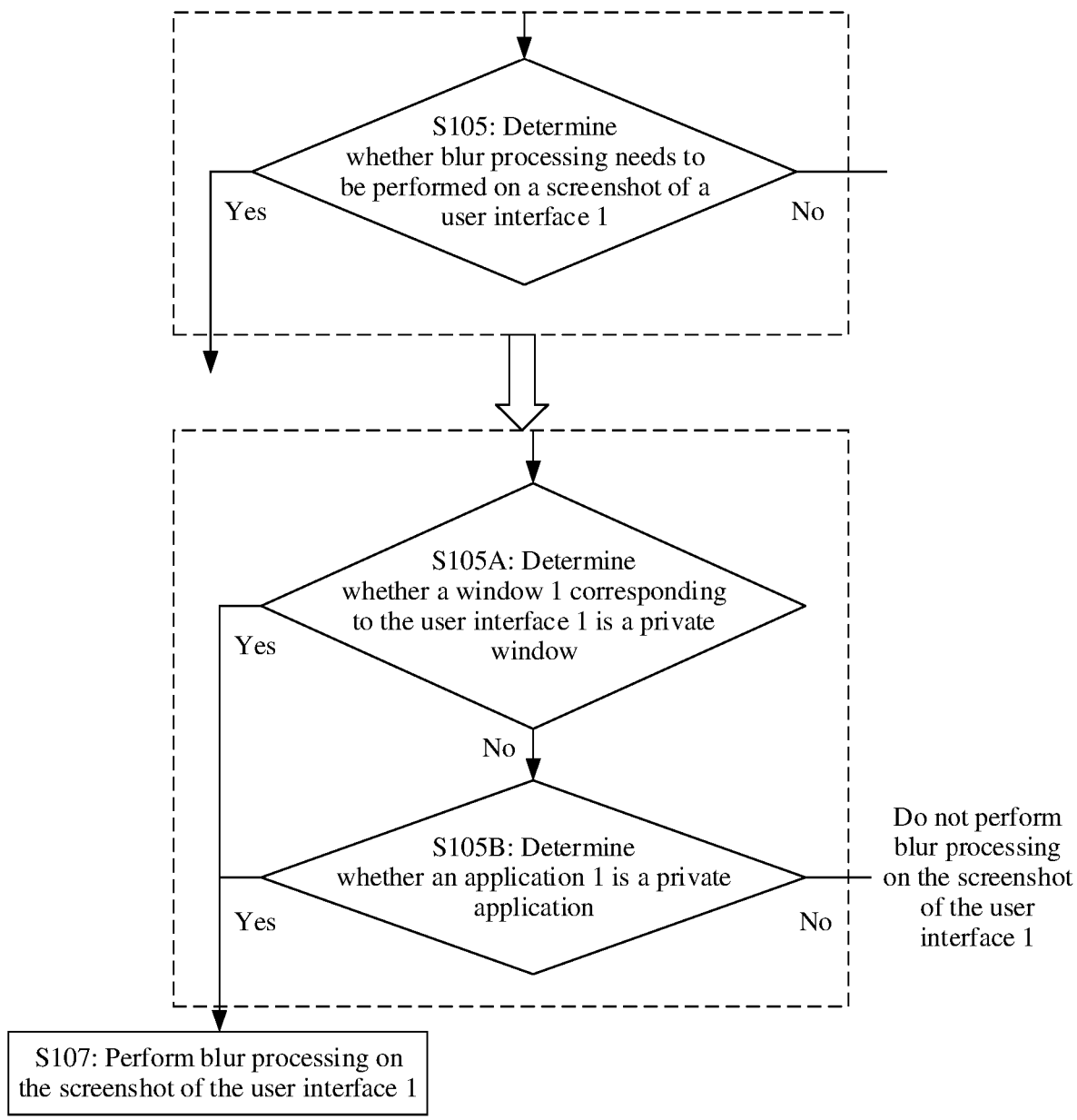
FIG. 7B is a schematic flowchart of determining blur processing according to an embodiment of this application.

In some embodiments, as shown in FIG. 7B, that the electronic device 100 determines whether blur processing needs to be performed on the screenshot of the user interface 1 may specifically include S105A and S105B.

S105A: The electronic device 100 determines whether the window 1 corresponding to the user interface 1 is a private window. If the window 1 is a private window, blur processing needs to be performed on the screenshot of the user interface 1. If the window 1 is not a private window, the electronic device 100 performs step S105B.

Specifically, the electronic device 100 may generate a private window trustlist based on a preset private window. The private window trustlist may include a window identifier of the private window. It may be understood that, if the private window trustlist includes a window identifier of the window 1, the electronic device 100 determines that the window 1 is a private window.

S105B: The electronic device 100 determines whether the application 1 is a private application. If the application 1 is a private application, blur processing needs to be performed on the screenshot of the user interface 1. If the application 1 is not a private application, blur processing does not need to be performed on the screenshot of the user interface 1.

Specifically, the electronic device 100 may generate a private application trustlist based on a preset private application. The private application trustlist may include an application identifier of the private application. It may be understood that, if the private application trustlist includes an application identifier of the application 1, the electronic device 100 determines that the application 1 is an application window.

It should be noted that a private window or a private application may be preset by the user, may be preset by default by the electronic device 100, or may be preset during development of an application. If the private window or the private application is preset during development of the application, when installing the application, the electronic device 100 may determine, based on installation information of the application, whether the application is a private application and whether each window in the application is a private window.

In some embodiments of this application, the private application trustlist may include an application in which a payment protection center is enabled. The payment protection center is configured to protect payment environment security of the application. The application in the payment protection center may be preset by the user.

Figure 7C:
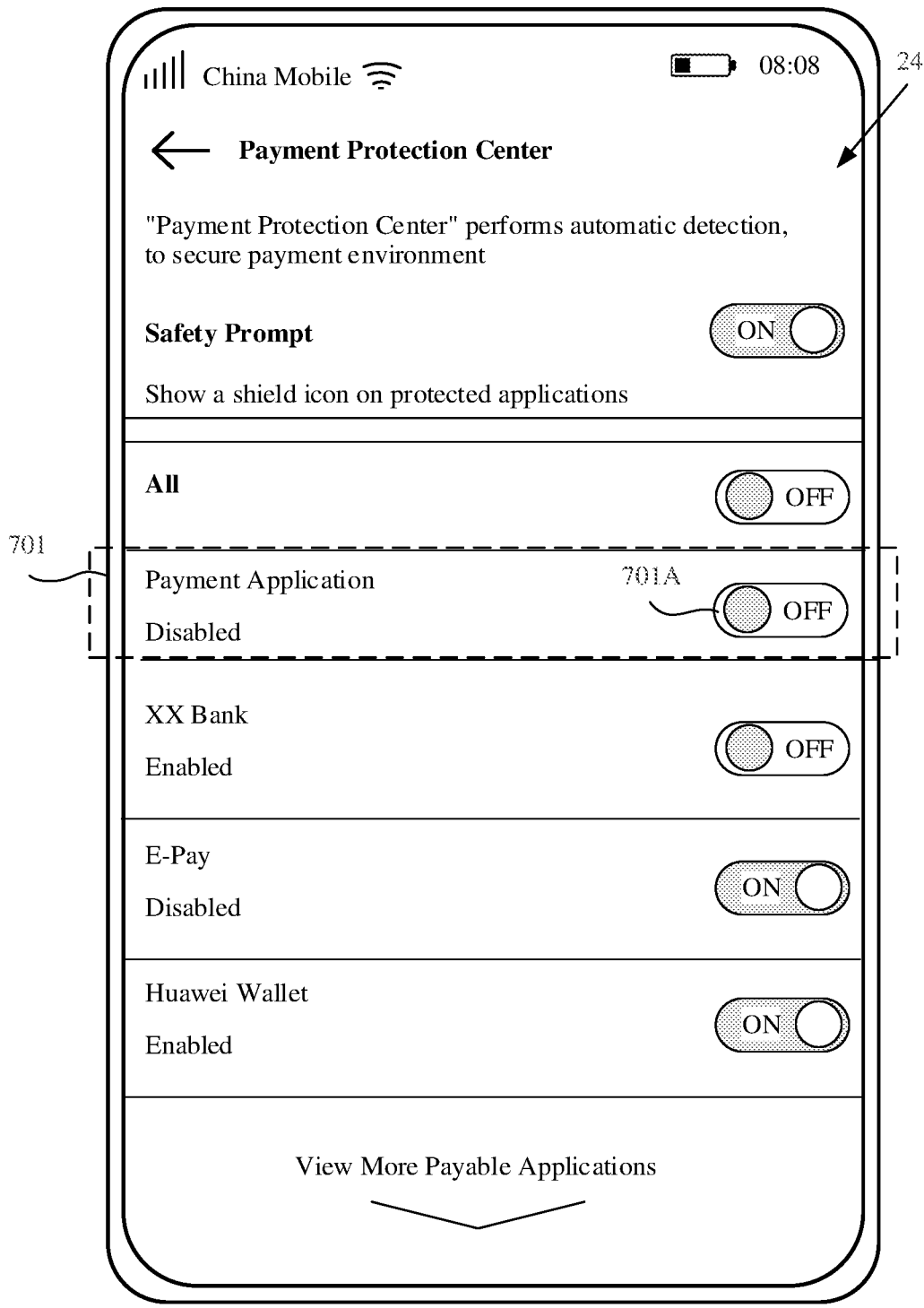
FIG. 7C is a setting interface of a payment protection center according to an embodiment of this application.

For example, FIG. 7C shows a setting interface 24 of a payment protection center according to an embodiment of this application. The setting interface 24 may include a security prompt setting bar and at least one application setting bar. The at least one application setting bar may include a payment application setting bar, an XX bank setting bar, an E-Pay setting bar, a Huawei Wallet setting bar 701, and the like. Each setting bar displays a switch control, and the switch control may be used to add an application to or remove the application from the payment protection center. For example, a switch control 701A is displayed on the Huawei Wallet setting bar 701. If the switch control is in an on (ON) state, when the user performs payment by using the application, a user identity needs to be verified again. If the switch control is in an OFF state, when the user performs payment by using the application, a user identity does not need to be verified again.

In some embodiments of this application, the private application trustlist may include an application for which an application lock is enabled, and the application for which the application lock is enabled may be preset by the user.

Figure 7D:
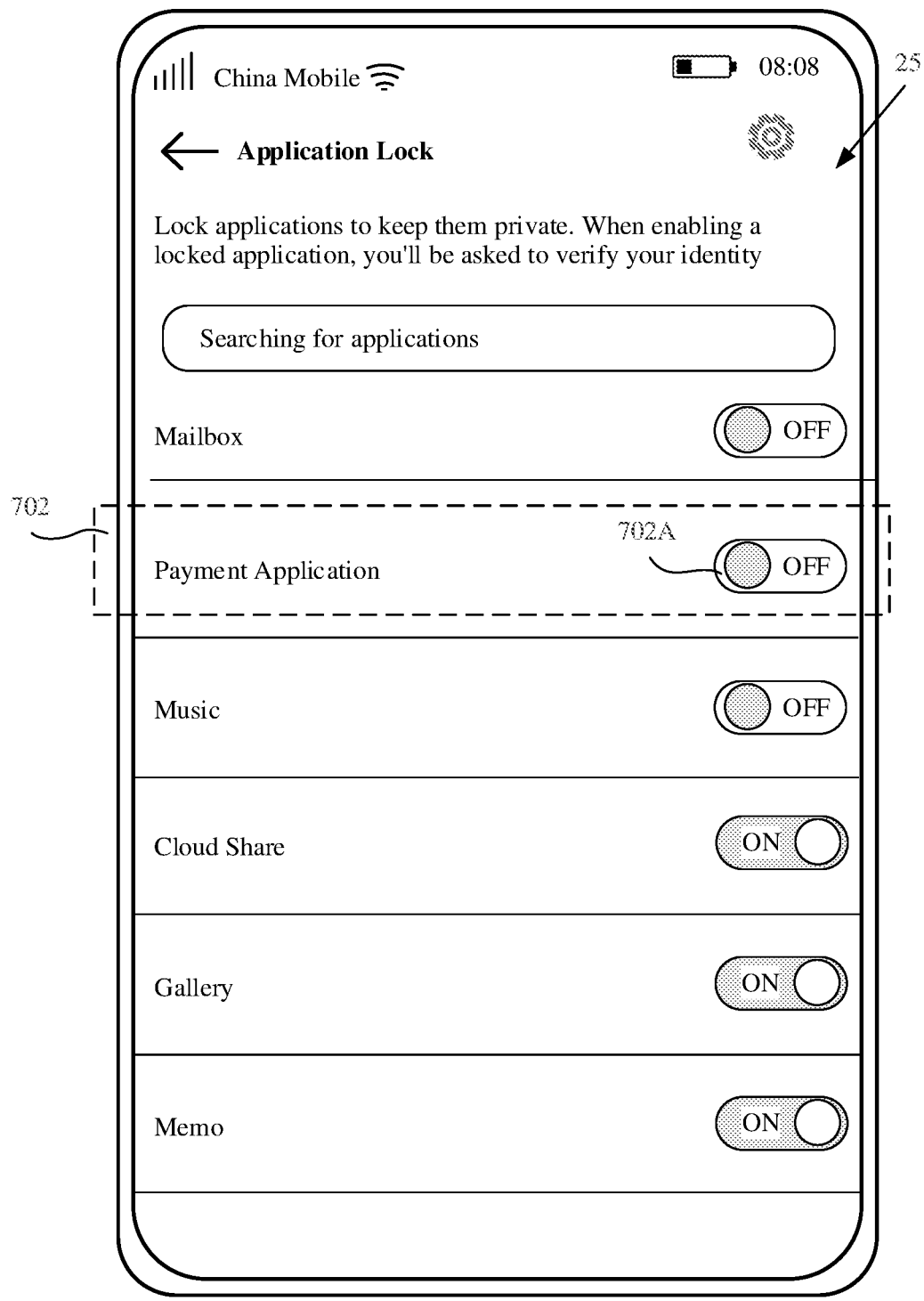
FIG. 7D is a setting interface of an application lock according to an embodiment of this application.

For example, FIG. 7D shows a setting interface 25 of an application lock according to an embodiment of this application. The setting interface 25 may include an application search box and at least one application setting bar. The at least one application setting bar may include a mailbox setting bar, a payment application setting bar 702, a music setting bar, a cloud sharing setting bar, a gallery setting bar, a memo setting bar, and the like. Each setting bar displays a switch control, and the switch control may be used to enable or disable a protection lock for an application access entry. For example, a switch control 702A is displayed on the payment application setting bar 702. If the switch control is in an on (ON) state, when accessing the application, the user needs to verify an identity, that is, unlock the application. If the switch control is in an OFF state, the user can directly access the application without a need to verify an identity.

In some embodiments of this application, a plurality of privacy levels may be configured for a window of an application. In some embodiments, the privacy levels of the window may include a zero privacy level, a low privacy level, a moderate privacy level, and a high privacy level. In some embodiments, the privacy levels of the window may include the zero privacy level, the low privacy level, and the high privacy level. In this embodiment of this application, the private window may be a window at the low privacy level, the moderate privacy level, or the high privacy level.

Figure 7E:
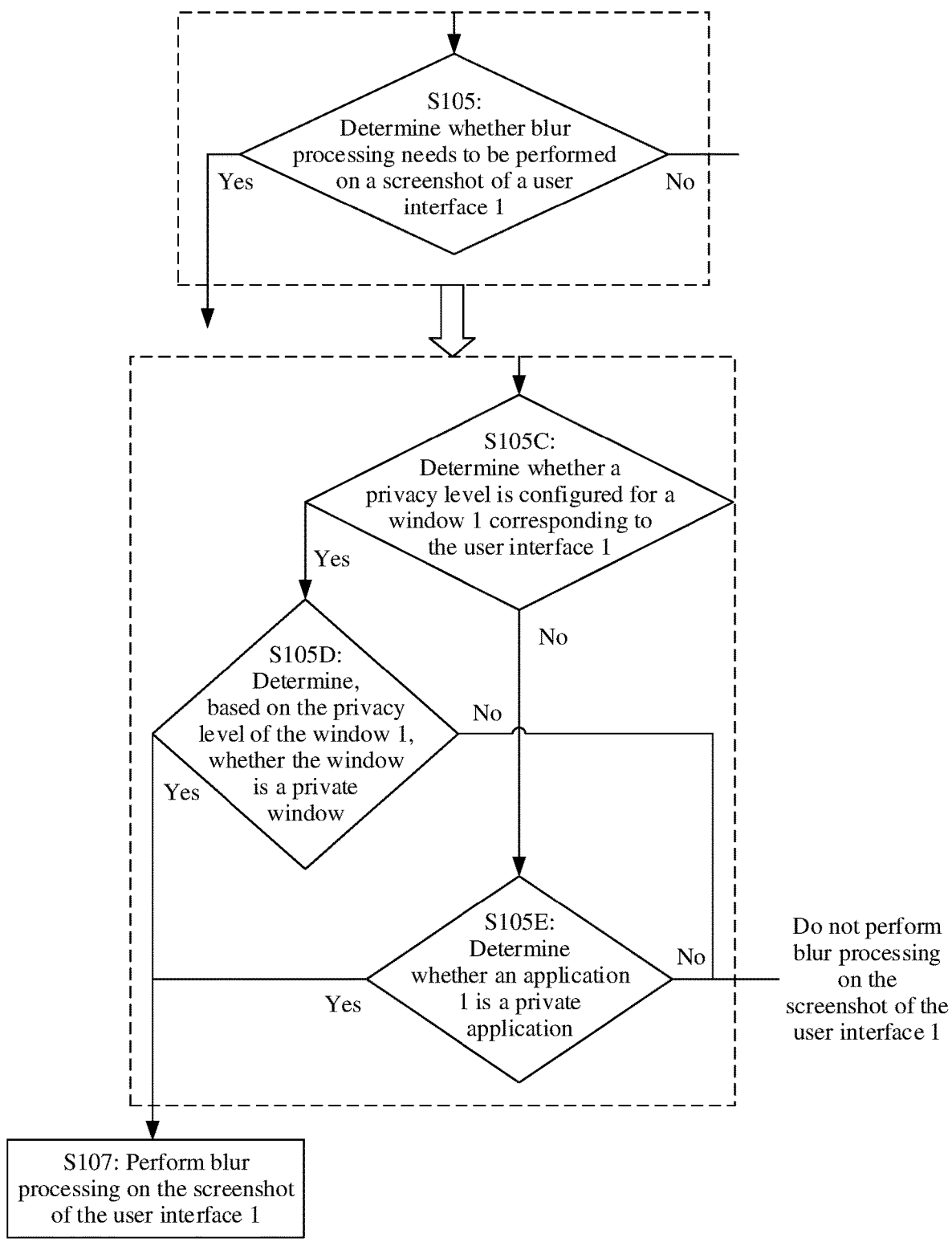
FIG. 7E is another schematic flowchart of determining blur processing according to an embodiment of this application.

In some embodiments, as shown in FIG. 7E, that the electronic device 100 determines whether blur processing needs to be performed on the screenshot of the user interface 1 may specifically include S105C, S105D, and S105E.

S105C: The electronic device 100 determines whether a privacy level is configured for the window 1 corresponding to the user interface 1. If the privacy level is configured for the window 1, the electronic device 100 performs step S105D. If no privacy level is configured for the window 1, the electronic device 100 performs step S105E.

S105D: The electronic device 100 determines, based on the privacy level of the window 1, whether the window 1 is a private window. If the window 1 is a private window, the electronic device 100 determines that blur processing needs to be performed on the screenshot of the user interface 1. If the window 1 is not a private window, the electronic device 100 determines that blur processing does not need to be performed on the screenshot of the user interface 1.

In some embodiments, if the privacy level of the window 1 is low privacy, moderate privacy, or high privacy, the window is a private window. If the privacy level of the window 1 is no privacy, the window is not a private window.

Specifically, the electronic device 100 may generate the private window trustlist based on the private window for which the privacy level is configured. The private window trustlist may include a window identifier of the window and a privacy level corresponding to the window.

In this embodiment of this application, the electronic device 100 may perform blur processing to different degrees on a screenshot of each application in the multitask queue based on the privacy level of the window. In some embodiments, in step S105D, the electronic device 100 performs low blur processing on a screenshot of a low private window, to obtain a lowly blur-processed image of the screenshot. The electronic device 100 performs low blur processing on a screenshot of a moderate private window, to obtain a moderately blur-processed image of the screenshot. The electronic device 100 performs low blur processing on a screenshot of a high private window, to obtain a highly blur-processed image of the screenshot. For display features of the lowly blur-processed image, the moderately blur-processed image, and the highly blur-processed image, refer to the foregoing embodiment. Details are not described herein again.

For example, the user interface 1 is a personal center interface 18 of a payment application. When a privacy level of a window corresponding to the personal center interface 18 is low privacy, the multitask management interface 1 includes a lowly blur-processed image of a screenshot of the personal center interface 18 shown in FIG. 6D. When a privacy level of a window corresponding to the personal center interface 18 is moderate privacy, the multitask management interface 1 includes a moderately blur-processed image of a screenshot of the personal center interface 18 shown in FIG. 6E. When a privacy level of a window corresponding to the personal center interface 18 is high privacy, the multitask management interface 1 includes a highly blur-processed image of a screenshot of the personal center interface 18 shown in FIG. 6F.

S105E: The electronic device 100 determines whether the application 1 is a private application. If the application 1 is a private application, the electronic device 100 determines that blur processing needs to be performed on the screenshot of the user interface 1. If the application 1 is not a private application, the electronic device 100 determines that blur processing does not need to be performed on the screenshot of the user interface 1.

Specifically, the electronic device 100 may generate a private application trustlist based on a preset private application. The private application trustlist may include an application identifier of the private application.

In this embodiment of this application, a plurality of privacy levels may be configured for an application. For example, the privacy levels of the application may include a zero privacy level, a low privacy level, a moderate privacy level, and a high privacy level. The private application may be an application at the low privacy level, the moderate privacy level, or the high privacy level. The electronic device 100 may perform different blur processing to different degrees on a screenshot of each application in the multitask queue based on the privacy level of the application. In some embodiments, in step S105, if the electronic device 100 determines that the application 1 is a private application, the electronic device 100 performs blur processing on the screenshot of the application 1 based on a privacy level of the application 1. When the privacy level of the application 1 is low privacy, the electronic device 100 performs low blur processing on the screenshot of the application 1, to obtain a lowly blur-processed image of the screenshot. When the privacy level of the application 1 is moderate privacy, the electronic device 100 performs moderate blur processing on the screenshot of the application 1, to obtain a moderately blur-processed image of the screenshot. When the privacy level of the application 1 is high privacy, the electronic device 100 performs high blur processing on the screenshot of the application 1, to obtain a highly blur-processed image of the screenshot.

It should be noted that, similar to the private window, a privacy level of an application may include at least one of the zero privacy level, the low privacy level, the moderate privacy level, and the high privacy level. In addition, the privacy level of the application may further include another privacy level. This is not specifically limited herein.

In some embodiments, the Android system is used as an example. During development of an application, a configuration parameter meta-data may be used to configure a privacy level of a window or an application. The electronic device 100 may define meta-data in an application list file AndroidManifest.xml of the application.

For example, the privacy level of the window or the application includes zero privacy, low privacy, and high privacy. Code for defining meta-data in AndroidManifest.xml may be represented as follows:

```
<meta-data
android:name="privacy.snapshot.blur.level"
android:value="1" />
```

A value of android:name is fixed to "privacy.snapshot.blur.level". android: The value "0" indicates zero privacy. android: The value "i" indicates low privacy. android: The value "2" indicates moderate privacy.

In this embodiment of this application, the electronic device 100 may add meta-data to an application label <application>, or may add the meta-data to a window label <activity>.

For example, code for defining meta-data under <application> may be represented as follows:

```
<? xml version="1.0" encoding="utf-8">
<manifest>
  <application>
  ...
  <activity android:name= activity_1>
  ...
  </ activity >
  <activity android:name= activity_2>
  ...
  </ activity >
  <activity android:name= activity_3>
  ...
  </ activity >
  <meta-data
  android:name="privacy.snapshot.blur.level"
  android:value="1" />
  </application>
</manifest>
```

For example, a window of the application includes activity_1, activity_2, and activity_3. Code for defining meta-data of activity_1, activity_2, and activity_3 under <activity> may be expressed as follows:

```
<? xml version="1.0" encoding="utf-8">
<manifest>
  <application>
  ...
  <activity android:name= activity_1>
  ...
  <meta-data
  android:name="privacy.snapshot.blur.level"
  android:value="1" />
  </ activity >
  <activity android:name= activity_2>
  ...
  <meta-data
  android:name="privacy.snapshot.blur.level"
  android:value="1" />
  </ activity >
  <activity android:name= activity_3>
  ...
```

```
<meta-data
    android:name="privacy.snapshot.blur.level"
    android:value="1" />
  </ activity >
  </application>
</manifest>
```

If the input operation 1 is used to trigger a multitask management interface, the electronic device 100 switches the user interface 1 of the application 1 (a top-level application) to the multitask management interface in response to the input operation 1.

In some embodiments of this application, after obtaining the screenshot of the user interface 1 of the top-level application, the electronic device 100 determines whether blur processing needs to be performed on the user interface 1. As shown in FIG. 7A, if blur processing needs to be performed on the user interface 1, after the electronic device 100 performs blur processing on the screenshot of the user interface 1 in step S106, the electronic device 100 performs step S111. If blur processing does not need to be performed on the user interface 1, the electronic device 100 performs step S112.

S111: Display a multitask management interface, where the multitask management interface includes a blur-processed image of the screenshot of the user interface 1, and the input operation 1 is used to trigger the multitask management interface.

S112: Display a multitask management interface, where the multitask management interface includes the screenshot of the user interface 1, and the input operation 1 is used to trigger the multitask management interface.

It may be understood that, in the foregoing embodiment, when the electronic device 100 switches the user interface 1 of the top-level application to the multitask management interface, if the window corresponding to the user interface 1 is a private window, the multitask management interface includes the blur-processed image of the screenshot of the user interface 1. If the window corresponding to the user interface 1 is not a private window and the application 1 is not a private application, the multitask management interface includes the screenshot of the user interface 1.

For example, the user interface 1 is a home page interface 16 of a payment application shown in FIG. 4A. A window corresponding to the home page interface 16 is not a private window. As shown in FIG. 4A and FIG. 4B, the electronic device 100 switches the home page interface 16 of the payment application (a top-level application) to a multitask management interface 17. The multitask management interface 17 includes a screenshot of the home page interface 16.

For example, the user interface 1 is a personal center interface 18 of a payment application shown in FIG. 4C. A window corresponding to the personal center interface 18 is a private window. As shown in FIG. 4C and FIG. 4D, the electronic device 100 switches the personal center interface 18 to a multitask management interface 17 of the payment application (a top-level application). The multitask management interface 17 includes a blur-processed image of a screenshot of the personal center interface 18.

In some embodiments of this application, when the electronic device 100 switches from a user interface of a top-level application to a multitask management interface, the electronic device 100 does not perform blur processing on a screenshot of the application, even if a window in which the top-level application recently runs is a private window. The multitask management interface may include the screenshot of the application.

Figure 7F:
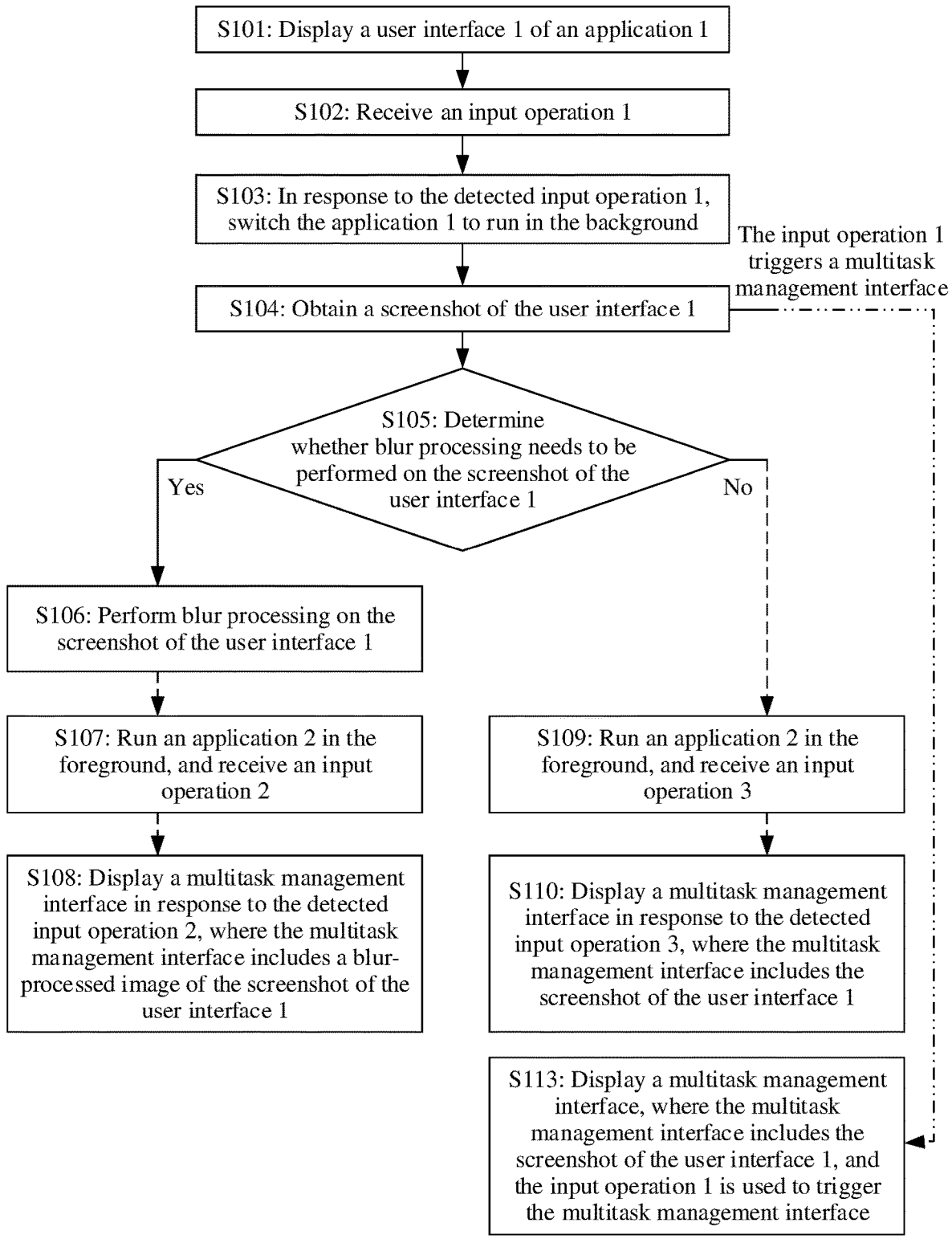
FIG. 7F is a schematic flowchart of another information display method according to an embodiment of this application.

For example, as shown in FIG. 7F, if the input operation 1 is used to trigger a multitask management interface, the electronic device 100 performs step S113 after obtaining the screenshot of the user interface 1 in step S104.

S113: Display a multitask management interface, where the multitask management interface includes the screenshot of the user interface 1, and the input operation 1 is used to trigger the multitask management interface.

Figure 5B:
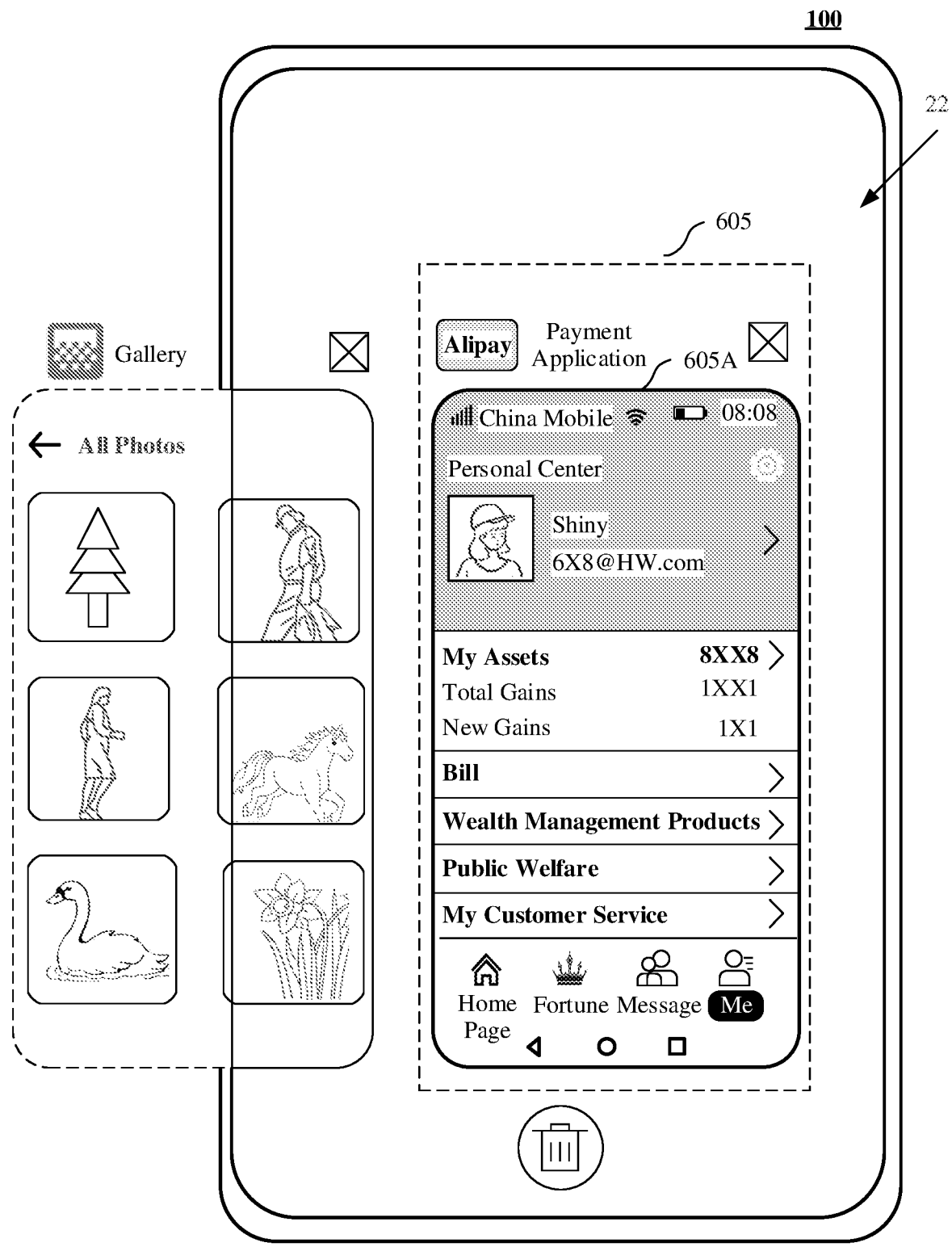

For example, the user interface 1 is a personal center interface 18 of a payment application shown in FIG. 5A. A window corresponding to the personal center interface 18 is a private window. As shown in FIG. 5A and FIG. 5B, the electronic device 100 switches the personal center interface 18 to a multitask management interface 17 of the payment application (a top-level application). The multitask management interface 17 includes a screenshot of the personal center interface 18.

With reference to several specific implementations, the following describes the information display method provided in the embodiment related to FIG. 7A.

Concepts related to the following implementations are first introduced.

Activity manager service (Activity Manager Service, AMS): The AMS is a system service of the Android (Android) system, and is used to control proper scheduling and running of different applications in the system. The AMS is responsible for scheduling Activity of each application, managing an application process, managing a memory, scheduling a service, scheduling a task (Task), querying a current running status of the system, and the like.

Window manager service (Window Manager Service, WMS): The WMS is a system service of the Android system and controls displaying and hiding of all windows. The WMS assigns interfaces (Surface) to all windows, manages a display sequence, size, and location of the surface, and controls window animation. It is an important transfer station for an input system.

Implementation 1

Figure 8A:
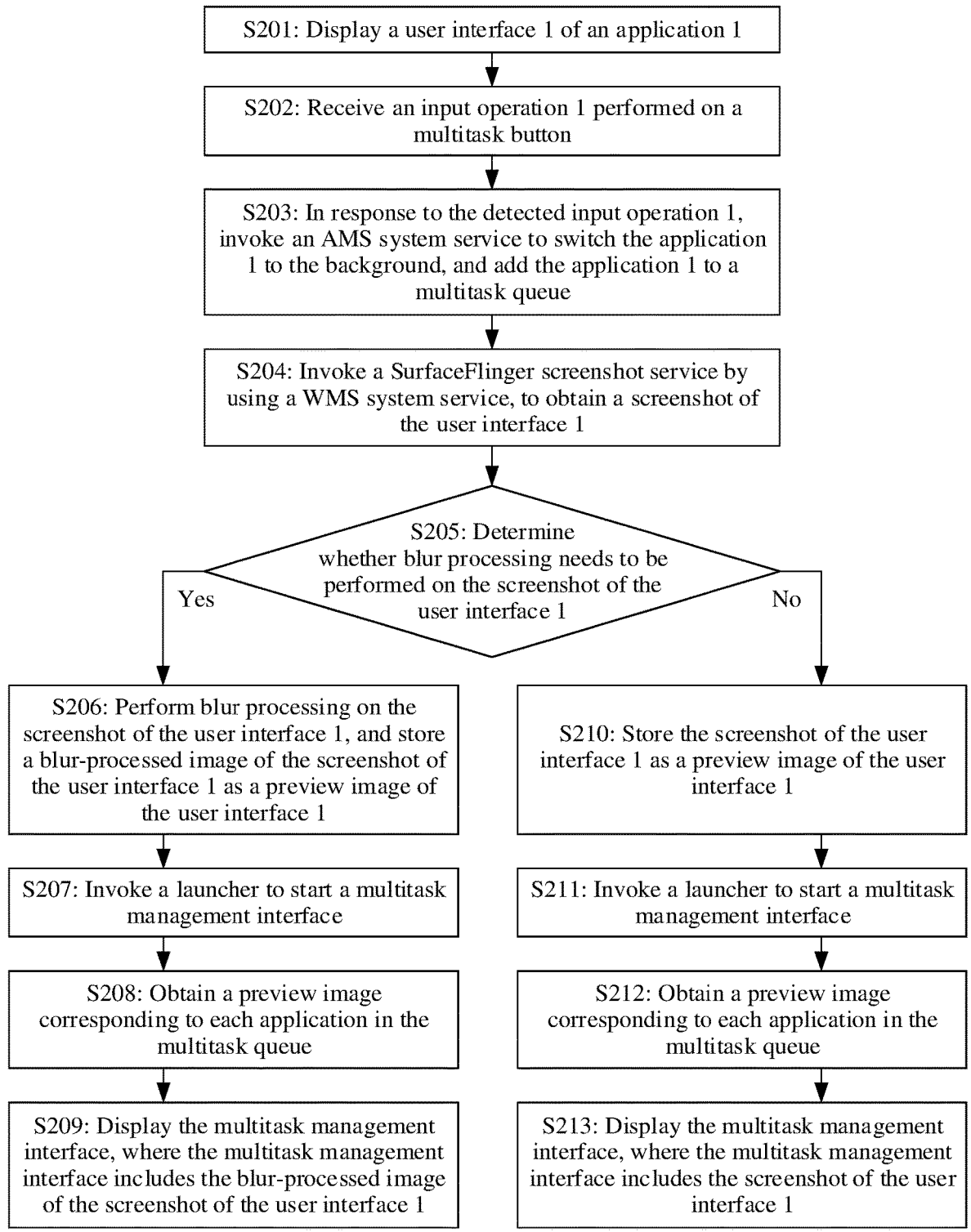
FIG. 8A is a schematic flowchart of still another information display method according to an embodiment of this application.

For example, FIG. 8A shows an information display method according to an embodiment of this application. The information display method includes but is not limited to steps S201 to S213.

S201: The electronic device 100 displays a user interface 1 of an application 1.

S202: The electronic device 100 receives an input operation 1 performed on a multitask button.

S203: In response to the detected input operation 1, the electronic device 100 invokes an AMS system service to switch the application 1 to the background, and adds the application 1 to a multitask queue.

S204: The electronic device 100 invokes a SurfaceFlinger screenshot service by using a WMS system service, to obtain a screenshot of the user interface 1.

Without being limited to the SurfaceFlinger screenshot service, the WMS system service may alternatively invoke another screenshot service to obtain the screenshot of the user interface 1. This is not specifically limited herein.

S205: The electronic device 100 determines whether blur processing needs to be performed on the screenshot of the user interface 1. If blur processing needs to be performed, the electronic device 100 may perform step S206 to step S209. If blur processing does not need to be performed, the electronic device 100 may perform step S210 to step S213.

For a specific implementation of determining whether blur processing needs to be performed on the screenshot of the user interface 1, refer to the related embodiments of FIG. 7B and FIG. 7E. Details are not described herein again.

S206: The electronic device 100 performs blur processing on the screenshot of the user interface 1, and stores a blur-processed image of the screenshot of the user interface 1 as a preview image of the user interface 1.

S207: The electronic device 100 invokes a desktop launcher (Launcher) to start a multitask management interface.

A launcher is a desktop launcher in the Android system, and is configured to display and manage another application on the electronic device 100.

S208: The electronic device 100 obtains a preview image corresponding to each application in the multitask queue.

S209: The electronic device 100 displays the multitask management interface. The multitask management interface includes the blur-processed image of the screenshot of the user interface 1.

For example, the user interface 1 may be a personal center interface 18 of a payment application shown in FIG. 4C. Because a window corresponding to the personal center interface 18 is a private window, blur processing needs to be performed on a screenshot of the personal center interface 18. After receiving an input operation 1 performed on the multitask button 205C, the electronic device 100 performs blur processing on the screenshot of the personal center interface 18, and stores the screenshot as a preview image of the personal center interface 18. In response to the touch operation, the electronic device 100 displays, in the multitask management interface, a page 602 of a payment application shown in FIG. 4D. The page 602 is used to display the preview image of the personal center interface 18, namely, a blur-processed image of the screenshot of the personal center interface 18.

S210: The electronic device 100 stores the screenshot of the user interface 1 as a preview image of the user interface 1.

S211: The electronic device 100 invokes a launcher to start a multitask management interface.

S212: The electronic device 100 obtains a preview image corresponding to each application in the multitask queue.

S213: The electronic device 100 displays the multitask management interface. The multitask management interface includes the screenshot of the user interface 1.

For example, the user interface 1 may be a home page interface 16 of a payment application shown in FIG. 4A. Because a window corresponding to the home page interface 16 is not a private window, blur processing does not need to be performed on a screenshot of the home page interface 16. After receiving an input operation 1 performed on the multitask button 205C, the electronic device 100 stores the screenshot of the home page interface 16 as a preview image of the home page interface 16. In response to the touch operation, the electronic device 100 displays, in the multitask management interface, a page 601 of a payment application shown in FIG. 4B. The page 601 is used to display the preview image of the home page interface 16, namely, the screenshot of the home page interface 16.

In Implementation 1, if a window corresponding to the user interface 1 is a private window, when the electronic device 100 switches the user interface 1 of the application 1 to run in the background, the electronic device 100 performs blur processing on the screenshot of the user interface 1, and stores the blur-processed image of the screenshot as the preview image of the user interface 1 in the multitask management interface. It may be understood that, if blur processing needs to be performed on the user interface 1, the electronic device 100 stores only the blur-processed image of the screenshot of the user interface 1.

Implementation 2

Figures 1, 8B:
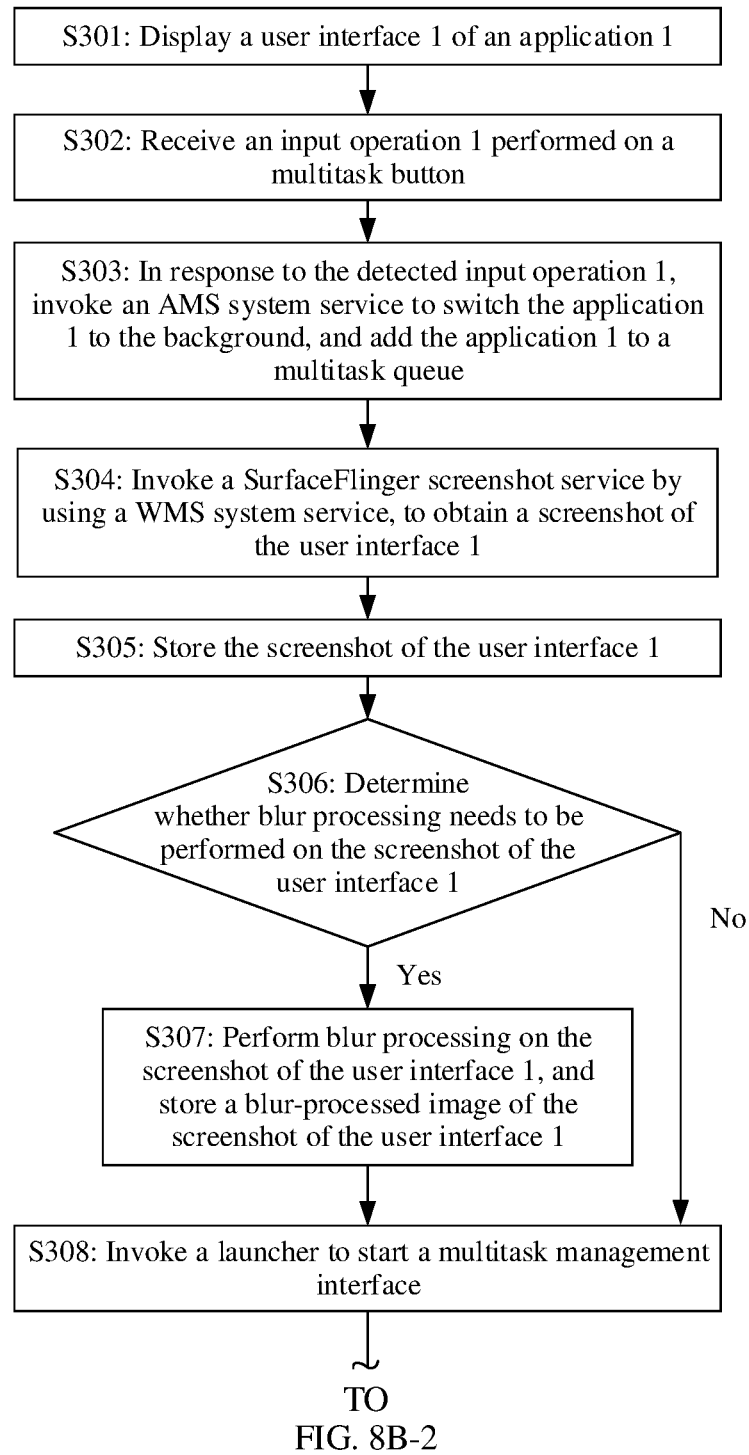
Figures 2, 8B:
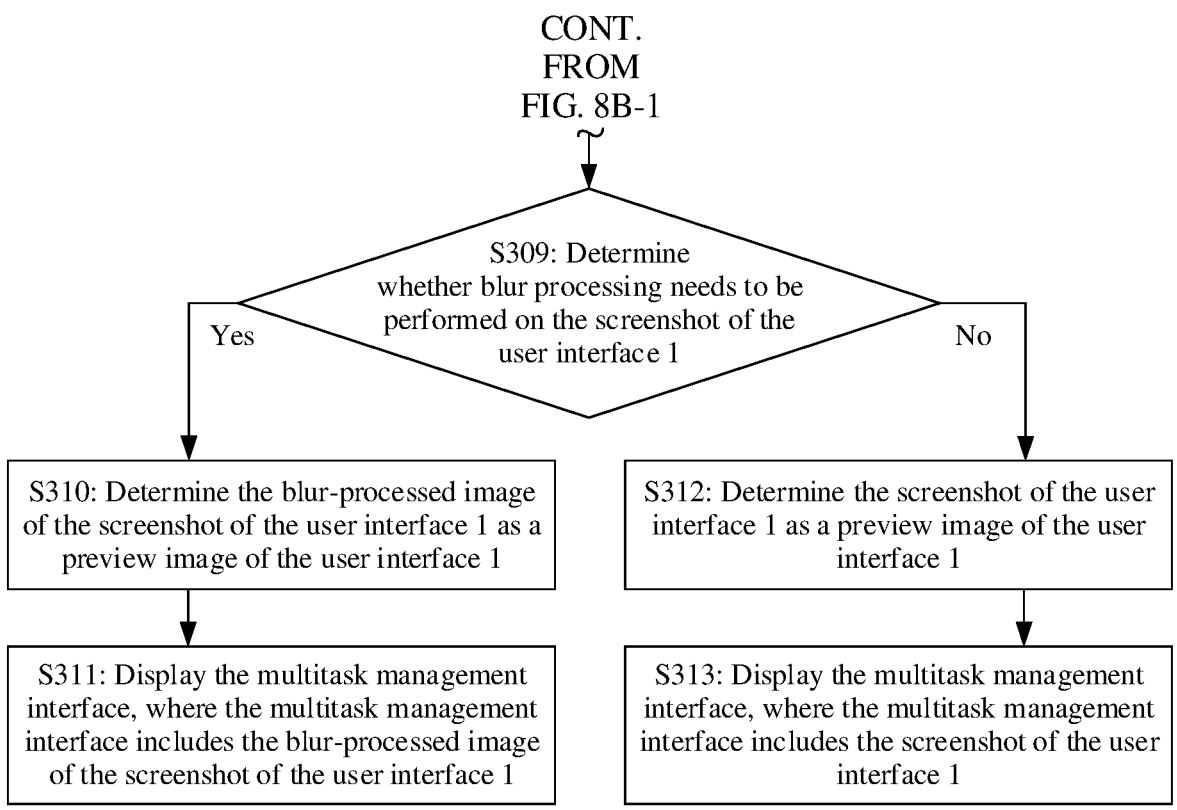

For example, FIG. 8B-1 and FIG. 8B-2 show an information display method according to an embodiment of this application. The information display method includes but is not limited to steps S301 to S313.

S301: The electronic device 100 displays a user interface 1 of an application 1.

S302: The electronic device 100 receives an input operation 1 performed on a multitask button.

S303: In response to the detected input operation 1, the electronic device 100 invokes an AMS system service to switch the application 1 to the background, and adds the application 1 to a multitask queue.

S304: The electronic device 100 invokes a SurfaceFlinger screenshot service by using a WMS system service, to obtain a screenshot of the user interface 1.

S305: The electronic device 100 stores the screenshot of the user interface 1.

S306: The electronic device 100 determines whether blur processing needs to be performed on the screenshot of the user interface 1. If blur processing needs to be performed, the electronic device 100 performs step S307 and step S308. If blur processing does not need to be performed, the electronic device 100 directly performs step S308.

For a specific implementation of determining whether blur processing needs to be performed on the screenshot of the user interface 1, refer to the related embodiments of FIG. 7B and FIG. 7E. Details are not described herein again.

S307: The electronic device 100 performs blur processing on the screenshot of the user interface 1, and stores a blur-processed image of the screenshot of the user interface 1.

It may be understood that, if blur processing needs to be performed on the screenshot of the user interface 1, the electronic device 100 stores the screenshot of the user interface 1 and the blur-processed image of the screenshot.

S308: The electronic device 100 invokes a launcher to start a multitask management interface.

It may be understood that, if blur processing does not need to be performed on the screenshot of the user interface 1, the electronic device 100 stores only the screenshot of the user interface 1.

S309: The electronic device 100 determines whether blur processing needs to be performed on the screenshot of the user interface 1. If blur processing needs to be performed, the electronic device 100 performs step S310 and step S311. If blur processing needs to be performed, the electronic device 100 performs step S312 and step S313.

For a specific implementation of determining whether blur processing needs to be performed on the screenshot of the user interface 1, refer to the related embodiments of FIG. 7B and FIG. 7E. Details are not described herein again.

S310: The electronic device 100 determines the blur-processed image of the screenshot of the user interface 1 as a preview image of the user interface 1.

S311: The electronic device 100 displays the multitask management interface. The multitask management interface includes the blur-processed image of the screenshot of the user interface 1.

For example, the user interface 1 may be a personal center interface 18 of a payment application shown in FIG. 4C. Because a window corresponding to the personal center interface 18 is a private window, blur processing needs to be performed on a screenshot of the personal center interface 18. After the electronic device 100 receives an input operation 1 performed on the multitask button 205C, the electronic device 100 displays, in the multitask management interface, a page 602 of a payment application shown in FIG. 4D. The page 602 is used to display a preview image of the personal center interface 18, namely, a blur-processed image of the screenshot of the personal center interface 18.

S312: The electronic device 100 determines the screenshot of the user interface 1 as a preview image of the user interface 1.

S313: The electronic device 100 displays the multitask management interface. The multitask management interface includes the screenshot of the user interface 1.

For example, the user interface 1 may be a home page interface 16 of a payment application shown in FIG. 4A. Because a window corresponding to the home page interface 16 is not a private window, blur processing does not need to be performed on a screenshot of the home page interface 16. After the electronic device 100 receives an input operation 1 performed on the multitask button 205C, the electronic device 100 displays, in the multitask management interface, a page 601 of a payment application shown in FIG. 4B. The page 601 is used to display a preview image of the home page interface 16, namely, a screenshot of the home page interface 16.

In Implementation 2, if a window corresponding to the user interface 1 is a private window, when the electronic device 100 switches the user interface 1 of the application 1 to run in the background, the electronic device 100 performs blur processing on the screenshot of the user interface 1, and stores the screenshot of the user interface 1 and the blur-processed image of the screenshot. When the electronic device 100 needs to display the multitask management interface, the electronic device 100 determines, based on whether blur processing needs to be performed on the screenshot of the user interface 1, whether the preview image of the user interface 1 in the multitask management interface is the screenshot of the user interface 1 or the blur-processed image of the screenshot.

Implementation 3

Figure 8C:
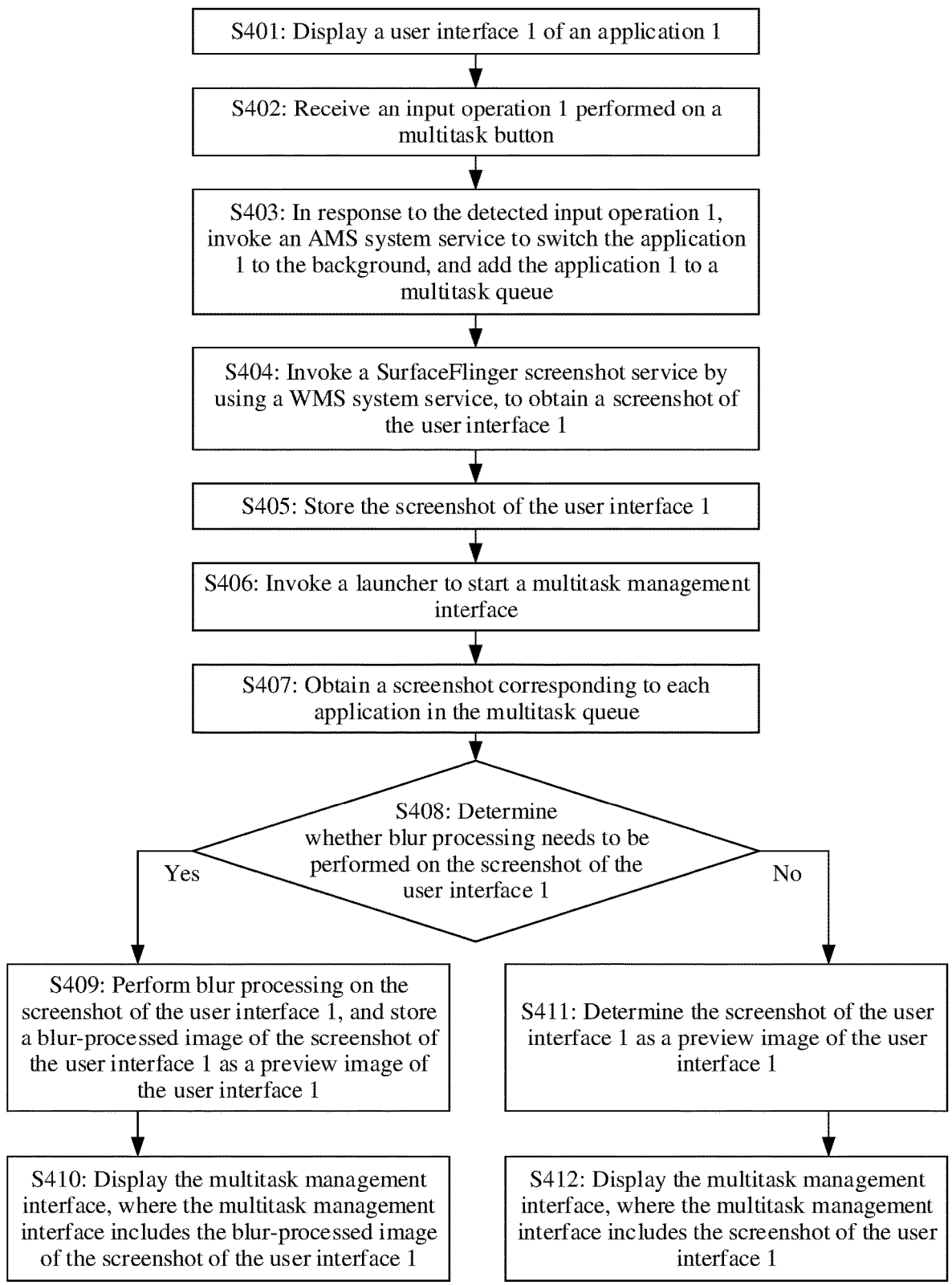
FIG. 8C is a schematic flowchart of still yet another information display method according to an embodiment of this application.

For example, FIG. 8C shows an information display method according to an embodiment of this application. The information display method includes but is not limited to steps S401 to S412.

S401: The electronic device 100 displays a user interface 1 of an application 1.

S402: The electronic device 100 receives an input operation 1 performed on the multitask button 205C.

S403: In response to the detected input operation 1, the electronic device 100 invokes an AMS system service to switch the application 1 to the background, and adds the application 1 to a multitask queue.

S404: The electronic device 100 invokes a SurfaceFlinger screenshot service by using a WMS system service, to obtain a screenshot of the user interface 1.

S405: The electronic device 100 stores the screenshot of the user interface 1.

S406: The electronic device 100 invokes a launcher to start a multitask management interface.

S407: The electronic device 100 obtains a screenshot corresponding to each application in the multitask queue.

S408: The electronic device 100 determines whether blur processing needs to be performed on the screenshot of the user interface 1. If blur processing needs to be performed, the electronic device 100 performs step S409 and step S410. If blur processing needs to be performed, the electronic device 100 performs step S411 and step S412.

For a specific implementation of determining whether blur processing needs to be performed on the screenshot of the user interface 1, refer to the related embodiments of FIG. 7B and FIG. 7E. Details are not described herein again.

S409: The electronic device 100 performs blur processing on the screenshot of the user interface 1, and stores a blur-processed image of the screenshot of the user interface 1 as a preview image of the user interface 1.

S410: The electronic device 100 displays the multitask management interface. The multitask management interface includes the blur-processed image of the screenshot of the user interface 1.

For example, the user interface 1 may be a personal center interface 18 of a payment application shown in FIG. 4C. Because a window corresponding to the personal center interface 18 is a private window, blur processing needs to be performed on a screenshot of the personal center interface 18. After the electronic device 100 receives an input operation 1 performed on the multitask button 205C, the electronic device 100 displays, in the multitask management interface, a page 602 of a payment application shown in FIG. 4D. The page 602 is used to display a preview image of the personal center interface 18, namely, a blur-processed image of the screenshot of the personal center interface 18. S411: The electronic device 100 determines the screenshot of the user interface 1 as a preview image of the user interface 1.

S412: The electronic device 100 displays the multitask management interface. The multitask management interface includes the screenshot of the user interface 1.

For example, the user interface 1 may be a home page interface 16 of a payment application shown in FIG. 4A. Because a window corresponding to the home page interface 16 is not a private window, blur processing does not need to be performed on a screenshot of the home page interface 16. After the electronic device 100 receives an input operation 1 performed on the multitask button 205C, the electronic device 100 displays, in the multitask management interface, a page 601 of a payment application shown in FIG. 4B. The page 601 is used to display a preview image of the home page interface 16, namely, a screenshot of the home page interface 16.

In conclusion, it can be learned that, in Implementation 3, if a window corresponding to the user interface 1 is a private window, when the electronic device 100 switches the user interface 1 of the application 1 to run in the background, the electronic device 100 stores the screenshot of the user interface 1. When the electronic device 100 needs to display the multitask management interface, the electronic device 100 performs blur processing on the screenshot of the user interface 1, and stores the blur-processed image of the screenshot as the preview image of the user interface 1 in the multitask management interface. In this case, the electronic device 100 may delete the screenshot of the user interface 1.

In Implementation 1, Implementation 2, and Implementation 3, when the electronic device 100 switches the user interface 1 of the top-level application to the multitask management interface, if the window corresponding to the user interface 1 is a private window, the multitask management interface includes the blur-processed image of the screenshot of the user interface 1. If the window corresponding to the user interface 1 is not a private window and the application 1 is not a private application, the multitask management interface includes the screenshot of the user interface 1.

With reference to several specific implementations, the following describes the information display method provided in the embodiment related to FIG. 7F.

Implementation 4

Figures 1, 8D:
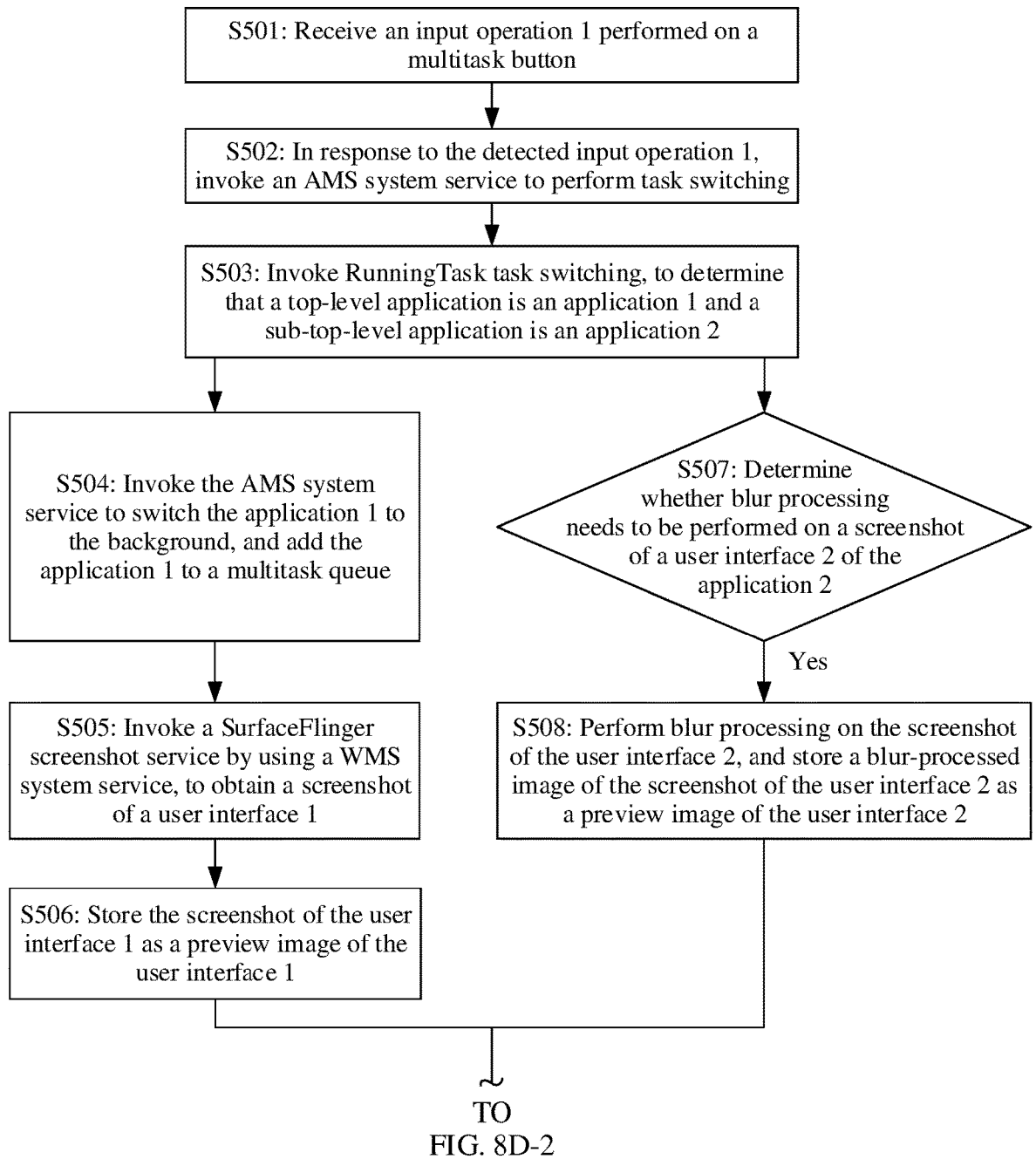
Figures 2, 8D:
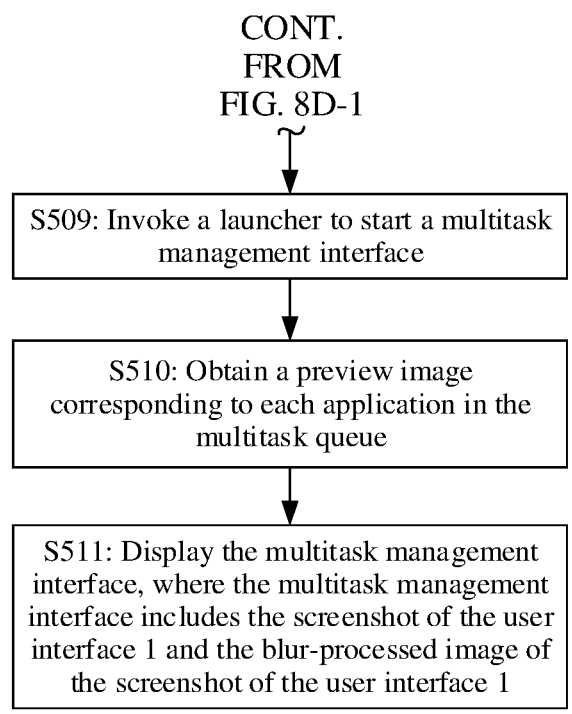

For example, FIG. 8D-1 and FIG. 8D-2 show an information display method according to an embodiment of this application. The information display method includes but is not limited to steps S501 to S511.

S501: The electronic device 100 receives an input operation 1 performed on a multitask button.

S502: In response to the detected input operation 1, the electronic device 100 invokes an AMS system service to perform task switching.

S503: The electronic device 100 invokes RunningTask task switching, to determine that a top-level application is an application 1 and a sub-top-level application is an application 2. Then, the electronic device 100 performs step S504 to step S506 for the application 1, and performs step S507 and step S508 for the application 2.

It should be noted that, in this embodiment of this application, a sequence of performing step S504 and step S507 is not specifically limited. Step S504 and step S507 may be performed simultaneously, or step S504 may be performed earlier than or later than step S507.

S504: The electronic device 100 invokes the AMS system service to switch the application 1 to the background, and adds the application 1 to a multitask queue.

S505: The electronic device 100 invokes a SurfaceFlinger screenshot service by using a WMS system service, to obtain a screenshot of a user interface 1.

S506: The electronic device 100 stores the screenshot of the user interface 1 as a preview image of the user interface 1.

It may be understood that the electronic device 100 does not perform blur processing on the screenshot of the user interface 1 of the application 1 (namely, a top-level application when the input operation 1 is received), even if a window corresponding to the user interface 1 is a private window.

S507: The electronic device 100 determines whether blur processing needs to be performed on a screenshot of a user interface 2 of the application 2. If blur processing needs to be performed, the electronic device 100 performs step S508.

For a specific implementation of determining whether blur processing needs to be performed on the screenshot of the user interface 1, refer to the related embodiments of FIG. 7B and FIG. 7E. Details are not described herein again. It may be understood that, if the electronic device 100 determines that blur processing does not need to be performed on the screenshot of the user interface 2 of the application 2, the electronic device 100 continues to use the screenshot of the user interface 2 as a preview image of the user interface 2 in a multitask management interface. The screenshot of the user interface 2 is a screenshot obtained by the electronic device 100 by using the WMS system when the application 2 is switched to the background as a top-level application.

S508: The electronic device 100 performs blur processing on the screenshot of the user interface 2, and stores a blur-processed image of the screenshot of the user interface 2 as a preview image of the user interface 2.

It may be understood that, if a window corresponding to the user interface 2 is a private window, the electronic device 100 performs blur processing on the screenshot of the user interface 2 of the application 2 (namely, a sub-top-level application when the input operation 1 is received).

In this embodiment of this application, after step S506 or step S507, the electronic device 100 performs step S509 to step S511.

S509: The electronic device 100 invokes a launcher to start a multitask management interface.

S510: The electronic device 100 obtains a preview image corresponding to each application in the multitask queue.

S511: The electronic device 100 displays the multitask management interface. The multitask management interface includes the screenshot of the user interface 1 of the application 1 (namely, the top-level application when the input operation 1 is received) and the blur-processed image of the user interface 2 (namely, the sub-top-level application when the input operation 1 is received).

It should be noted that, in this embodiment of this application, when the electronic device 100 switches a user interface 11 of a desktop application to the multitask management interface, a screenshot of the user interface 11 does not need to be taken, and the multitask management interface does not need to display a preview image of a user interface (for example, the user interface 11 in the foregoing embodiment) of the desktop application.

For example, the user interface 1 may be a personal center interface 18 of a payment application shown in FIG. 5A. A window corresponding to the personal center interface 18 is a private window. As shown in FIG. 5A, after the electronic device 100 receives an input operation 1 performed on the multitask button 205C, the electronic device 100 displays, on a multitask management interface 22, a page 605 of a payment application shown in FIG. 5B. The page 605 is used to display a preview image of the personal center interface 18, namely, a screenshot of the personal center interface 18. The electronic device 100 does not perform blur processing on the screenshot of the personal center interface 18.

For example, as shown in FIG. 4E, after receiving an input operation performed on the home screen button 205B, the electronic device 100 displays the user interface 11 of the desktop application shown in FIG. 4F, and stores the screenshot of the personal center interface 18. As shown in FIG. 4F, after receiving an input operation 1 performed on the multitask button 205C, the electronic device 100 performs blur processing on a screenshot of a personal center interface 18 corresponding to a private window of a payment application, and stores a blur-processed image of the screenshot as a preview image of the personal center interface 18. In response to the operation 1, the electronic device 100 displays, on a multitask management interface 20, a page 603 of a payment application shown in FIG. 4G. The page 603 includes a blur-processed image of the screenshot of the personal center interface 18.

In some embodiments of this application, in step S503, the electronic device 100 invokes the RunningTask task switching, to determine that the top-level application is the application 1 and a non-top-level application other than the top-level application is the application 2. Then, the electronic device 100 determines whether blur processing needs to be performed on all non-top-level applications, and performs corresponding blur processing, that is, performs step S507 and step S508.

In Implementation 4, if the window corresponding to the user interface 1 is a private window, when the electronic device 100 switches the user interface 1 to the multitask management interface of the application 1 (in this case, the application 1 is a top-level application), the electronic device 100 stores the screenshot of the user interface 1 as the preview image of the user interface 1 in the multitask management interface. Then, when the electronic device 100 switches the user interface of the application 2 (in this case, the application 2 is a top-level application, and the application 1 is a sub-top-level application) to the multitask management interface, the electronic device 100 performs blur processing on the screenshot of the user interface 1 of the sub-top-level application, and stores a blur-processed image of the screenshot as the preview image of the user interface 1 in the multitask management interface. In this case, the electronic device 100 may delete the screenshot of the user interface 1.

Implementation 5

Figures 1, 8E:
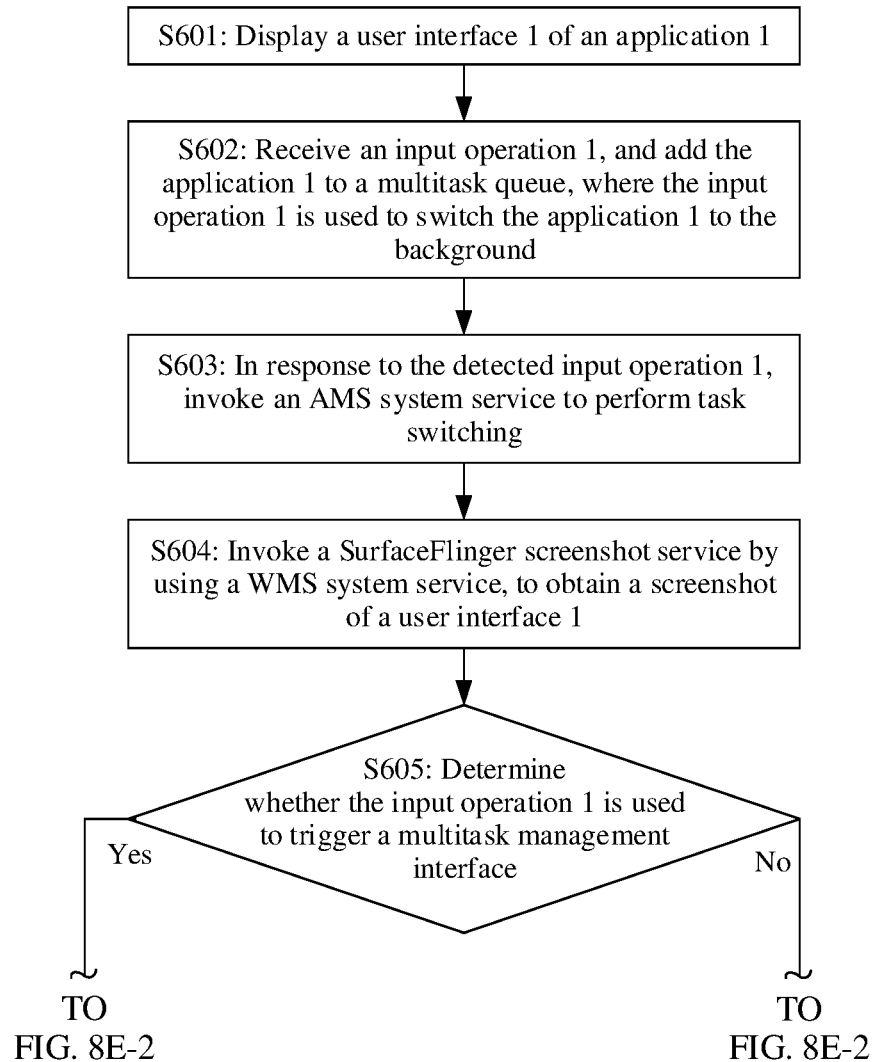
Figures 2, 8E:
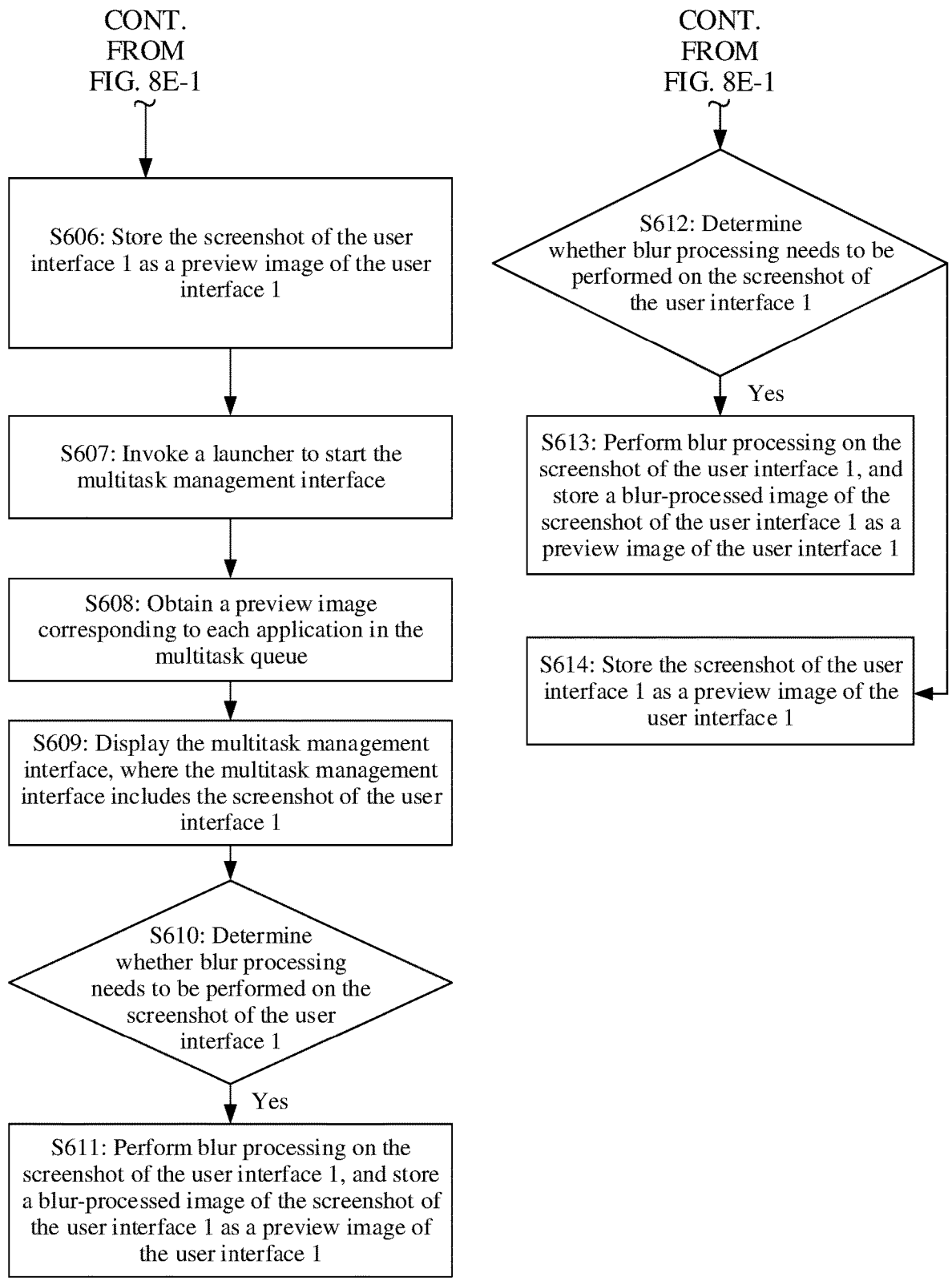

For example, FIG. 8E-1 and FIG. 8E-2 show an information display method according to an embodiment of this application. The information display method includes but is not limited to steps S601 to S613.

S601: The electronic device 100 displays a user interface 1 of an application 1.

S602: The electronic device 100 receives an input operation 1, and add the application 1 to a multitask queue. The input operation 1 is used to switch the application 1 to the background.

S603: In response to the detected input operation 1, the electronic device 100 invokes an AMS system service to perform task switching.

S604: The electronic device 100 invokes a SurfaceFlinger screenshot service by using a WMS system service, to obtain a screenshot of the user interface 1.

S605: The electronic device 100 determines whether the input operation 1 is used to trigger a multitask management interface. If the input operation 1 is used to trigger a multitask management interface, the electronic device 100 may perform step S606 to step S611. If the input operation 1 is not used to trigger a multitask management interface, the electronic device 100 may perform step S612 to step S614.

S606: The electronic device 100 stores the screenshot of the user interface 1 as a preview image of the user interface 1.

S607: The electronic device 100 invokes a launcher to start a multitask management interface.

S608: The electronic device 100 obtains a preview image corresponding to each application in the multitask queue.

S609: The electronic device 100 displays the multitask management interface. The multitask management interface includes the screenshot of the user interface 1.

It may be understood that, if the input operation 1 is used to trigger a multitask management interface, the electronic device 100 switches a user interface 1 of a top-level application to a multitask management interface in response to the input operation 1. In some embodiments of this application, when the electronic device 100 switches the user interface 1 of the top-level application to the multitask management interface, the electronic device 100 does not perform blur processing on the screenshot of the user interface 1, and the multitask management interface is used to display the screenshot of the user interface 1.

S610: The electronic device 100 determines whether blur processing needs to be performed on the screenshot of the user interface 1. If blur processing needs to be performed, the electronic device 100 performs step S611.

For a specific implementation of determining whether blur processing needs to be performed on the screenshot of the user interface 1, refer to the related embodiments of FIG. 7B and FIG. 7E. Details are not described herein again. It may be understood that, if the electronic device 100 determines that blur processing does not need to be performed on the screenshot of the user interface 1, the electronic device 100 continues to use the screenshot of the user interface 1 as the preview image of the user interface 1 in the multitask management interface.

S611: The electronic device 100 performs blur processing on the screenshot of the user interface 1, and stores a blur-processed image of the screenshot of the user interface 1 as the preview image of the user interface 1.

It may be understood that the electronic device 100 may determine, after displaying the screenshot of the user interface 1 in the multitask management interface, whether blur processing needs to be performed on the screenshot of the user interface 1. If the electronic device 100 determines that blur processing needs to be performed, the electronic device 100 performs blur processing on the screenshot of the user interface 1, and replaces the blur-processed image of the screenshot with the preview image of the user interface 1 in the multitask management interface, so that privacy information of a user interface 1 of a non-top-level application is subsequently protected in the multitask management interface.

S612: The electronic device 100 determines whether blur processing needs to be performed on the screenshot of the user interface 1. If blur processing needs to be performed, the electronic device 100 performs step S613. If blur processing does not need to be performed, the electronic device 100 performs step S614.

S613: The electronic device 100 performs blur processing on the screenshot of the user interface 1, and stores a blur-processed image of the screenshot of the user interface 1 as a preview image of the user interface 1.

S614: The electronic device 100 stores the screenshot of the user interface 1 as a preview image of the user interface 1 in the multitask management interface.

In Implementation 5, if a window corresponding to the user interface 1 is a private window, when the electronic device 100 switches the user interface 1 of the application 1 (the application 1 is a top-level application) to the multitask management interface, the screenshot of the user interface 1 is displayed as the preview image of the user interface 1 in the multitask management interface. Then, the electronic device 100 performs blur processing on the screenshot of the user interface 1, and updates the blur-processed image of the screenshot of the user interface 1 to the preview image of the user interface 1 in the multitask management interface. When the electronic device 100 switches the user interface 1 of the application 1 to an interface other than the multitask management interface, the electronic device 100 performs blur processing on the screenshot of the user interface 1, and stores the blur-processed image of the screenshot as the preview image of the user interface 1 in the multitask management interface.

In Implementation 4 and Implementation 5, when the electronic device 100 switches from a user interface of a top-level application to a multitask management interface, the electronic device 100 does not perform blur processing on a screenshot of the application, even if a window in which the top-level application recently runs is a private window. The multitask management interface may include the screenshot of the application.

Embodiments of this application further provide an information display method. The information display method includes but is not limited to steps S701 to S703.

S701: Display a first multitask management interface. The first multitask management interface includes a first preview image of a first user interface of a first application, and the first user interface corresponds to a first window of the first application.

S702: Display a second user interface. The second user interface corresponds to a second window of the first application.

S703: After the second user interface is switched to a background, trigger displaying of a second multitask management interface. The second multitask management interface includes a second preview image of the second user interface. The first preview image is an image obtained by performing blur processing on a screenshot of the first user interface, and the second preview image is an image of a screenshot that is of the second user interface and on which blur processing is not performed. Alternatively, the first preview image is an image obtained by performing blur processing on a screenshot of the first user interface to a first degree, the second preview image is an image obtained by performing blur processing on a screenshot of the second user interface to a second degree, and the first degree is different from the second degree.

For example, the first application may be a payment application shown in FIG. 4A to FIG. 6F.

In an implementation, the first preview image is the image obtained by performing blur processing on the screenshot of the first user interface, and the second preview image is the image of the screenshot that is of the second user interface and on which blur processing is not performed. For example, the first user interface may be a personal center interface 16 of a payment application shown in FIG. 4C, and the first preview image may be a blur-processed image 602A of a screenshot of a personal center interface 16 in a multitask management interface 19 shown in FIG. 4D. Alternatively, the first user interface may be a personal center interface 16 shown in FIG. 4E, and the first preview image may be a blur-processed image 603A of a screenshot of a personal center interface 16 in a multitask management interface 20 shown in FIG. 4G. Alternatively, the second user interface may be a home page interface 18 of a payment application shown in FIG. 4A, and the second preview image may be a screenshot 601A of a home page interface 18 in a multitask management interface 17 shown in FIG. 4B. Alternatively, the second user interface may be a home page interface 18 shown in FIG. 4H, and the second preview image may be a screenshot 601A of a home page interface 18 in a multitask management interface 21 shown in FIG. 4J.

In an implementation, the first preview image is an image obtained by performing blur processing on the screenshot of the first user interface to a first degree, the second preview image is an image obtained by performing blur processing on the screenshot of the second user interface to a second degree, and the first degree is different from the second degree. For example, the first user interface is a personal center interface 18 shown in FIG. 6A, and the first preview image is a lowly blur-processed image 607A of a screenshot of a personal center interface 18 in a multitask management interface 23 shown in FIG. 6D. The second user interface is the personal center interface 18 shown in FIG. 6A, and the second preview image is a moderately blur-processed image 608A of a screenshot of a personal center interface 18 in a multitask management interface 23 shown in FIG. 6E. Alternatively, the second preview image is a highly blur-processed image 609A of a screenshot of a personal center interface in a multitask management interface 23 shown in FIG. 6F.

For example, the first application may alternatively be an application 1 in the embodiments related to FIG. 7A to FIG. 8E-2. Correspondingly, the first user interface may be a user interface 1 of the application 1, and the first preview image may be a preview image of the user interface 1 on a multitask management interface.

In some embodiments of this application, the electronic device 100 displays a third user interface, and the third user interface corresponds to a third window of the second application. After the third user interface is switched to the background, displaying of a third multitask management interface is triggered. The third multitask management interface includes a third preview image of the third user interface, the third preview image is an image obtained by performing blur processing on a screenshot of the third user interface to a third degree, and the third degree is different from the first degree and the second degree. The first application and the second application may be a same application. In this way, blur processing may be performed on screenshots of user interfaces of different windows of a same application to at least three different degrees (including the first degree, the second degree, and the third degree) in the multitask management interface. Alternatively, the first application and the second application may be different applications. In this way, in the multitask management interface, preview images corresponding to different applications may be screenshots on which blur processing is performed to different degrees.

For example, the first degree is lower than the second degree. Blur processing of the first degree may be low blur processing in the foregoing embodiments, and blur processing of the second degree may be high blur processing in the foregoing embodiments. For example, the first degree is lower than the second degree, and the second degree is lower than the third degree. Blur processing of the first degree may be low blur processing in the foregoing embodiments, blur processing of the second degree may be moderate blur processing in the foregoing embodiments, and blur processing of the third degree may be high blur processing in the foregoing embodiments. For example, the first user interface, the second user interface, and the third user interface are the personal center interface 18 shown in FIG. 6A. The first preview image is the lowly blur-processed image 607A of the screenshot of the personal center interface 18 in the multitask management interface 23 shown in FIG. 6D. The second preview image is the highly blur-processed image 608A of the screenshot of the personal center interface 18 in the multitask management interface 23 shown in FIG. 6E. The third preview image is the highly blur-processed image 609A of the screenshot of the personal center interface in the multitask management interface 23 shown in FIG. 6F. It should be noted that the first user interface, the second user interface, and the third user interface may alternatively be user interfaces corresponding to different windows. The foregoing examples are merely examples for description, and shall not constitute a limitation on this embodiment of this application.

In some embodiments of this application, before the first multitask management interface is displayed, the method further includes: displaying the first user interface. The electronic device 100 displays a fourth multitask management interface by directly switching from the displayed first user interface. The fourth multitask management interface includes a fourth preview image of the first user interface. The fourth preview image is the screenshot that is of the first user interface and on which blur processing is not performed.

For example, the first user interface may be a personal center interface 18 of a payment application shown in FIG. 5A. A window corresponding to the personal center interface 18 is a private window. The fourth multitask management interface may be a multitask management interface 22 shown in FIG. 5B. The fourth preview image may be a screenshot of a personal center interface 18 shown in FIG. 5B. The electronic device 100 does not perform blur processing on the screenshot of the personal center interface 18. It may be understood that, when the electronic device 100 switches a user interface (for example, the first user interface) of a window of a top-level application (for example, the first application) to a multitask management interface, regardless of whether the window corresponding to the user interface is a private window, the electronic device 100 does not perform blur processing on a screenshot of the user interface of the top-level application. The multitask management interface includes a preview image of the user interface, namely, a screenshot that is of the user interface and on which blur processing is not performed.

In some embodiments of this application, before the first multitask management interface is displayed, the method further includes: The electronic device 100 performs blur processing on the screenshot of the first user interface based on privacy of the first window of the first application or privacy of the first application, to generate the first preview image. It may be understood that the electronic device 100 can determine, based on privacy of a window corresponding to a user interface or privacy of an application corresponding to the user interface, whether blur processing needs to be performed on a screenshot of the user interface. In this embodiment of this application, a private window or a private application may be preset by the user, may be preset by the electronic device 100, or may be preset during development of an application. If the private window or the private application is preset during development of the application, when installing the application, the electronic device 100 may determine privacy of the application based on installation information of the application, that is, whether the application is a private application.

For example, refer to related embodiments in FIG. 7A, FIG. 7F, and FIG. 8A to FIG. 8E-2. The first application may be the application 1. The first user interface is the user interface 1 of the application 1. The electronic device 100 may determine, based on the privacy of the first window of the first application or the privacy of the first application. Whether blur processing needs to be performed on a screenshot of the user interface 1.

In some embodiments of this application, that the electronic device 100 performs blur processing on the screenshot of the first user interface based on the privacy of the first window of the first application or the privacy of the first application specifically includes: When the first window of the first application is a private window, the electronic device 100 performs blur processing on the screenshot of the first user interface based on an attribute of the first window. Alternatively, when the first window of the first application is not a private window, but the first application is a private application, the electronic device 100 performs blur processing on the screenshot of the first user interface based on an attribute of the first application. For example, refer to FIG. 7B. The first application may be the application 1. The first user interface is the user interface 1 of the application 1. For details about how the electronic device 100 determines, based on the privacy of the first window of the first application or the privacy of the first application, whether blur processing needs to be performed on the screenshot of the user interface 1, refer to related descriptions in the embodiment in FIG. 7B. Details are not described herein again.

In some embodiments of this application, the private window or the private application corresponds to different privacy levels. The privacy levels include at least a first privacy level and a second privacy level. That the electronic device 100 performs blur processing on the screenshot of the first user interface based on the privacy of the first window of the first application or the privacy of the first application further includes: When a privacy level of the first window is the first privacy level, the electronic device 100 performs blur processing on the screenshot of the first user interface to the first degree. When a privacy level of the first window is the second privacy level, the electronic device 100 performs blur processing on the screenshot of the first user interface to the second degree. When the first window is not a private window and a privacy level of the first application is the first privacy level, the electronic device 100 performs blur processing on the screenshot of the first user interface to the first degree. Alternatively, when the first window is not a private window and a privacy level of the first application is the second privacy level, the electronic device 100 performs blur processing on the screenshot of the first user interface to the second degree.

In this embodiment of this application, a plurality of privacy levels, for example, the first privacy level and the second privacy level, can be configured for an application or a window of the application. The first privacy level and the second privacy level may be any two of the low privacy level, the moderate privacy level, and the high privacy level in the foregoing embodiments. For example, refer to FIG. 7C. The first application may be the application 1. The first user interface is the user interface 1 of the application 1. For details about how the electronic device 100 determines, based on the privacy of the first window of the first application or the privacy of the first application, whether blur processing needs to be performed on the screenshot of the user interface 1, refer to related descriptions in the embodiment in FIG. 7C. Details are not described herein again.

In some embodiments of this application, refer to FIG. 6D to FIG. 6F. The first multitask management interface may be the multitask management interface 23. The multitask management interface 23 further includes prompt information. The prompt information is used to notify a user that blur processing is performed on the first user interface.

In some embodiments of this application, before displaying of the second multitask management interface is triggered, the method further includes: The electronic device 100 generates the second preview image based on privacy of the second window of the first application or privacy of the first application.

In some embodiments of this application, that the electronic device 100 generates the second preview image based on the privacy of the second window of the first application or the privacy of the first application specifically includes: when the first window of the first application is not a private window and the first application is not a private application, determining that the second preview image is the image of the screenshot that is of the second user interface and on which blur processing is not performed.

For example, refer to FIG. 6A to FIG. 6F. The first application may be the application 1, and the first user interface is the user interface 1 of the application 1. In some embodiments of this application, before displaying of the multitask management interface 23 is triggered, the electronic device 100 may perform blur processing on the screenshot of the user interface 1. Alternatively, when displaying of the multitask management interface 23 is triggered, blur processing on the screenshot of the user interface 1 is triggered.

Figure 3I:
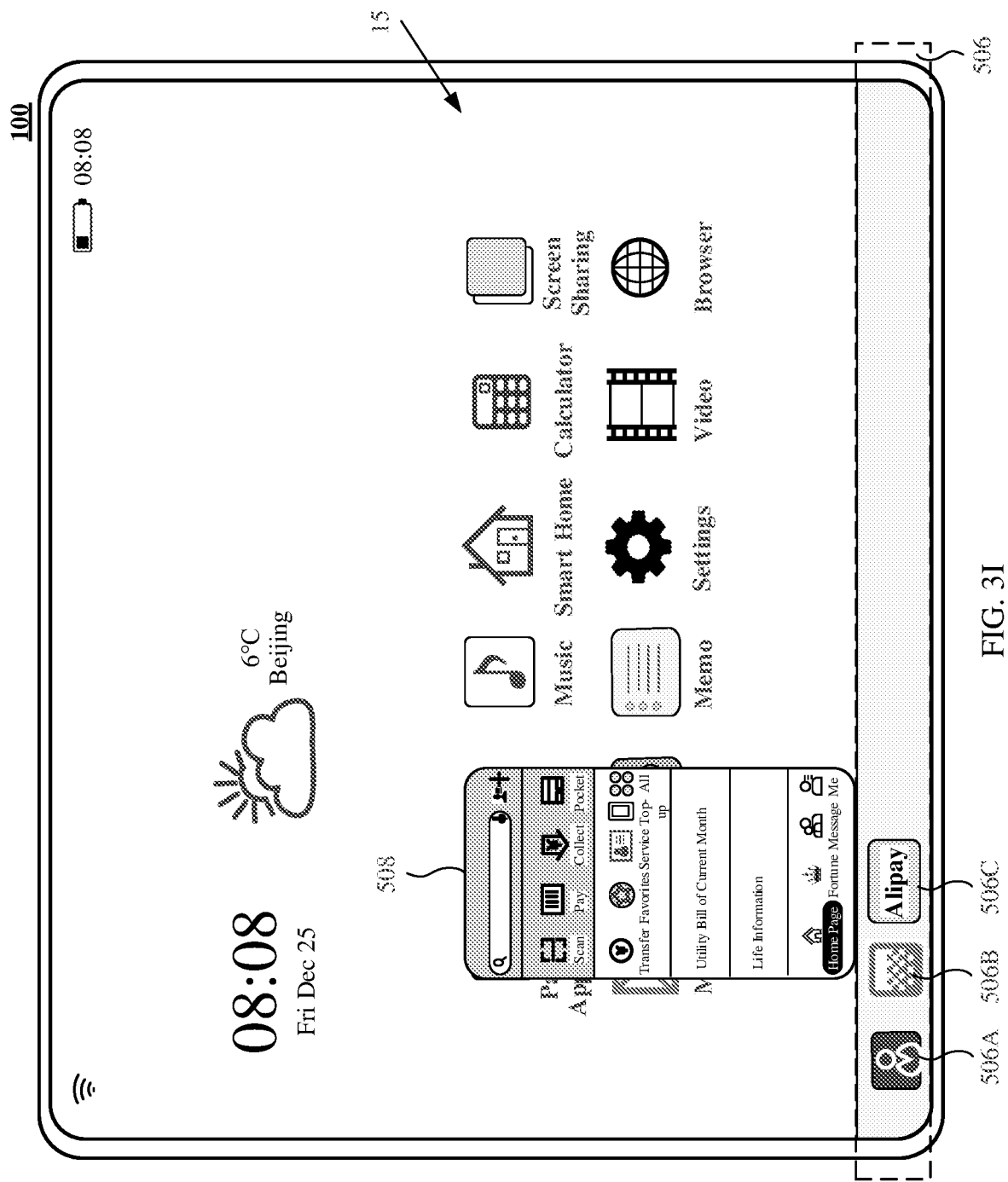

In some embodiments of this application, the multitask management interface may be at least one of the following: a multitask management interface displayed in full screen shown in FIG. 3A or FIG. 3B, a multitask management interface displayed in split screen shown in FIG. 3E, a multitask management interface displayed in a sidebar shown in FIG. 3G, and a multitask management interface displayed in a bottom toolbar shown in FIG. 3I. A form in which the multitask management interface is displayed is not limited to the foregoing display forms and may further have another display form. In the embodiments of this application, a software system of the electronic device 100 may use a layered architecture, an event-driven architecture, a micro kernel architecture, a micro service architecture, or a cloud architecture. In embodiments of this application, an Android system with a layered architecture is used as an example to describe a software structure of the electronic device 100.

Figure 9:
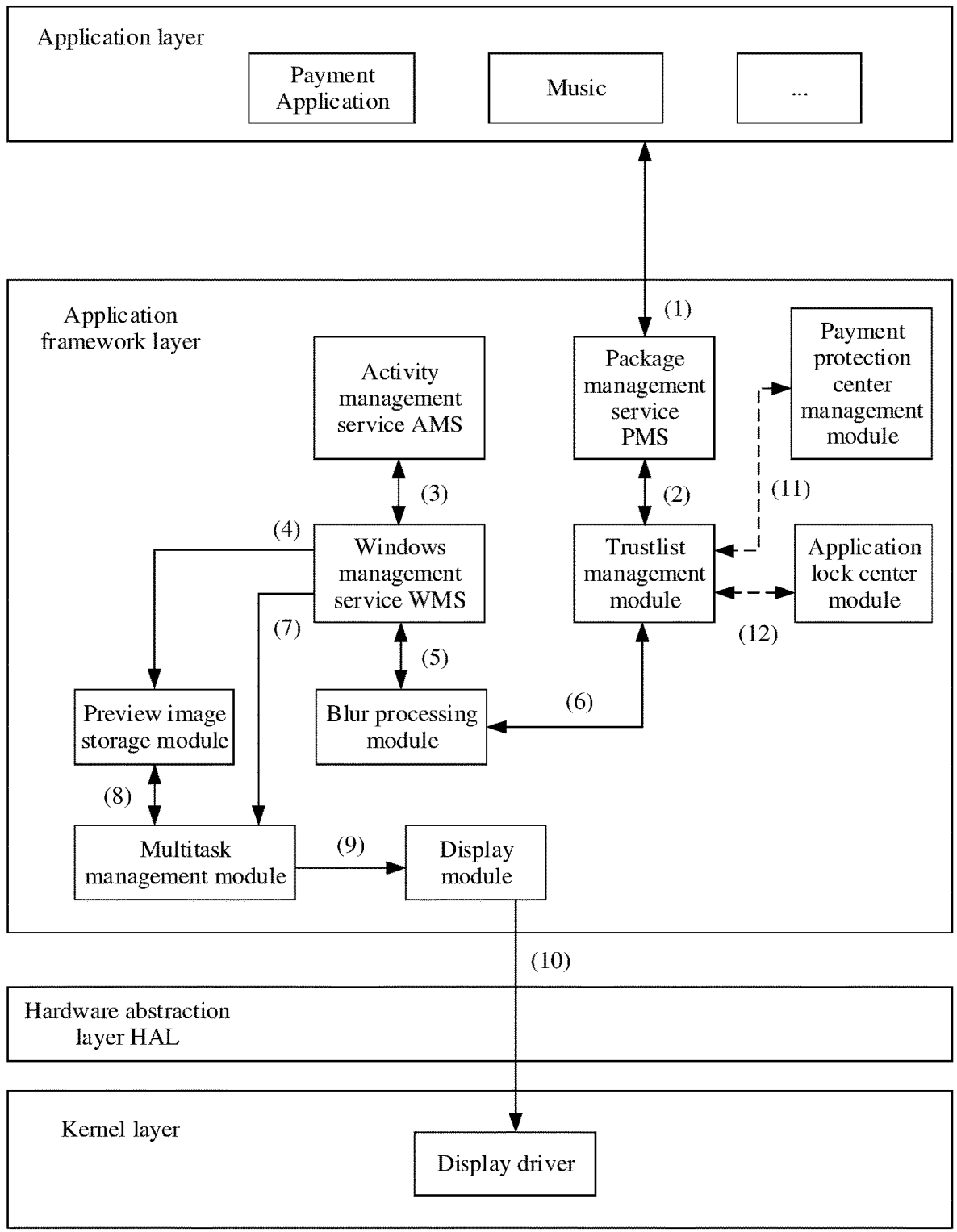
FIG. 9 is a block diagram of a software structure of an electronic device according to an embodiment of this application.

FIG. 9 is a block diagram of an example of a software structure of the electronic device 100 according to this embodiment of this application. The electronic device 100 can meet diversified privacy requirements of a user for different windows of a same application while protecting privacy information of a multitask management interface, and effectively improve user experience.

As shown in FIG. 9, software is divided into several layers by using a layered architecture, and each layer has a clear role and task. The layers communicate with each other through a software interface. In some embodiments, the Android system may be divided from top to bottom into an application framework layer, a hardware abstraction layer (hardware abstraction layer, HAL) layer, and a kernel layer (kernel).

The application layer includes a series of application packages such as payment application, music, and WLAN. The application layer can also include applications such as a camera, a gallery, a call, music, and a video.

The application framework layer provides an application programming interface (application programming interface, API) and a programming framework for an application at the application layer. The application framework layer includes some predefined functions.

The Android runtime includes a kernel library and a virtual machine. The Android runtime is responsible for scheduling and management of the Android system.

The kernel library includes two parts: a function that needs to be invoked in Java language, and a kernel library of Android.

The application layer and the application framework layer run on the virtual machine. The virtual machine executes Java files of the application layer and the application framework layer as binary files. The virtual machine is configured to implement functions such as object lifecycle management, stack management, thread management, security and exception management, and garbage collection.

The kernel layer is a layer between hardware and software. The kernel layer may include a display driver, a sensor driver, a touch IC driver, and may further include a camera driver, an audio driver, and the like. The HAL layer and the kernel layer (kernel) may perform corresponding operations in response to functions invoked by the application framework layer.

The application framework layer may include: a PMS system service, a trustlist management module, an AMS system service, a WMS management service, a preview image storage module, a multitask management module, a blur processing module, and a display module.

The package manager service (Package Manager Service, PMS) mainly scans specified directories in the system to find files ending with apk, parses these files, obtains all information about applications, and installs the applications. The PMS parses apk information for other system services such as an AMS and a WMS.

The trustlist management module is configured to manage a private window trustlist and a private application trustlist.

The preview image storage module is configured to store a preview image corresponding to each application in a multitask queue.

The multitask management module is configured to schedule a life cycle of a task (Task) of each application in the multitask queue.

The blur processing module is configured to determine, based on the private window trustlist and the private application trustlist in the trustlist management module, whether blur processing needs to be performed on a screenshot of a user interface of each window in the multitask queue, and is configured to implement blur processing.

The display module is configured to determine display content of the electronic device 100.

The following describes an example of a software working procedure in which the electronic device 100 performs a privacy information processing method.

In some embodiments of this application, the electronic device 100 represents a privacy level of an application or a window by using a mate-Data parameter. The PMS system service may obtain mate-Data data of each application and application window through a path (1). The trustlist management module may invoke the PMS system service through a path (2) to obtain mate-Data data of each application and application window, to generate the private window trustlist and the private application trustlist.

In some embodiments of this application, the electronic device 100 receives an input operation 1 used to switch the application 1 to the background, and information related to the input operation 1 is sent to the kernel layer. The input operation is processed into an original input event. The application framework layer obtains the original input event from the kernel layer, and identifies that the input event is used to switch the application 1 to the background for running. The application framework layer invokes the AMS system service to perform task switching. The AMS system service instructs, through a path (3), the WMS system service to obtain a screenshot of the user interface 1 of the application 1. The WMS system service invokes a Surface-Flinger screenshot service to obtain the screenshot of user interface 1.

In some embodiments of this application, if the input operation 1 is used to trigger the multitask management interface, after obtaining the screenshot of the user interface 1, the WMS system service stores the screenshot of the user interface 1 in the preview image storage module through the path (4). In some embodiments of this application, if the input operation 1 is used to trigger the multitask management interface, after obtaining the screenshot of the user interface 1, the WMS system service instructs, through a path (5), the blur processing module to determine whether blur processing is performed on the screenshot of the user interface 1. The blur processing module obtains the private window trustlist and the private application trustlist from the trustlist management module through a path (6), and determines, based on the private window trustlist and the private application trustlist, whether blur processing needs to be performed on the screenshot of the user interface 1. If blur processing is performed, the WMS system service obtains a blur-processed image of the screenshot of the user interface 1 through the path (5), and stores the blur-processed image of the screenshot of the user interface 1 (namely, a preview image of the user interface 1) to the preview image storage module through the path (4). If blur processing is not performed, the WMS system service stores the screenshot of the user interface 1 (namely, a preview image of the user interface 1) to the preview image storage module through the path (4). In some embodiments, the blur processing module may also directly store the blur-processed image of the screenshot of the user interface 1 in the preview image storage module.

After storing the preview image of the user interface 1 through the path (4), the WMS system service instructs, through a path (7), the multitask management module to start a multitask management function. The task management module obtains, through a path (8), a preview image of each application in the multitask queue in the preview image storage module, and determines display content of the multitask management interface based on the preview image of each application. The task management module instructs, through a path (9), the display module to determine display content of the multitask management interface. The display module invokes the display driver of the kernel layer through a path (10) to drive the display 194 to display the multitask management interface.

In some embodiments, the trustlist management module may further obtain, from a payment protection center management module through a path (11), an application added to a payment protection center, and add the application to the private application trustlist. In some embodiments, the trustlist management module may further obtain, from an application lock management module through a path (12), an application on which an application lock is set, and add the application to the private application trustlist.

All or some of the foregoing embodiments may be implemented by using software, hardware, firmware, or any combination thereof. When software is used to implement the embodiments, all or a part of the embodiments may be implemented in a form of a computer program product. The computer program product includes one or more computer instructions. When the computer program instructions are loaded and executed on the computer, the procedure or functions according to embodiments of this application are all or partially generated. The computer may be a general-purpose computer, a dedicated computer, a computer network, or other programmable apparatuses. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk drive, or a magnetic tape), an optical medium (for example, a DVD), a semiconductor medium (for example, a solid-state drive), or the like.

A person of ordinary skill in the art may understand that all or some of the processes of the methods in embodiments may be implemented by a computer program instructing related hardware. The program may be stored in a computer-readable storage medium. When the program runs, the processes of the methods in embodiments are performed. The foregoing storage medium includes any medium that can store program code, such as a ROM, a random access memory RAM, a magnetic disk, or an optical disc.

What is claimed is:

1. An method, performed by an electronic device, the method comprising:
   displaying a first user interface, wherein the first user interface corresponds to a first application;
   detecting a first operation, wherein the first operation causes the first application to switch to a background application;
   displaying a second user interface, wherein the second user interface corresponds to a second application;
   performing blur processing on a screenshot of the first user interface of the first application to a first degree, to obtain a first preview image, based on privacy of a first window of the first application, comprising:
      when the first window of the first application is a private window, performing blur processing on the screenshot of the first user interface based on an attribute of the first window; and
      when the first window of the first application is not a private window, but the first application is a private application, performing blur processing on the screenshot of the first user interface based on an attribute of the first application; and
   displaying a first multitask management interface in response to detecting a second operation, wherein the first multitask management interface comprises the first preview image and a second preview image, the second preview image is obtained by performing blur processing on a screenshot of the second user interface to a second degree, and the first degree is different from the second degree.

2. The method according to claim 1, further comprising:
   deleting the first preview image when the first application is switched from the background to the foreground.

3. The method according to claim 1, further comprising:
   before detecting the second operation, displaying a third user interface, wherein the third user interface corresponds to a third application;

detecting a third operation, wherein the third operation causes the third application to switch to a background application;
generating a screenshot of the third user interface in response to detecting the third operation;
detecting a fourth operation, wherein the fourth operation causes the third application to switch from background to foreground; and
deleting the screenshot of the third user interface in response to the fourth operation.

4. The method according to claim 1, wherein the first multitask management interface further comprises prompt information, and the prompt information prompts a user that blur processing is performed on the first user interface and the second user interface.

5. The method according to claim 1, wherein the first multitask management interface is displayed in split screen.

6. The method according to claim 1, wherein the blur processing on a screenshot of the first user interface is performed using a blurring algorithm.

7. An electronic device, comprising:
one or more processors, a memory, and a display, wherein the memory and the display are coupled to the one or more processors, the memory stores computer program code, the computer program code comprises computer instructions, and when the one or more processors invoke the computer instructions, the electronic device is enabled to perform:
performing blur processing on a screenshot of a first user interface of a first application to a first degree based on privacy of a first window of the first application, to generate a first preview image, wherein the first user interface corresponds to the first window of the first application;
displaying a first multitask management interface, wherein the first multitask management interface comprises the first preview image of the first user interface of the first application;
displaying a second user interface of the first application; and
after switching the second user interface of the first application to a background, triggering displaying of a second multitask management interface, wherein the second multitask management interface comprises a second preview image of the second user interface, wherein the second preview image is obtained by performing blur processing on a screenshot of the second user interface to a second degree, and the first degree is different from the second degree; and
wherein performing blur processing on the screenshot of the first user interface of the first application to the first degree based on privacy of the first window of the first application:
when the first window of the first application is a private window, performing blur processing on the screenshot of the first user interface based on an attribute of the first window; and
when the first window of the first application is not a private window, but the first application is a private application, performing blur processing on the screenshot of the first user interface based on an attribute of the first application.

8. The electronic device according to claim 7, wherein when the one or more processors invoke the computer instructions, the electronic device is further enabled to perform:
displaying a third user interface of a second application; and
after switching the third user interface to the background, triggering displaying of a third multitask management interface, wherein the third multitask management interface comprises a third preview image of the third user interface, the third preview image is obtained by performing blur processing on a screenshot of the third user interface to a third degree, and the third degree is different from the first degree.

9. The electronic device according to claim 7, wherein when the one or more processors invoke the computer instructions, the electronic device is further enabled to perform:
before displaying the first multitask management interface, displaying the first user interface; and
displaying a fourth multitask management interface by directly switching from the displayed first user interface to displaying the fourth multitask management interface, wherein the fourth multitask management interface comprises a fourth preview image of the first user interface, and the fourth preview image is a screenshot that is of the first user interface and on which blur processing is not performed.

10. The electronic device according to claim 7, wherein the private window and the private application correspond to different privacy levels, the privacy levels comprise at least a first privacy level and a second privacy level, and when the one or more processors invoke the computer instructions, the electronic device is further enabled to perform:
when a privacy level of the first window is the first privacy level, performing blur processing on the screenshot of the first user interface to the first degree;
when a privacy level of the first window is the second privacy level, performing blur processing on the screenshot of the first user interface to the second degree;
when the first window is not a private window and a privacy level of the first application is the first privacy level, performing blur processing on the screenshot of the first user interface to the first degree; or
when the first window is not a private window and a privacy level of the first application is the second privacy level, performing blur processing on the screenshot of the first user interface to the second degree.

11. The electronic device according to claim 7, wherein the first multitask management interface further comprises prompt information, and the prompt information prompts a user that blur processing is performed on the first user interface.

12. The electronic device according to claim 7, wherein when the one or more processors invoke the computer instructions, the electronic device is further enabled to perform:
obtaining the screenshot of the first user interface when the first user interface is switched to the background or after the first user interface is switched to the background; and
wherein performing blur processing on the screenshot of the first user interface occurs before triggering displaying of the first multitask management interface, or when triggering displaying of the first multitask management interface.

13. The electronic device according to claim 7, wherein when the one or more processors invoke the computer instructions, the electronic device is further enabled to perform:

displaying the first multitask management interface in full screen;

displaying the first multitask management interface in split screen; or displaying the first multitask management interface in a sidebar.

14. An electronic device, comprising:

one or more processors, a memory, and a display, wherein the memory and the display are coupled to the one or more processors, the memory stores computer program code, the computer program code comprises computer instructions, and when the one or more processors invoke the computer instructions, the electronic device is enabled to perform:

displaying a first user interface, wherein the first user interface corresponds to a first application;

detecting a first operation, wherein the first operation causes the first application to switch to a background application;

displaying a second user interface, wherein the second user interface corresponds to a second application;

performing blur processing on a screenshot of the first user interface of the first application to a first degree, to obtain a first preview image, based on privacy of a first window of the first application, comprising:

when the first window of the first application is a private window, performing blur processing on the screenshot of the first user interface based on an attribute of the first window; and when the first window of the first application is not a private window, but the first application is a private application, performing blur processing on the screenshot of the first user interface based on an attribute of the first application; and displaying a first multitask management interface in response to detecting a second operation, wherein the first multitask management interface comprises the first preview image and a second preview image, the second preview image is obtained by performing blur processing on a screenshot of the second user interface to a second degree, and the first degree is different from the second degree.

15. The electronic device according to claim 14, wherein when the one or more processors invoke the computer instructions, the electronic device is further enabled to perform:

deleting the first preview image when the first application is switched from the background to the foreground.

16. The electronic device according to claim 14, wherein when the one or more processors invoke the computer instructions, the electronic device is further enabled to perform:

before detecting the second operation, displaying a third user interface, wherein the third user interface corresponds to a third application;

detecting a third operation, wherein the third operation causes the third application to switch to a background application;

generating a screenshot of the third user interface in response to detecting the third operation;

detecting a fourth operation, wherein the fourth operation causes the third application to switch from background to foreground; and deleting the screenshot of the third user interface in response to the fourth operation.

17. The electronic device according to claim 14, wherein the first multitask management interface further comprises prompt information, and the prompt information prompts a user that blur processing is performed on the first user interface and the second user interface.

18. The electronic device according to claim 14, wherein when the one or more processors invoke the computer instructions, the electronic device is further enabled to perform:

displaying the first multitask management interface in full screen.

19. The electronic device according to claim 14, wherein when the one or more processors invoke the computer instructions, the electronic device is further enabled to perform:

displaying the first multitask management interface in split screen.

20. The electronic device according to claim 14, wherein when the one or more processors invoke the computer instructions, the electronic device is further enabled to perform:

displaying the first multitask management interface in a sidebar.

* * * * *